United States Patent [19]
Coleman et al.

[11] Patent Number: 5,794,009
[45] Date of Patent: Aug. 11, 1998

[54] MULTIPLE PROTOCOL MANAGEMENT SYSTEM

[75] Inventors: Robby A. Coleman, Winfield; Bryan K. Mowery, Hurricane; Kenneth C. Warner, Huntington, all of W. Va.

[73] Assignee: Eagle Research Corp., Scott Depot, W. Va.

[21] Appl. No.: 647,356

[22] Filed: May 9, 1996

[51] Int. Cl.$^6$ ................................................ G06F 13/42
[52] U.S. Cl. ................ 395/500; 364/551.01; 395/200.57
[58] Field of Search ......................... 395/200, 500, 395/200.57; 370/79; 340/147; 364/551.01

[56] References Cited

U.S. PATENT DOCUMENTS

| | | | |
|---|---|---|---|
| 4,281,315 | 7/1981 | Bauer et al. | 340/147 |
| 5,265,239 | 11/1993 | Ardolino | 395/500 |
| 5,345,396 | 9/1994 | Yamaguchi | 395/500 |
| 5,428,555 | 6/1995 | Starkey et al. | 364/551.01 |
| 5,452,433 | 9/1995 | Nihart et al. | 395/500 |
| 5,490,134 | 2/1996 | Fernandes et al. | 370/79 |

FOREIGN PATENT DOCUMENTS

0463764A2  11/1991  United Kingdom .............. G06F 9/46

*Primary Examiner*—Robert B. Harrell
*Assistant Examiner*—Saleh Najjar
*Attorney, Agent, or Firm*—David L. Davis

[57] ABSTRACT

A data acquisition system having a plurality of remote data gathering devices each of which communicates according to a respective defined communications protocol. An object database memory containing data for all of the data gathering devices is provided. Protocol drivers stored in the memory may be retrieved and stacked to form a layered protocol driver in accordance with established ISO/OSI standards. A common messaging interface is interposed between adjacent protocol drivers in the stack and a common database interface is interposed between the protocol drivers and the database memory.

8 Claims, 10 Drawing Sheets

Protocol Master ER Diagram

Scheduling Server ER Diagram

MULTIPLE PROTOCOL MANAGEMENT SYSTEM

CROSS-REFERENCE TO RELATED APPLICATION

This application is related to U.S. patent application Ser. No. 08/647,357, currently pending filed on even date herewith and assigned to the assignee of the present invention.

BACKGROUND OF THE INVENTION

This invention relates to a data acquisition system which has a plurality of remote data gathering devices each of which communicates according to a respective defined communications protocol and, more particularly, to a multiple protocol management system for use in such a data acquisition system.

Today's utilities have new and ever increasing demands being placed on their information systems. Deregulation, increasing customer service demands, improving efficiencies (such as "unaccounted for gas"), improving management of customer demand (such as load balancing) and downsizing pressures, force the utilities to find more efficient ways of collecting and managing their data in order to compete. These factors exponentially increase the need for timely and accurate operational data. Additionally, new Information Superhighway technologies are opening up a vast information resource between utilities and their customers.

Some of the system requirements becoming important to utilities include integration of existing information systems, use of open systems standards, communications with a multitude of devices, lower system installation and operating costs, scalability for future growth, and ease of use. These requirements also create a new set of challenges, such as databases which can maintain large historical and configuration information on hundreds or even thousands of devices, maintaining and implementing both proprietary and new device protocol standards, and applying open systems technologies to create integrated information systems.

A utility's information systems can be generally divided into the following categories:

Automated Mapping/Facilities Management (AM/FM);

Geographical Information System (GIS);

Electronic Measurement/Supervisory Control and Data Acquisition (EM/SCADA); and

Customer Information Systems/Financial Information Systems (CIS/FIS).

Utilities have invested vast amounts of money to develop these information systems and cannot afford to "start over". However, the new demands, as previously discussed, create an urgent need for cost effective technology that can utilize most of the prior information systems investments.

These requirements and challenges have generated a demand for new technology that integrates a utility's information sources and combines the strengths of both Electronic Measurement (EM) and Supervisory Control and Data Acquisition (SCADA) systems, while minimizing the weaknesses and limitations of each. A new technology emerging as a result of recent hardware and software advancements is being referred to as Distribution Automation (DA). DA synergizes the functionality, features, and characteristics of traditional EM and SCADA systems to provide a comprehensive automation and data management solution for local distribution utilities. Some of the characteristics of a DA system include:

Scalable, high-performance historical and configuration databases;

Highly distributed architecture;

Flexible communications systems;

Management of multi-vendor devices;

Open protocol development with support of smart devices (distributed intelligence);

Dynamic, easy to use graphical user interfaces;

Integrates easily with other information systems;

Uses advanced PC operating systems in place of traditional mainframes and minicomputers; and Incorporates characteristics of both traditional EM and SCADA systems.

The Information Superhighway (Iway) represents another driving factor for this new generation of Distribution Automation. The Iway is not just having a connection to the Internet. Several Iway type applications are currently in development which affect utility companies, including: direct access to customers for utilities through broadband networks, and consolidated energy management systems controlled by marketing companies with buying power. The new opportunities and demands opened up by Iway technologies actually obsolete many (if not all) traditional EM and SCADA systems. An Iway system is not just another meter reading technology; it is a wide open two-way communications link between utilities and their customers, creating a whole new world of business opportunities. Iway systems represent the most sophisticated use of Distribution Automation. The demands of an Iway system emphasize the characteristics and capabilities of Distribution Automation.

The growing use of Electronic Correctors has expanded the definition of a distributed system. Electronic Correctors provide true distributed intelligence, with local logic, historical, and auditing information at each site. A system comprised of several hundred or even a few thousand of these devices creates a tremendous logistical problem to deal with. The central host which maintains these devices must be able to manage each device's configuration data and bring back each device's historical and auditing information into a globally coherent database system, regardless of the type of device used in the field. It is then common for the utility to require at least a couple of years of on-line historical data (perhaps even to one-hour intervals) for all of the devices. System performance must also be maintained at all times for both user access and incoming data.

The value of the data obtained by a DA system can especially be realized if it can be exchanged with other information systems throughout the utility. For example, the Customer and Financial Information systems need accurate billing and usage data, and Facilities Management needs operational data. Open systems standards such as SQL (Structured Query Language) and ODBC (Microsoft Open Database Connectivity) are the basis for easy data exchange among diverse systems.

In order to minimize the cost of acquisition and maintenance while not jeopardizing the security of supply, utilities prefer to be able to purchase hardware, software, electronic measurement, RTUs and other SCADA devices from diverse manufacturers. Some devices are also better at certain functions than at others. However, despite the promise of protocol standards, there are a number of proprietary and "de-facto" standard protocols used throughout the industry. This diversity in communications makes the goal of mixing multi-vendor equipment difficult for the utility. There are systems on the market which support multiple protocols, however, this is usually at a penalty of reduced functionality.

Traditional SCADA systems usually do not even provide a mechanism in their protocol systems to support intelligent devices which have their own configuration, auditing, and historical data. The results of many of the current protocol standards committees will produce new protocol implementations which are more robust than the traditional host systems have been designed to handle. These aspects prompt the need for a more robust open protocol development environment which supports easier integration of device protocols, including "smart" devices which support true distributed processing.

The demands of a DA system which have been discussed thus far would have traditionally prompted the use of a mainframe or minicomputer system. The nature of a DA system requires a tremendous amount of asynchronous activity, such as highly active communications and database systems. This type of computing can now be accomplished through the Client/Server architecture supported by newer operating systems such as NT, OS/2, and traditional UNIX. Operating systems like NT and OS/2 provide many of the advanced capabilities previously found only in UNIX and mainframe operating systems, but at a significantly lower cost to develop and maintain than the traditional systems. A DA system can now, therefore, be made affordable for the common Local Distribution Company (LDC), where previously only the large pipeline and LDC utilities could afford the expensive custom system solutions. The Client/Server technique also allows a system to be highly scalable to fit diverse needs. A network of personal computers running database and communication servers potentially has more computing and throughput power than an expensive mainframe system.

By incorporating characteristics found in traditional EM and SCADA systems, a DA system now has the edge to be used in diverse installations, where a mix of systems was previously required. Common components and features of a DA system sound like comparable EM and SCADA features: SQL database, communications server, protocol tool kit, object oriented Graphical User Interface, "real-time" database, historical data management, configuration management, recalculation of historical data, auditing, security, alarming, process graphics, trending, device management, etc. The big difference here is that these features and components should be closely integrated into a complete system to duplicate common EM and SCADA features while adding support for the new DA characteristics.

To better clarify how a DA system is different from traditional EM and SCADA systems, a discussion of EM and SCADA limitations is necessary. Considering the demands and challenges presented thus far, a number of problems arise in traditional EM and SCADA systems. SCADA systems are most noted for their fancy graphical user interfaces. However, the underlying architecture of SCADA often gets overshadowed by this pretty face. SCADA systems are typically based on a "real-time" database (RTDB) configured by points. Many SCADA systems have been designed for the factory floor, which would have a relatively small number of points as compared to the logistically large point counts required in a DA system. For example, a DA system with 500 devices and 25 operational parameters at each device requires 12,500 points. If each device can store 10,000 historical records (not uncommon), then the host system needs to support a minimum of 5 million rows of historical data (and more since the host would normally maintain more historical data than the remote devices). The math is easy, but this simple example is overwhelming for a SCADA system which is sold by the number of points. SCADA packages are presently not designed to easily manage or configure such a point count, which requires individual tag names and room in the memory based "real-time" database.

Protocol development in present SCADA packages also does not provide for the tremendous amount of historical and auditing data which can be generated by smart devices such as electronic correctors. SCADA packages offer access to diverse database engines. However, this is merely a cliff-hanger, since a database design for all of this data must be accomplished to meet the performance and storage needs of the system. This technique allows for a totally unique system for every utility, which translates to support headaches for both the utility and the system integrator. Again, much of this problem comes from the fact that many presently available SCADA systems primarily have focused on drawing tools and not the data management side of a system. Common SCADA packages on the market today are, essentially, a set of development tools. The idea of a DA system is to go beyond a set of development tools to provide a more robust environment ready to deal with the challenges we have presented here, much like the Microsoft Office suite is designed to incorporate solutions for common business applications. Some of the advantages a DA system borrows from a SCADA system include alarm handling, advanced graphics and control capabilities.

EN systems focus primarily on providing consumption data for billing purposes. Some of the characteristics of an EM system which would be considered as limitations in a DA system include: a focus primarily on read-only data translation; lack of device specific configuration capabilities; lack of modern object oriented graphics; lack of two-way capabilities if a low-end control site were to be used (such as a nomination control site); some older designs are not as scalable as the newer open systems designs; limitations on protocol development; and limited database storage capabilities. A DA system corrects these limitations while borrowing some EM system advantages such as historical recalculations, data validation, security and audit trails.

A properly designed DA system can take advantage of many proven technologies to provide an even more robust solution for the utility. For example, a properly selected client/server database system will provide full transaction processing for multiple users, automatic database recovery, on-line database backup, roll forward recovery, and scalability to manage hundreds or thousands of devices with several years of historical data without performance degradation.

A DA communications system should take advantage of ISO/OSI (International Standards Organization/open Systems Interconnection) standards to allow open development of protocol drivers. By using the ISO/OSI standards, multiple protocols and media can be easily maintained in the system without modifying the DA system's architecture. Following these guidelines will also allow easier inclusion of more sophisticated protocols which are currently being defined by diverse standards committees (such as AGA, IEEE/AMRA SCC31, MMS Forum, IEA-60 Home Automation, and joint AMRA/ANSI/CCAC/IEEE working group on meter protocol). These protocols will have better support of the distributed systems architecture becoming prevalent through the use of "smart" devices (such as electronic correctors).

A DA system should incorporate advanced graphics and drag-and-drop techniques to make system management easier. Managing hundreds or thousands of devices (each with their own historical data, audit trails, alarms, configuration parameters, and other items) represents a significant data presentation challenge. Advanced dynamic object oriented graphics can be used to represent this data in the form of nested folders, tables, and notebooks (similar to OS/2's, the Mac's, and Win 95's object oriented user interfaces).

It is therefore a primary object of the present invention to provide a data acquisition system satisfying the foregoing requirements.

It is a more specific object of the present invention to provide a multiple protocol management system for such a data acquisition system so that communication can be effected with remote data gathering devices operating in accordance with diverse communications protocols.

SUMMARY OF THE INVENTION

The foregoing and additional objects are attained in accordance with the principles of this invention by providing a multiple protocol management system in a data acquisition system including at least one control application and a plurality of remote data gathering devices each of which communicates according to a respective defined communications protocol. The multiple protocol management system comprises a plurality of protocol drivers defined according to ISO/OSI protocol layering definitions and storing means for storing an ordered list of the protocol drivers for each of the data gathering devices. Each such list contains an ordered identification of one or more protocol drivers corresponding to the respective defined communications protocol for each data gathering device. A retrieving means is responsive to a communications request received from one of the control applications and associated with a selected data gathering device for retrieving from the storing means the ordered list of protocol drivers corresponding to the selected data gathering device and means are provided for layering the protocol drivers identified in the retrieved ordered list to form a protocol stack.

In accordance with another aspect of this invention, the data acquisition system includes a plurality of communications ports each capable of connection to a selected data gathering device. The multiple protocol management system is effective for forming respective protocol stacks for all of the plurality of ports so that communications can be substantially simultaneously effected with a plurality of selected data gathering devices having diverse defined communications protocols.

In accordance with a further aspect of this invention, the layering means includes a common messaging interface interposed between adjacent protocol drivers in the protocol stack.

In accordance with yet another aspect of this invention, a data gathering device is associated with two or more defined communications protocols and the storing means stores a respective ordered list for each of the two or more defined communications protocols. The communications request contains an identification of a specific one of the two or more defined communications protocols and the retrieving means is then effective to retrieve that ordered list corresponding to the specifically identified defined communications protocol.

BRIEF DESCRIPTION OF THE DRAWINGS

The foregoing will be more readily apparent upon reading the following description in conjunction with the drawings in which like elements in different figures thereof are identified by the same reference numeral and wherein.

BRIEF DESCRIPTION OF THE APPENDICES

The appendices included with this application were written as WINDOWS® HELP files to assist a system user in understanding the system operation and to develop specific protocol stacks. These appendices are as follows:

APPENDIX A provides an overview of the communications server;

APPENDIX B provides a description of tables in the SCADA database;

APPENDIX C describes tables in the Security database;

APPENDIX D describes tables in the Masters database;

APPENDIX E describes tables in the Audit database;

APPENDIX F describes tables in the Event database;

APPENDIX G describes tables in the History database;

APPENDIX H provides an overview of the Protocol Driver Definition, the Protocol Driver Implementation and the Protocol Driver Tool Kit; and APPENDIX I describes the Database Layer Application Programming Interface (API).

DETAILED DESCRIPTION

Figure 1:
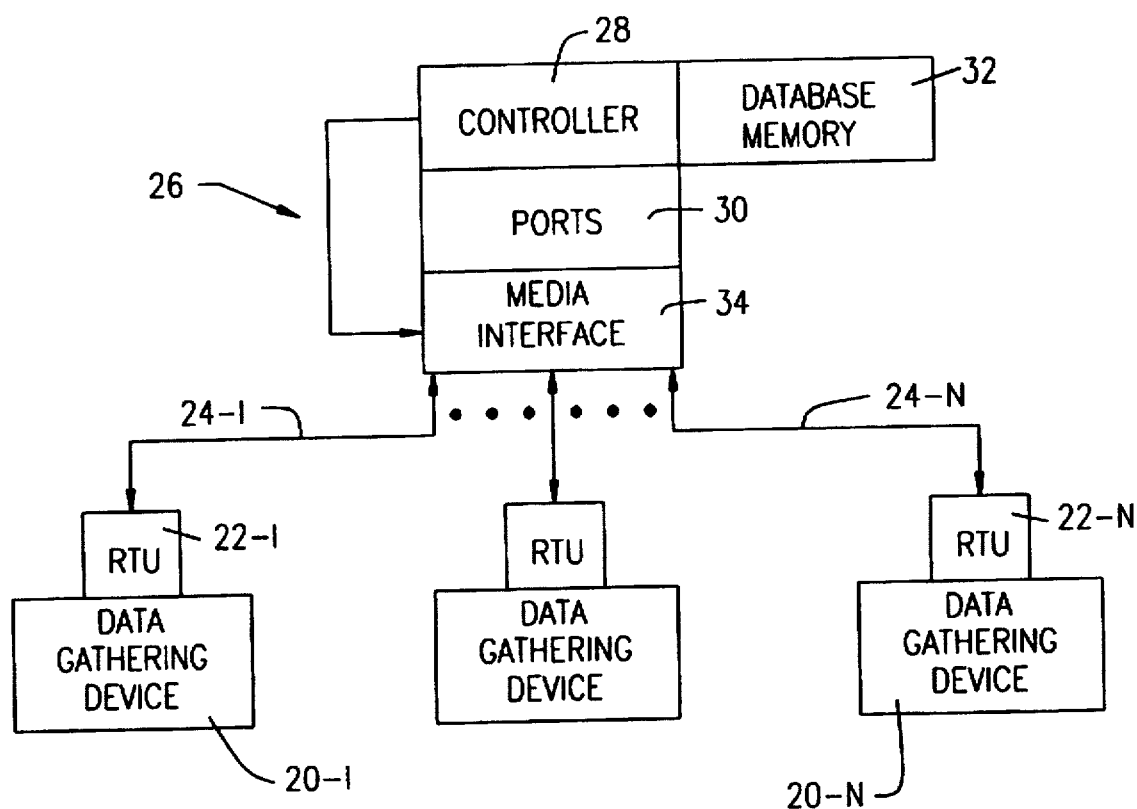
FIG. 1 is a block diagram of a data acquisition system in which a multiple protocol management system constructed in accordance with the principles of this invention is incorporated.

Referring now to the drawings, FIG. 1 shows a data acquisition system wherein a plurality of data gathering devices 20-1, . . . ,20-N, each with a respective remote terminal unit (RTU) 22-1, . . . .22-N, are each connected via an appropriate communications medium 24-1, . . . .24-N, to a central distribution automation system, designated generally by the reference numeral 26. The data gathering devices 20-1, . . . .20-N may be any suitable device. In the case of a gas utility, such devices may be flow meters, electronic flow correctors, and the like. The communications media 24-1, . . . .24-N may be dedicated wires, telephone lines, radio links, and the like.

The distribution automation system 26 includes a controller 28 having a plurality of communication ports 30, a database memory 32 associated with the controller 28, and a media interface 34 connected between the ports 30 and the communications media 24-1, . . . .24-N, which is controlled by the controller 28 to establish a connection between a particular RTU 22-1, . . . .22-N and a selected one of the ports 30.

Figure 2:
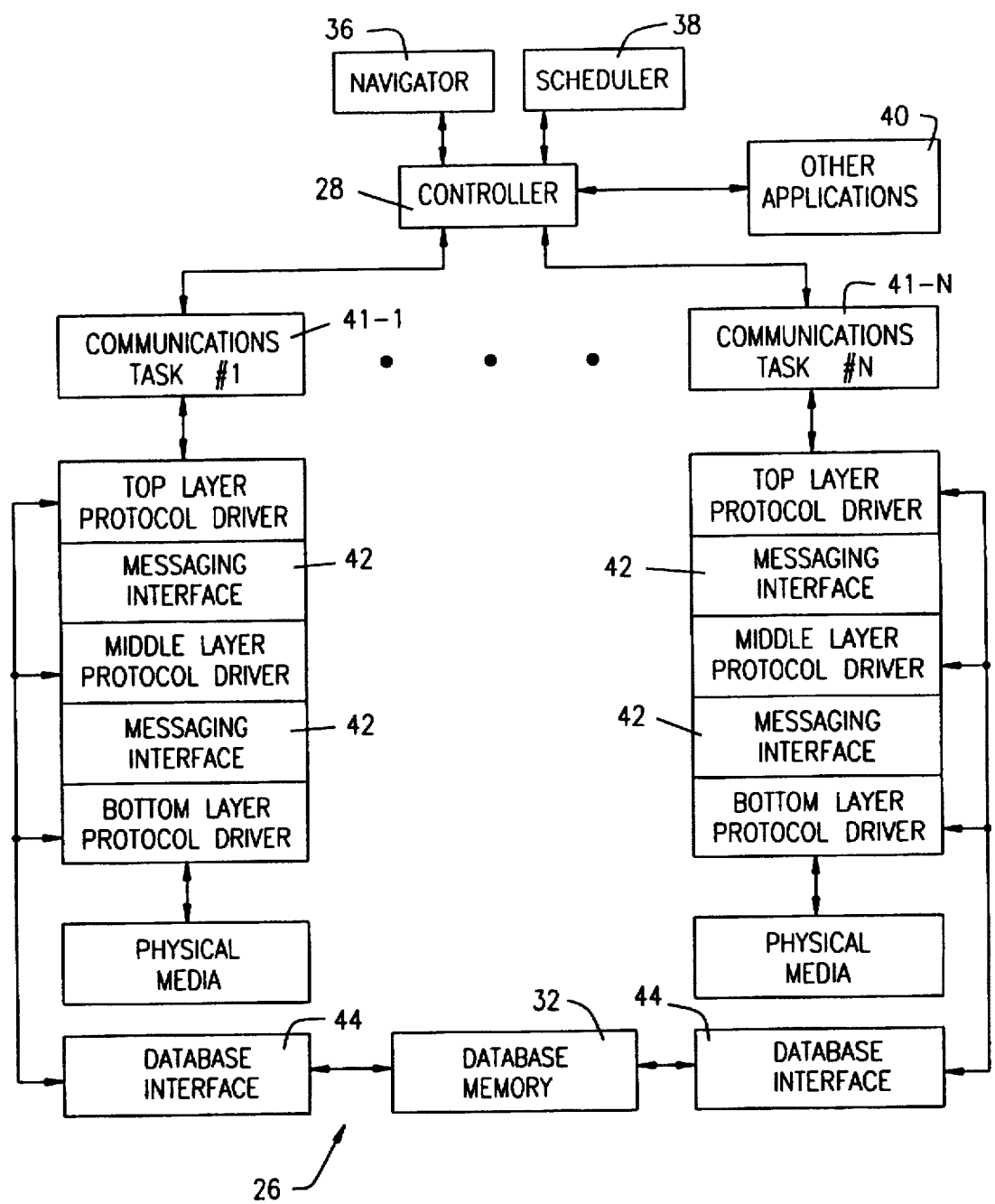
FIG. 2 is a conceptual hardware/software block diagram of the communications server incorporated in the system of FIG. 1.
Figure 3:
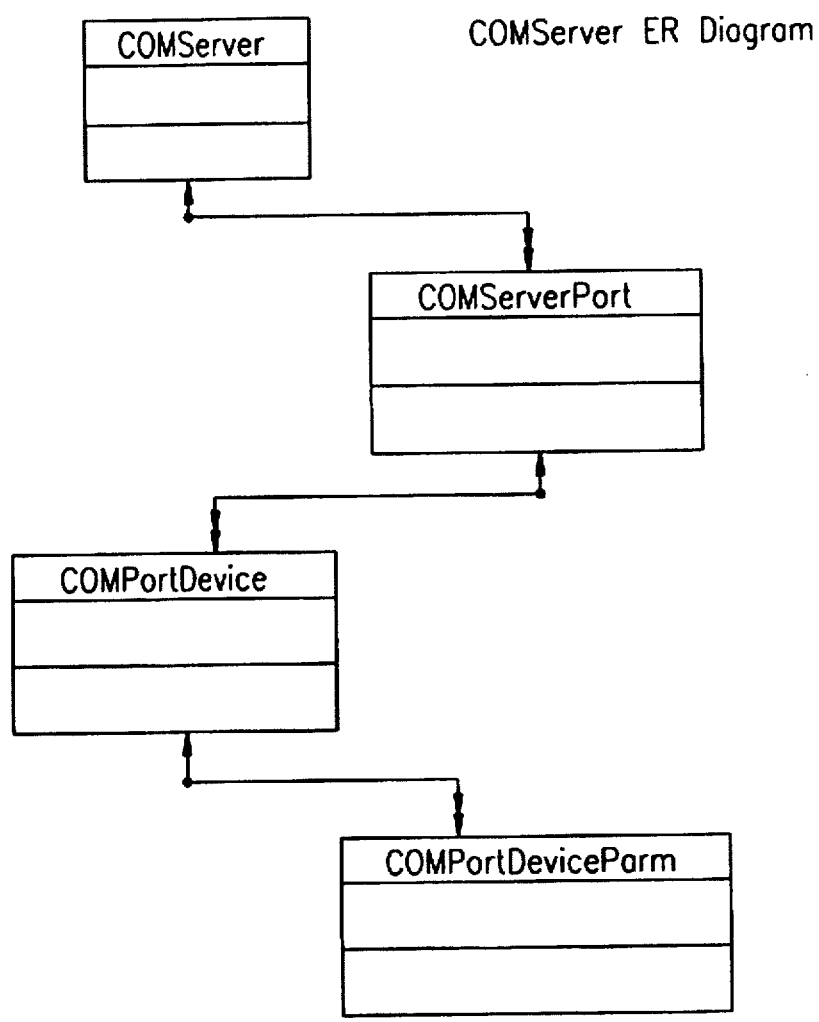
FIGS. 3–11 are exemplary entity relationship (ER) diagrams useful for understanding this invention.
Figure 4:
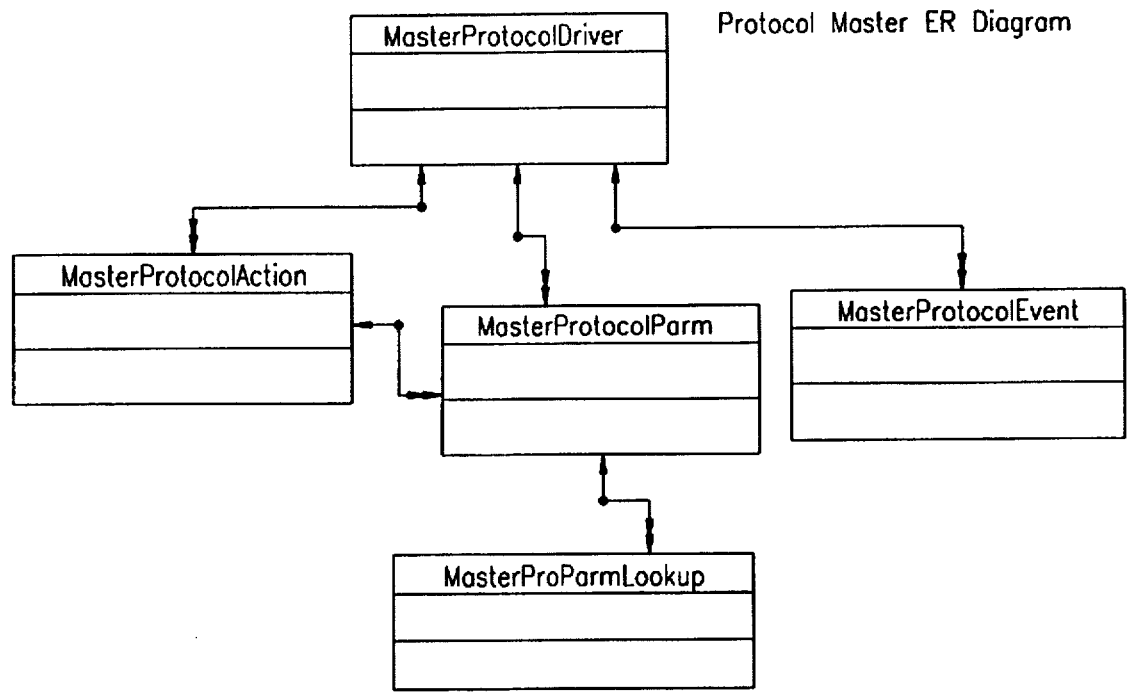
Figure 5:
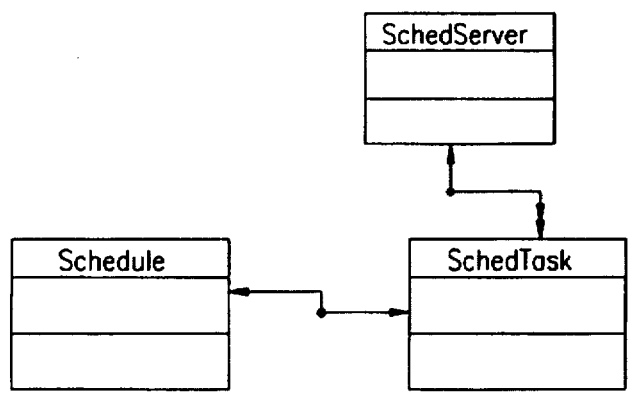
Figure 6:
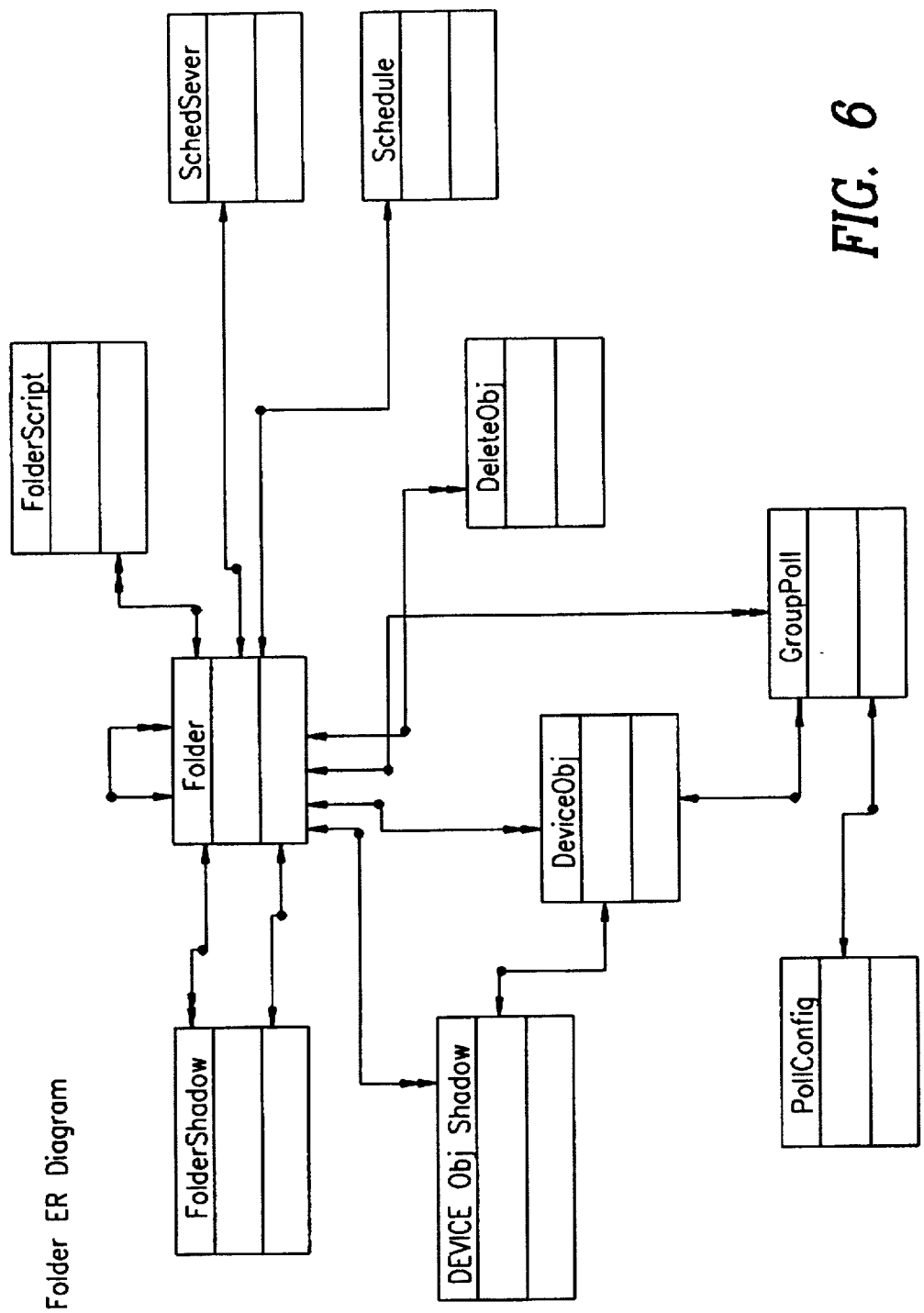

Referring to FIG. 2, shown therein is a conceptual hardware/software block diagram for the distribution automation system 26 of FIG. 1. As shown, the controller 28 receives commands, such as communications requests, from the Navigator application 36, the Scheduler application 38, or one of the other applications 40. These applications are computer-based, and may reside in the same computer as the controller 28 or in an independent free standing computer connected via a network. The Navigator 36 is under user control, includes a graphical user interface, and is preferably WINDOWS® based. By means of the Navigator 36, a user can obtain a reading from a specific one of the data gathering devices 20-1, . . . .20-N (FIG. 1), and gain access to the database memory 32. The Scheduler 38 provides an automatic polling function to interrogate the data gathering devices 20-1, . . . .20-N at regularly scheduled intervals and update the contents of the database memory 32. The other applications 40 may be developed by the user of the system to perform functions specific to that user.

The database memory 32 is organized as an object database. Illustratively, a commercially available object database, such as that offered by Objectivity/DB may be utilized. The database is organized into folders, objects, devices, points, etc., as understood in the art, and exemplary entity relationships for the database memory 32 are shown in FIGS. 3–11. By utilizing an object database as described, the database is readily expandable and scalable without any of the limitations inherent in a relational database. Thus, for example, history data of virtually unlimited size may be stored.

Figure 7:
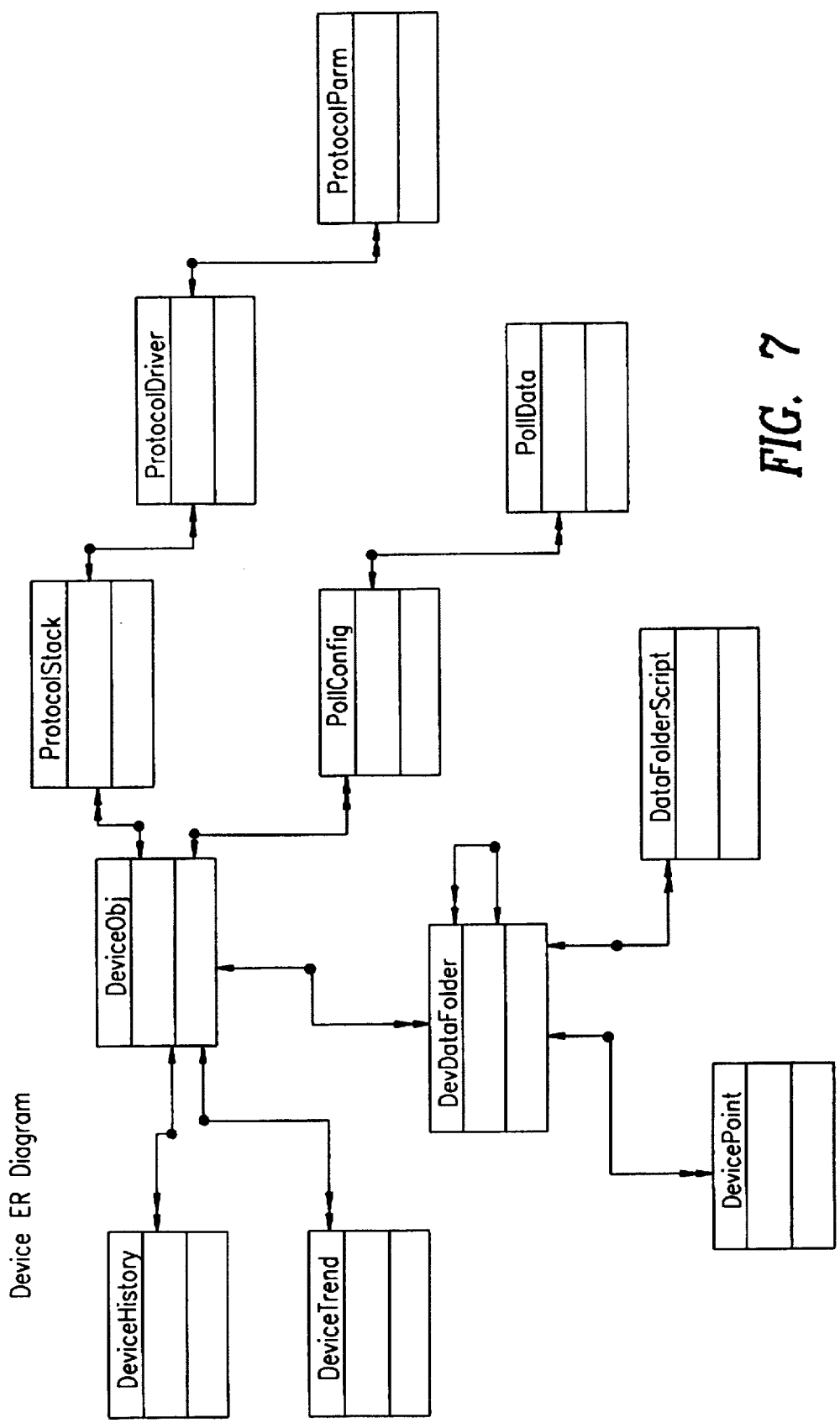
Figure 8:
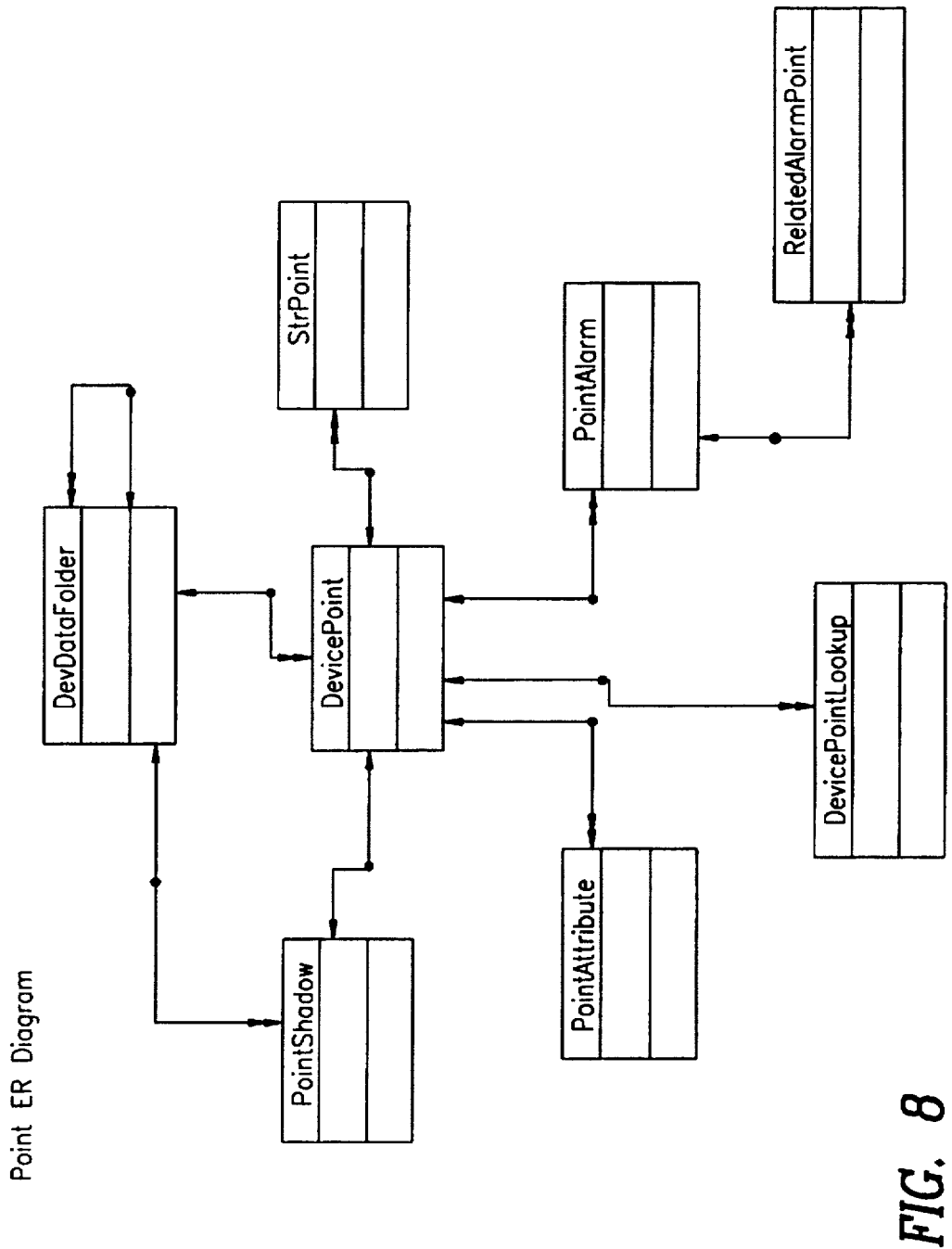
Figure 9:
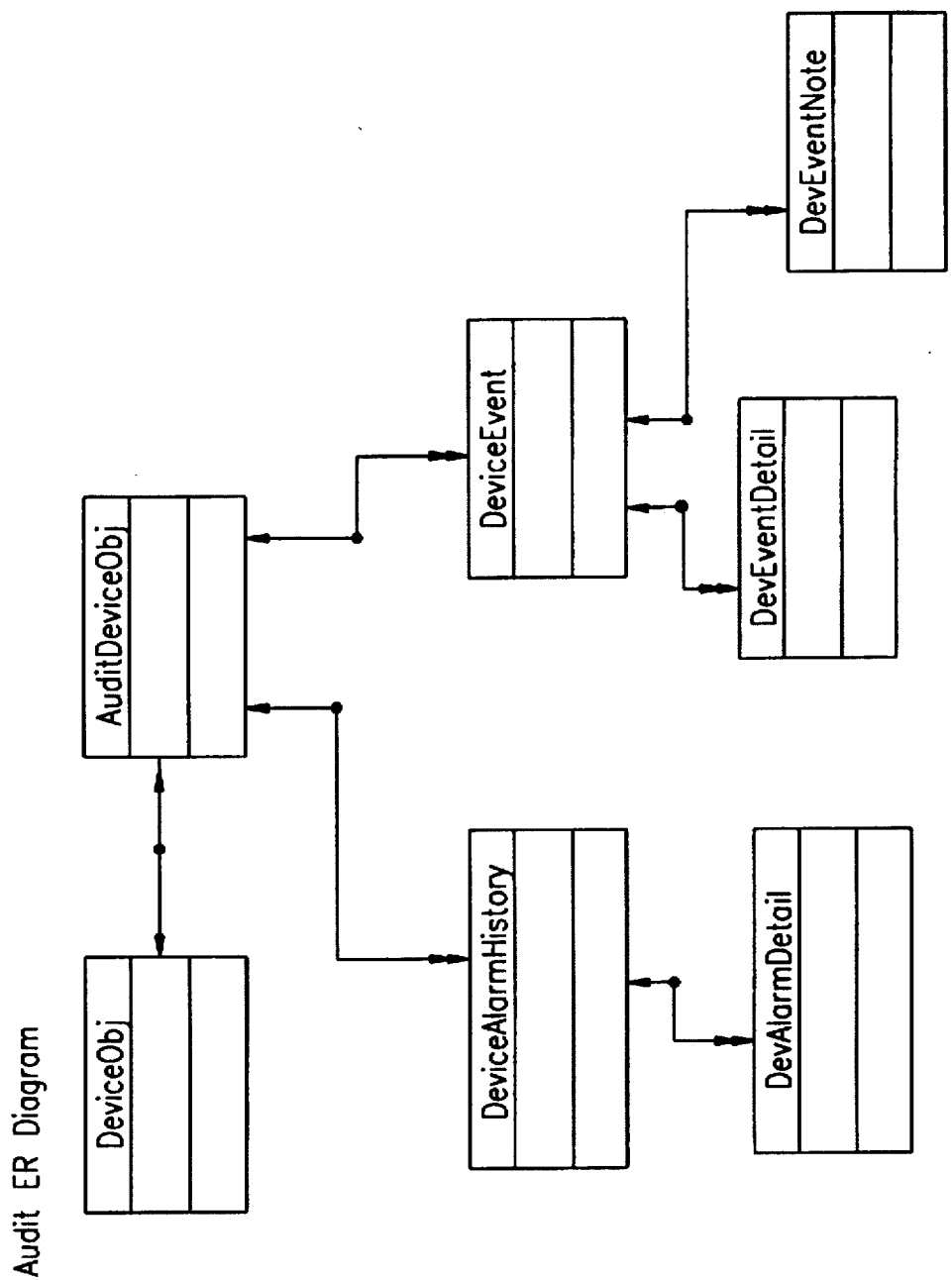
Figure 10:
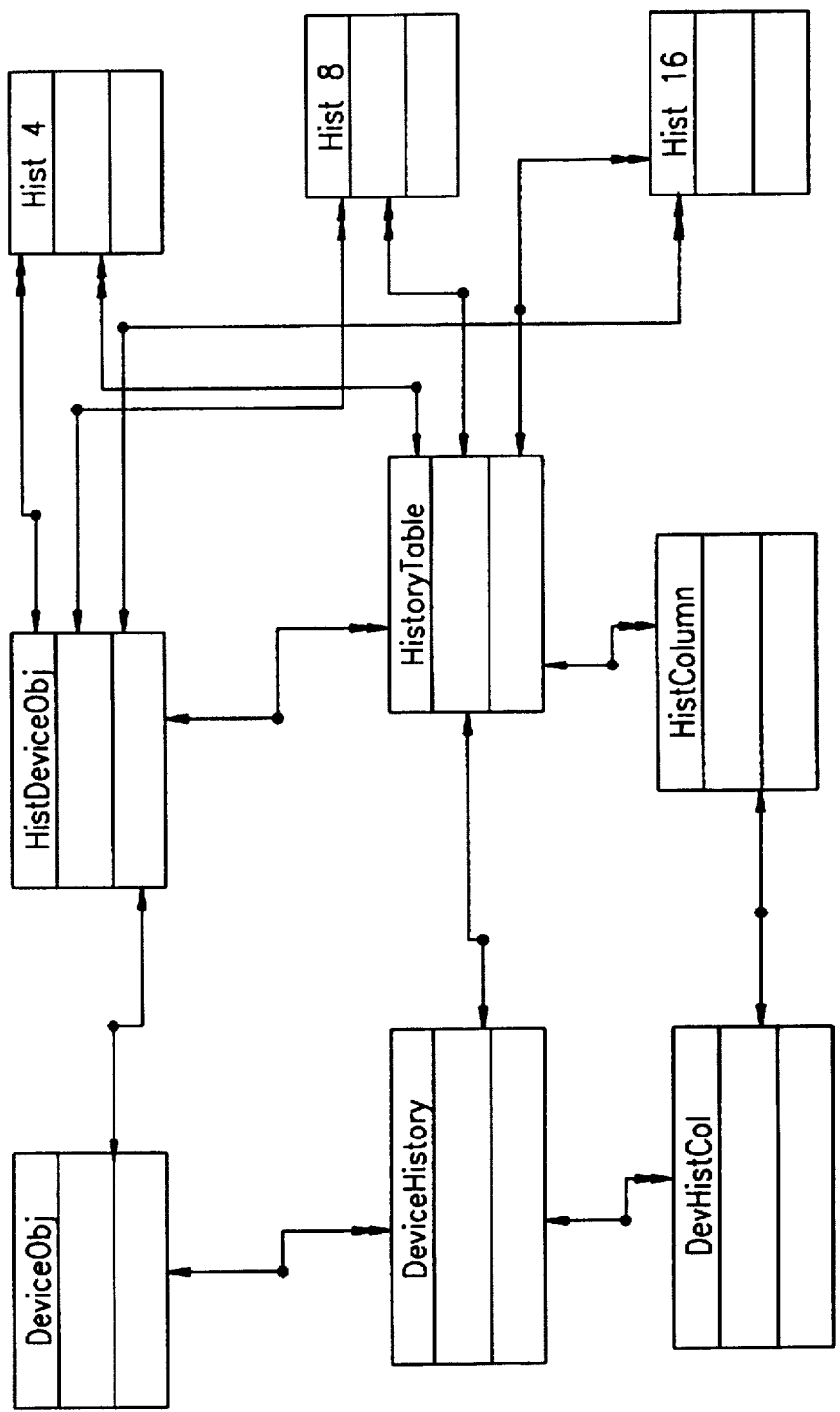
Figure 11:
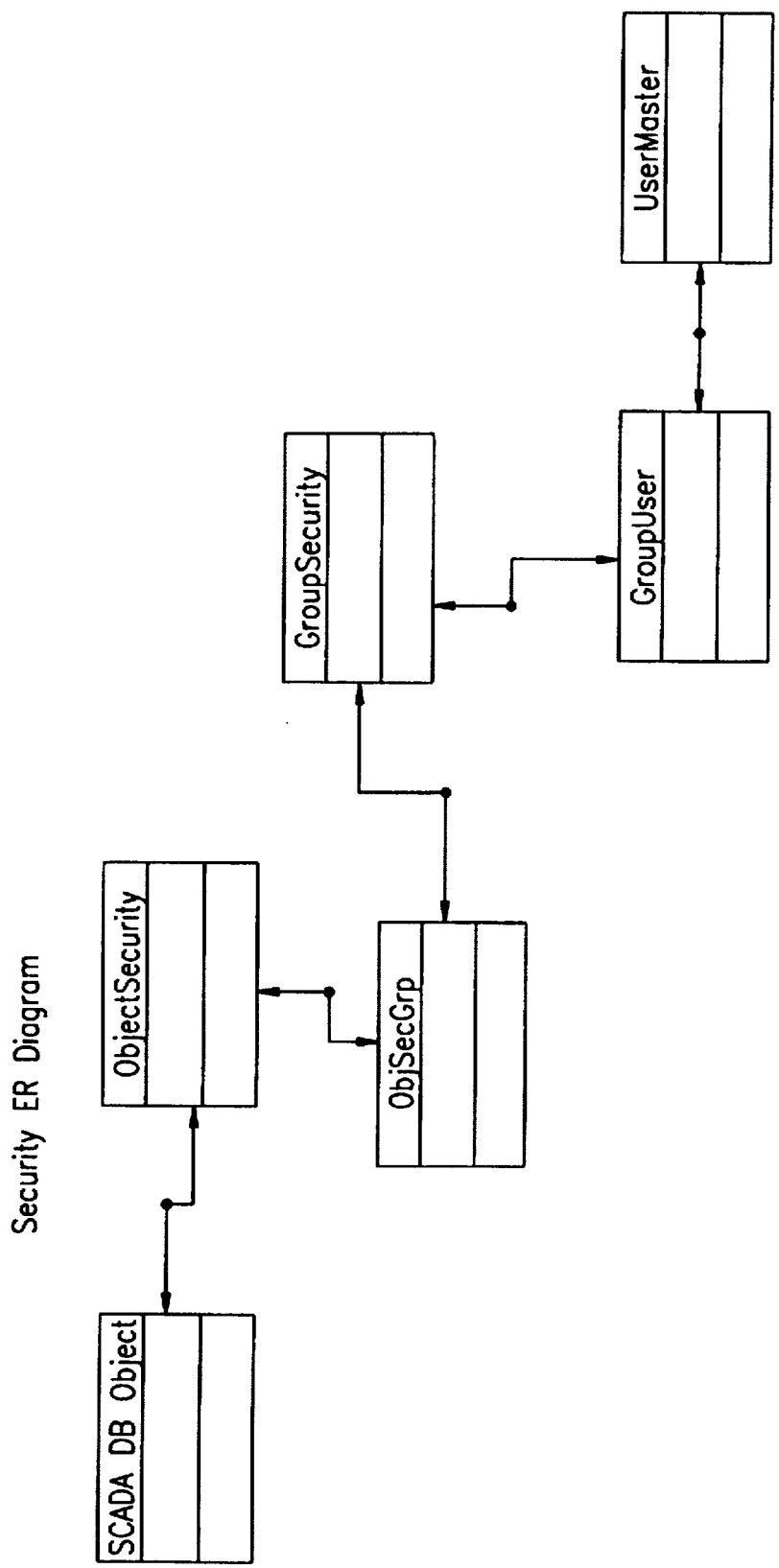

The memory 32 also stores the available protocol drivers. In accordance with established standards, such as International Standards Organization/Open Systems Interconnection (ISO/OSI) protocol drivers are stacked, or layered. The individual protocol drivers, which function as modular building blocks, are stored in the memory 32. Each of the RTUs 22-1, . . . .22-N and its associated communication medium 24-1, . . . .24-N has a predefined communications protocol for establishing communications. This communications protocol is stored in the memory 32, associated with the particular RTU, as an ordered list of protocol drivers which must be stacked to form the overall communications protocol. In addition, the database defines the data to be retrieved from the particular data gathering device (poll configuration), as well as the groups of data found within the device (device data folder) (FIG. 7).

When the controller 28 receives a communications request from one of the applications 36, 38, 40, it sets up a communications task 41-1, . . . .41-N which it assigns to one of the ports 30. Based upon the identification of the specific RTU and communications medium and the associated ordered list stored in the database memory 32, the controller 28 establishes a stack of protocol drivers in accordance with the ISO/OSI standards. Each of the protocol drivers is implemented as a dynamic link library so that multiple stacks sharing common drivers can be utilized simultaneously. A universal message interface 42 is provided in each stack between adjacent protocol drivers (see APPENDIX H). The protocol drivers have access to the database memory 32 through a universal (common) database interface 44 (see APPENDIX I).

Under certain circumstances, an RTU 22 is associated with two or more defined communications protocol because, for example, it is coupled to two or more different communications media. In that case, the communications request will specify the particular communications protocol which is to be utilized, and the controller 28 will then set up the appropriate protocol driver stack.

In the memory 32, each of the protocol drivers has associated therewith a respective object which stores action data, parameter data and event data for that protocol driver.

The aforedescribed system can be configured as a distributed data acquisition network comprising a plurality of data acquisition systems each including a system as shown in FIG. 1 and associated with a respective set of data gathering devices.

Accordingly, there has been disclosed a data acquisition system which has a plurality of remote data gathering devices each of which communicates according to a respective defined communications protocol. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

APPENDIX A

Com Server Overview

The COM Server provides multiprotocol and multimedia communications to the physical devices. The physical ports can be either standard PC com ports (with 16550 uarts on independent interrupts) or a Digiboard Xem (with up to 64 high-speed ports). The Digiboard provides the best communications handling since interrupt processing and buffers are handled completely by the Digiboard.

The COM Server is actually a number of processes running simultaneously. For each com port configured, a separate COM Task is running. Each task maintains its own link to the database for dedicated data handling for each port. Therefore, a system with 8 com ports configured would have 9 database connections (1 additional for the primary COM Server controller task).

Each task handles a protocol stack made up of dynamic link libraries (DLLs) of protocol drivers. Each protocol driver is a DLL developed with the optional Protocol Tool Kit. The protocol drivers operate in a layered configuration based on the ISO/OSI protocol layering standards. This technique allows for flexible protocol driver implementations which are independent of the physical media, and allows for reuse of already developed drivers.

The Navigator provides physical port configuration of the COM Server. The Navigator then handles configuration of device specific protocol drivers and allows on-demand requests to be sent to the COM Server. The Scheduling Server handles the AutoPolling list by sending messages to the COM Server when a poll is necessary, and then monitoring for a status message from the COM Server at the completion of a poll attempt.

APPENDIX A

COM Server Controller Task

The COM Controller is the resource manager of the COM Server. Its responsibilities are as follows:

* On startup, spawn the COM Tasks as defined in the database configuration
* Receive incoming messages from diverse requesters (ie. Navigator or Scheduler)
* Route messages to and from the appropriate COM Tasks
* Return result messages to the appropriate requesters
* Manage the availability of COM Ports
* Manage the COM Port grouping capability

APPENDIX A

COM Server COM Task

The COM Task is the port manager of the COM Server. Its responsibilities are as follows:

* Load the Protocol Drivers as defined in the database and according to the message received from the COM Controller.
* Load the Protocol Parameters for each of the Protocol Drivers from the database.
* Submit the action portion of the message received from the COM Controller to the top driver on the Protocol Stack for processing.
* Perform point and alarm evaluations on data points received from the device.
* Return result messages to the COM Controller
* Unload the Protocol Drivers and their parameters when the request is completed

APPENDIX A

COM Server Protocol Stack

The Protocol Stack is the most dynamic component of the COM Server. Its responsiblities are as follows:

* Provide a protocol handling mechanism to accomplish communications to mixed remote devices on mixed media
* Allow multiple protocol stacks for a single device
* Provide a flexible programming environment for the on-going development of Protocol Drivers The Protocol Stack is actually made up of a layered set of Protocol Drivers (or DLLs, Dynamic Link Libraries). Each Protocol Driver handles a different portion of the actual communications, as defined by the ISO/OSI layered model. For example, an Eagle Research RTU connected to a dialup line would require the following Protocol Drivers (starting at the 'top' of the stack): Eagle Hex Protocol, Hayes Modem, and RS232. Each Protocol Driver has its own set of parameters as defined by the original developer and recorded in the database. Each incoming request from the COM Controller to the COM Task can cause a different Protocol Stack to be loaded, thereby allowing multiple protocols to be managed on each port.

A single device can be communicated with over multiple media (such as radio, cellular phone, and direct) and/or protocols (such as Eagle Hex and Teledyne) through the use of multiple Protocol Stacks associated with that device. The Protocol Stack to be used is determined by the requester and included in the message to the COM Server.

The Protocol Driver layering capability is accomplished via the use of a well defined API (Application Programming Interface). This mechanism allows the Protocol Driver developer, using the Protocol Tool Kit, to reuse the capabilities of other already developed Protocol Drivers.

APPENDIX A

COM Server Protocol Tool Kit

The Protocol Tool Kit is the programming environment for the Protocol Stacking mechanism of the COM Server. Its responsiblities are as follows:

* Provide access to the database through common objects (such as histories, points, and groups of points)
* Provide a common messaging API between Protocol Drivers
* Provide access to the Protocol Driver's own parameters
* Provide access to the physical layer (such as RS232)
* Provide cross-platform portability for Protocol Drivers written to the Protocol Tool Kit's API
* Allow the Protocol Driver to be written in C, C++, or Basic

APPENDIX A

COM Server AutoAnswer

Auto-Answer (AA, sometimes referred to as Report-by-Exception or dial-in) allows the host to recognize a remote device when it is calling in. This capability is accomplished through the use of a special protocol driver designated as the Auto-Answer Protocol Driver (AAPD, this driver is based on the Pantheon BasicScript driver for easy customization). The overall mechanism is accomplished as follows:

* COM Port(s) are designated as AA ports in the database
* Devices associated with the same AA port are given unique IDs in the database
* At startup, the COM Server treats AA ports in a special manner. COM Tasks on AA ports load the base protocol stack (as defined in the COM Server config), along with the designated AAPD for that port.
* The COM Task reserves the 'top' layer of the protocol stack for the Protocol Driver to be determined by the AAPD.
* The AAPD continuously monitors the port for an incoming call.
* When the AAPD has recognized the incoming protocol, the database is searched for the unique ID of the device recognized. Note that in order to facilitate recognition of devices calling in, a unique ID must be assigned to each device associated with a single AA COM Port.
* Upon identifying the device in the database, a standard polling message is constructed (as determined by a poll setup in the database to be associated with an AA for the device)
* The polling message is then submitted back to the COM Task for processing as a standard request.
* The COM Task then loads the appropriate 'top' layer Protocol Driver for the device and disables the AAPD in the stack (placing it in a pass-thru mode)
* Once the transaction is completed, the COM Task unloads the selected Protocol Driver and the AAPD is re-enabled to begin the process of monitoring the port again.

Note that if it is difficult (or not possible) to distinguish among certain types of protocols on the same port, additional AAPDs can be used to recognize protocols on separate ports. Different AAPDs can exist on different ports, each recognizing different protocols or sets of protocols. The AAPD is simply a BasicScript Protocol Driver, with all of the same services as a standard Protocol Driver.

APPENDIX A　　　　　　　　　　21

COM Server Multidrop

Multidrop allows the COM Server to manage multiple devices on a single connection. The Multidrop capability of the COM Server includes the following:

* Devices on a multidrop link are specially grouped in the database to indicate their physical relationship
* Devices on a multidrop link can be connected to individually, or as a group during the same connection.
* When polling a multidrop link as a group, each device can be polled individually, but the connection to the multidrop is maintained until the last specified poll is completed for the link.

Example multidrop links would be:

* Multiple EFCs connected on a multidropped RS232 link to a primary modem over a single phone line
* A radio system, which can be connected to remotely over a standard modem link.

96009

APPENDIX A 22

COM Server Polling

Polling is a generic deivce communication action supported by all protocol drivers. Using the Navigator, a user configures a poll by dropping objects (such as points, groups of points, and histories) into a poll group. The poll group can then be scheduled or issued to the COM Server on demand. The poll information is then submitted to the Top Layer protocol driver for processing. Poll processing is the responsibility of the protocol driver, since different devices handle the objects (such as points and groups of points) in different manners.

When a protocol driver completes a poll, the COM Task invokes point and alarm evaluation routines. Point evaluation will perform any user-defined calculations on data points received from the device for the given poll. Alarm evaluation will check alarm limits and any user-defined alarm processing for each point received from the device for the given poll.

APPENDIX A 23

Protocol Tool Kit Stack API

The Stack API (Application Programming Interface) of the Protocol Tool Kit provides a simple set of protocol independent control commands for passing data through the layers of a Protocol Stack. The commands include Connect, Send, Receive, and Disconnect.

APPENDIX A

Protocol Tool Kit Database Interface

The Database API (Application Programming Interface) of the Protocol Tool Kit provides functions for manipulating common device data objects, such as points, groups of points, histories, audit trails, and alarms.

APPENDIX A

COM Server Client Applications

Client applications of the COM Server include the Navigator and Scheduler. The Navigator can submit on-demand polling requests. The Scheduler handles AutoPolling requests. The COM Server will respond to the client application with a completion status (such as Success or Failure).

APPENDIX A

Protocol Drivers

A Protocol Driver is a DLL (dynamic link library) which has been constructed using the Protocol Tool Kit. Protocol Drivers can be developed using C, C++, or Basic (using the special BasicScript Protocol Driver).

The layering of the Protocol Stack allows a number of Protocol Drivers to be "stacked" on top of each other. The Bottom Layer handles physical media (such as RS232). The Middle Layer handles connection media (such as a modem, a code-operated switch, or an encapsulation protocol). Zero of more drivers may be configured in the Middle Layer depending on the physical configuration. The Top Layer driver handles the device specifc protocol.

Each protocol driver within the layered Protocol Stack communicates with the next layer using the Protocol Stack API (Application Programming Interface). This API provides simple protocol independent control commands, such as Connect, Send, Receive, and Disconnect. This mechanism allows a higher level protocol driver to be independent of the physical media and connection layers (according to the original intent of the ISO/OSI model). This technique also allows reuse of protocol drivers, since the Protocol Stack API defines the interface between each driver. For example, the Modem and RS232 drivers can be used interchangeably with other higher level protocol drivers, and higher level protocol drivers can use different middle and bottom layer drivers to accomplish diverse physical operating conditions.

Protocol Drivers are registered in the database by providing information such as Actions, Parameters, and Events. Additionally, the database manages common objects required by devices, such as points, groups of points, histories, audit trails, and alarms. Diverse protocol driver requirements can thus be handled without restrictions.

APPENDIX A

Physical Media

Using the RS232 Protocol Driver, the COM Server supports standard PC serial ports and Digiboard multiport cards. For PC serial ports, up to 4 serial ports on independent interrupts using 16550 UARTS (hi-speed serial) are supported. Using the Digiboard Xem series, a large number of ports can be supported using combinations of the 8 or 16 port expansion boards (up to 32 ports using 8 port boxes, and up to 64 ports using 16 port boxes).

Other types of Physical Media can be supported by developing a Bottom Layer protocol driver using the Protocol Tool Kit.

APPENDIX A

Master Information

The Com Server consists of a number of various executable files as well as dynamic link libraries which must exist in the current directory in order for the Com Server to execute properly. Below is a summary of these various files:

| File | Description |
|---|---|
| Comserv.exe | Comserv.exe is the main Com Server executable. This executable is responsible for initiating Com Server Startup when passed the proper Parameters. |
| Comcntrl.exe | Comcntrl.exe is the Com Server Controller Task executable. This executable is invoked automatically by Comserv.exe and is responsible for reading the current Com Server Configuration from the database and invoking all necessary Com Tasks which will be needed to support that configuration. After all Com Tasks are started, the Controller Task then receives incoming network messages passed to the Com Server and passes the messages on to the appropriate Com Tasks. |
| Comtask.exe | Comtask.exe is the Com Server Task executable. This executable is started automatically by the Controller Task for each port which has been configured in the system. The Com Task is responsible for Protocol Stack manipulation for its associated com port. |
| Evaluate.dll | Evaluate.dll is the Com Server Evaluation link library. This dynamic link library evaluates incoming data for current alarms, script calculation, etc. |
| DB3Int.dll | DB3Int.dll is the 3rd Party Database interface dynamic link library. This link library is part of the Protocol Tool Kit which enables protocol drivers to process incoming data to the database. |
| RS232Drv.dll | RS232Drv.dll is the RS232 Communications Protocol Driver. This Protocol Driver gives higher level protocol drivers access to the Physical Media Layer. |
| Supercom.dll | Supercom.dll is a dynamic link library which must reside in the same directory as the RS232 Protocol Driver for communications to be successful. |

APPENDIX A

Actions

There are 2 main actions associated with the Communications Server: Startup and Shutdown. A Communications Server can only be started after it has been properly configured through the Navigator. Configuring a Communications Server requires the user to establish a Com Server Name, Receive Que and Network Instance, as well as Port Configuration and Port Grouping. Once the Communications Server has been properly configured, it may be started by executing Comserv.exe with the appropriate Parameters.

Communications Server Shutdown is invoked from the Navigator. When the Communications Server receives a Shutdown request, all Network and Database connections used by the Communications Server will be terminated. If polls are ongoing while a Shutdown request is received, the polls will be allowed to finish before the Shutdown request is honored.

APPENDIX A

Parameters

The following parameters must be supplied when starting a communications server:

| | |
|---|---|
| ComServerName | The name of the Communications Server which is to be started. This must be the name of a Communications Server which has been configured using the Navigator. |
| DBServerName | The name of the Database Server to which the Communications Server will connect. |
| DBUserName | The Database Login User Name to be used by the Communications Server. |
| DBPassword | The Database Login Password to be used by the Communications Server. |

APPENDIX A

Events

All communications events are written to the Com Event Table of the Scada Database. Each Protocol Driver must define all events that it may generate by entering these events into the Master Protocol Event Table of the Masters Database. Communications event writing is facilitated by the Protocol Tool Kit Database Interface.

APPENDIX A    32

Database Objects

All configuration information about a Communications Server is stored in the Com Server Table of the Scada Database. Below is a brief description of the fields of this table:

| | |
|---|---|
| COMServerID | A unique identifier for a Communications Server entry. |
| ServerName | The name of the configured Communications Server. |
| Enabled | Indicates if the Communications Server can currently be activated. |
| Up | Indicates if the Communications Server is currently executing. |
| RecvQName | The name of the IPC Queue which the communications server will use to receive incoming messages. |
| NetIPCName | The name of the network instance which the Communications Server will use. |

Each of the configured ports for a communications server has an entry in the Com Server Port Table of the Scada Database. Below is a brief description of the fields of this table:

| | |
|---|---|
| COMServerID | Relates a Communications Port to a Communications Server. |
| COMPort | An integer value 1..32 identifying a particular Communications Port. |
| COMGroup | Indicates which Communications Group a particular Communications Port is associated with. |
| Enabled | Indicates whether the Communications Port can currently be activated. |
| AutoAns | Indicates if the Communications Port can receive incoming calls. |

96009

APPENDIX B  33

SCADA

The SCADA database contains configuration data for devices, communication servers, scheduling servers, and objects used by the Navigator for data presentation (such as folders).

Security Tables:
ObjectSecurity
ObjSecGrp

Scheduler Tables:
Schedule
SchedServer
SchedTask

Navigator Desktop Tables:
Folder
FolderShadow
DeleteObj
FolderScript

Device Configuration Tables:
DeviceObj
DeviceObjShadow
ProtocolStack
ProtocolDriver
ProtocolParm
DevDataFolder
DataFolderShadow
DataFolderScript
DevicePoint
DevicePointLookup
PointShadow
StrPoint
PointAttribute
ChangedPoint
DeviceHistory
DevHistCol
DevHistScript
DeviceTrend
DeviceTrendCol
PollConfig
PollData
GroupPoll
PointAlarm
RelatedAlarmPoint

96009

APPENDIX B

96009
COM Server Tables:
COMServer
COMServerPort
COMPortDevice
COMPortDeviceParm
COMEvent

APPENDIX B                           35

ObjectSecurity

This table acts as a common point of reference for any other object in the SCADA database. It acts as a one-to-one relationship with an object which has security associated with it. Security groups associated with this object are connected in ObjSecGrp.

Columns:

| Name | Type | Description |
|---|---|---|
| ObjectSecurityID | rowid | Unique identifier (row address) used for joining any object to a security object. |
| Enabled | char(1) | Y/N: Is security enabled for this object? |

Indexed Columns:

none

Predefined Joins:

none

APPENDIX B                              36

ObjSecGrp

This table defines security groups which are associated with an object (as referenced in ObjectSecurity).

Columns:

| Name | Type | Description |
|------|------|-------------|
| ObjectSecurityID | rowid | This is a reference back to the ObjectSecurity table |
| GroupID | int | Refers to Groups in the Security database |

Indexed Columns:

none

Predefined Joins:

ObjectSecurityID -> ObjectSecurity.ObjectSecurityID

APPENDIX B                    37

Schedule

This table contains schedules used by the Scheduling Server for automating tasks. Schedules are associated (joined) with several other objects, including PollConfig, Folder (for group scheduling), and SchedServer.

Columns:

| Name | Type | Description |
| --- | --- | --- |
| SchedID | rowid | unique identifier (row address) used to join to other objects |
| IconID | int | used by the Navigator |
| Seq | int | used by the Navigator |
| NextExecTime | timestamp | Next planned execution time |
| LastExecTime | timestamp | Last execution time |
| LastExecAttempt | smallint | Failed, aborted, or successful? |
| Timing | smallint | Interval, CRON, or event? |
| Enabled | char(1) | Y/N: enabled or disabled? |
| ExpectResponse | char(1) | Y/N: expect reponse from executing program (ie. COM Server) |
| Drift | char(1) | Y/N: If interval, drift time from last execution time? |
| FailRetryDelay | smallint | seconds: how long to wait if last try failed. |
| MaxRetries | smallint | limit number of retries before reschedule |
| StopAfterFail | char(1) | Y/N: if retries exceeded, then stop trying altogether? |
| SyncHr | smallint | sync interval to a given hour |
| SyncMn | smallint | sync interval to a given minute |
| SyncSc | smallint | sync interval to a given second |
| Mo | char(20) | cron months |
| DayOfMo | char(20) | cron days of month |
| DayOfWk | char(20) | cron days of week |
| Hr | char(20) | cron hours |
| Mn | char(20) | cron minutes |
| Sc | char(20) | cron seconds |

Indexed Columns:

none

Predefined Joins:

none

APPENDIX B						38

SchedServer

This table is used for registering a Scheduling Server in the database. It is used in conjunction with SchedTask to define the Scheduling Server's job list.

Columns:

| Name | Type | Description |
|---|---|---|
| ServerRowID | rowid | unique identifier (row address) used to join to tasks |
| ServerID | int | unique logical identity for this server |
| Seq | int | used by Navigator |
| Name | char(32) | user-defined name |
| Enabled | char(1) | Y/N: enabled? |
| Up | char(1) | Y/N: currently running? |
| RecvQName | char(32) | Network message receive que name |
| NetIPCName | char(32) | Network message server name |
| Visible | char(1) | The remaining columns are used by Navigator |
| IconID | int | |
| IconX | int | |
| IconY | int | |
| OpenCornerX | int | |
| OpenCornerY | int | |
| OpenSizeX | int | |
| OpenSizeY | int | |

Indexed Columns:

unique ServerID

Predefined Joins:

none

APPENDIX B 39

SchedTask

This table defines tasks associated with SchedServer.

Columns:

| Name | Type | Description |
|---|---|---|
| TaskRowID | rowid | unique identifier (row address) for this task for joins |
| ServerID | int | logical reference to SchedServer |
| TaskID | int | used with ServerID to uniquely identify this task |
| UserID | int | used if a user is associated with this task |
| SchedID | rowid | direct reference to the schedule info in Schedule. |
| TaskType | int | AutoPoll, Execute external cmd, or Message Transmit |
| QueName | char(32) | target message que if this is a Message Transmit |
| PrinterGroupID | int | optional associated PrinterGroup |
| MsgType | smallint | execute, shutdown, status, ... |
| SendQueName | char(32) | message que name of application to send message to |
| Action | char(40) | path/filename of external program to execute |
| Parms | char(80) | parms to pass to program or with message |
| Description | char(80) | informative description |
| IconID | int | used by Navigator |
| Seq | int | used by Navigator |
| ParentObj | rowid | join to associated SchedServer |

Indexed Columns:

unique ServerID, TaskID

Predefined Joins:

ParentObj -> SchedServer.ServerRowID
SchedID -> Schedule.SchedID

APPENDIX B                          40

Folder

Folder objects are powerful container style objects used by the Navigator. Folders can contain folders. Folder objects are also used as starting points for other types of objects; such as process graphics models, device container folders, history database containers, trashcans, poll groups and others.

Columns:

| Name | Type | Description |
|---|---|---|
| FolderID | rowid | unique identifier (row address) used for joins |
| Seq | int | used in the Navigator |
| Name | char(32) | user-defined name |
| ObjectType | smallint | Folder, DeviceFolder, HistFolder, trashcan, etc... |
| RefName | char(32) | reference to external objects (ie. models, or db names) |
| ParentObj | rowid | reference to parent container folder; null if parent is desktop |
| SchedServerRowID | rowid | reference to SchedServer if this is a PollGroup |
| SchedID | rowid | reference to Schedule if this is a PollGroup |
| Visible | char(1) | used by the Navigator for trashcan objects |
| ShadowCount | smallint | number of shadows pointing to this object |
| BackdropID | int | reference to PictureLookup |
| IconID | int | reference to PictureLookup |
| IconX | int | used by Navigator |
| IconY | int | used by Navigator |
| IsSelected | char(1) | used by Navigator |
| IsTemplate | char(1) | used by Navigator |
| OpenCornerX | int | used by Navigator |
| OpenCornerY | int | used by Navigator |
| OpenSizeX | int | used by Navigator |
| OpenSizeY | int | used by Navigator |
| SecurityID | rowid | reference to ObjectSecurity for security information |

Indexed Columns:

none

Predefined Joins:

ParentObj -> Folder.FolderID
SchedServerRowID -> SchedServer.ServerRowID
SchedID -> Schedule.SchedID
SecurityID -> ObjectSecurity.ObjectSecurityID

APPENDIX B                          41

FolderShadow

Shadows are objects in the Navigator which allow different views of data to be created. A shadow allows a reference to the original object to be created without copying the object.

Columns:

| Name | Type | Description |
| --- | --- | --- |
| ParentObj | rowid | reference to parent container; null if parent is the desktop |
| OriginalObj | rowid | reference to the original folder object |
| IconID | int | reference to PictureLookup |
| IconX | int | used by Navigator |
| IconY | int | used by Navigator |
| IsSelected | char(1) | used by Navigator |

Indexed Columns:

none

Predefined Joins:

ParentObj -> Folder.FolderID
OriginalObj -> Folder.FolderID

APPENDIX B                              42

DeleteObj

DeleteObj is used to create the entries in the trashcan folder object which reference the objects to be deleted. This is similar to a shadow object, since it is referencing the original object. The original object continues to exist (but not visible) until the trashcan is emptied (when they are physically deleted).

Columns:

| Name | Type | Description |
| --- | --- | --- |
| TrashCanID | rowid | reference to the parent container (trashcan folder) |
| Seq | int | used by Navigator |
| ObjectType | smallint | type of object being referenced |
| ObjectName | char(32) | name of object being referenced |
| DBName | char(32) | used if the object is in another database |
| OriginalObj | rowid | reference to the actual object |

Indexed Columns:

none

Predefined Joins:

TrashCanID -> Folder.FolderID

APPENDIX B    43

FolderScript

FolderScript associates basic scripts with folders. Scripts can, therefore, be created which operate on the contents of a folder.

Columns:

| Name | Type | Description |
| --- | --- | --- |
| ScriptID | int | reference to the script in ScriptMaster |
| IconID | int | used by Navigator |
| Seq | int | used by Navigator |
| ParentObj | rowid | reference to associated folder |

Indexed Columns:

none

Predefined Joins:

ParentObj -> Folder.FolderID

APPENDIX B 44

DeviceObj

DeviceObj is the root object of the device's configuration tables. Devices are contained in device folders.

Columns:

| Name | Type | Description |
|---|---|---|
| DeviceID | rowid | unique identifer (row address) for use in joins |
| DeviceAcctNum | char(32) | unique logical identifier for this device |
| Name | char(32) | user-defined name |
| RemoteAddr | char(32) | Remote address (ie. SiteID) of the device |
| AlphaPagerMsg | char(10) | message for character (alpha) pagers |
| DigiPagerMsg | int | message for numeric (digital) pagers |
| Seq | int | used by Navigator |
| ParentObj | rowid | reference to containing folder object |
| Visible | char(1) | used by Navigator |
| ShadowCount | smallint | number of shadows pointing to this device |
| IconID | int | reference to PictureLookup |
| IsSelected | char(1) | used by Navigator |
| IsTemplate | char(1) | used by Navigator |
| DeviceTime | timestamp | Clock value in the device |
| TimeZone | smallint | time zone for this device |
| AllowReset | char(1) | Y/N: allow automatic reset of device's clock |
| TimeDiffReset | int | +/- seconds difference allowed before resetting clock |
| Longitude | double | GPS parameter |
| Latitude | double | GPS parameter |
| Elevation | double | GPS parameter |
| DeviceMfr | int | refers to MfrMaster |
| MfrModel | int | refers to MfrModelMaster |
| OpenCornerX | int | used by Navigator |
| OpenCornerY | int | used by Navigator |
| OpenSizeX | int | used by Navigator |
| OpenSizeY | int | used by Navigator |
| Created | timestamp | for auditing |
| Updated | timestamp | for auditing |
| ObjectFlags | int | used by Navigator |
| SecurityID | rowid | reference to ObjectSecurity |
| AuditDB | char(32) | name of DB with corresponding audit & alarm histories |
| ArchEventTask | rowid | references to archive tasks for specific audit histories |
| ArchEventMode | smallint | 0=delete data; 1=save data |
| ArchAlarmTask | rowid | |
| ArchAlarmMode | smallint | |
| ArchCOMEventTask | rowid | |
| ArchCOMEventMode | smallint | |

Indexed Columns:

unique DeviceAcctNum
Name
RemoteAddr

96009

APPENDIX B 45

Predefined Joins:

ParentObj -> Folder.FolderID
SecurityID -> ObjectSecurity.ObjectSecurityID
ArchEventTask -> SchedTask.TaskRowID
ArchAlarmTask -> SchedTask.TaskRowID
ArchCOMEventTask -> SchedTask.TaskRowID

APPENDIX B                           46

DeviceObjShadow

DeviceObjShadow allows a device object to be shadowed.

Columns:

| Name | Type | Description |
| --- | --- | --- |
| Seq | int | used by Navigator |
| IconID | int | reference to PictureLookup |
| ParentObj | rowid | reference to container folder |
| OriginalObj | rowid | reference to original device object |

Indexed Columns:

none

Predefined Joins:

ParentObj -> Folder.FolderID
OriginalObj -> DeviceObj.DeviceID

96009

APPENDIX B 47

ProtocolStack

ProtocolStack allows 1 or more stacks to be defined for a device. Associated tables include ProtocolDriver and ProtocolParm.

Columns:

| Name | Type | Description |
| --- | --- | --- |
| PStackID | rowid | unique identifier (row address) for this stack used for joins |
| DeviceID | rowid | reference to the associated device |
| IconID | int | reference to PictureLookup |
| Seq | int | used by Navigator |
| Name | char(32) | user-defined name |
| DefStack | char(1) | Y/N: default stack |
| COMServerID | int | reference to associated COM Server |
| COMGroup | smallint | associated COM Server group for this stack |
| COMPort | smallint | associated COM Server port for this stack |

Indexed Columns:

none

Predefined Joins:

DeviceID -> DeviceObj.DeviceID

APPENDIX B 48

ProtocolDriver

ProtocolDriver is used in conjunction with ProtocolStack to define the stack of protocol drivers. ProtocolParm is then associated with each ProtocolDriver to allow device specific parms for each driver.

Columns:

| Name | Type | Description |
|---|---|---|
| PDriverID | rowid | unique identifier (row address) for joining to ProtocolParm |
| PStackID | rowid | reference to associated ProtocolStack |
| ProtocolID | int | reference to the associated protocol driver |
| Name | char(32) | protocol driver name |
| Seq | int | used by Navigator |
| IconID | int | reference to PictureLookup |

Indexed Columns:

none

Predefined Joins:

PStackID -> ProtocolStack.PStackID

APPENDIX B                              49

ProtocolParm

ProtocolParm contains protocol parameters for each protocol driver in a protocol stack.

Columns:

| Name | Type | Description |
| --- | --- | --- |
| PDriverID | rowid | reference to associated protocol driver |
| ParmID | int | unique parms within each protocol driver |
| Seq | int | used by Navigator |
| ParmValue | char(20) | parameter value |
| ActionID | int | if there is an associated action |

Indexed Columns:

none

Predefined Joins:

PDriverID -> ProtocolDriver.PDriverID

APPENDIX B                              50

DevDataFolder

DevDataFolder allows points to be group within a device. A DevDataFolder can also contain other DevDataFolders, thus allowing flexible modeling of data within a device.

Columns:

| Name | Type | Description |
|---|---|---|
| DevDataFolderID | rowid | unique identifier (row address) used for joins |
| Name | char(32) | user-defined name |
| ObjectType | smallint | type of folder (ie. point list, data folder, ...) |
| Visible | char(1) | used by Navigator |
| ShadowCount | smallint | used by Navigator |
| DeviceID | rowid | reference to the parent device object for this data folder |
| ParentObj | rowid | reference to a parent folder (if contained in another folder) |
| DeviceAddress | int | optional physical address for a group (folder) of points |
| Seq | int | user-defined sequence in relation to other folders |
| IsSelected | char(1) | used by Navigator |
| IsTemplate | char(1) | used by Navigator |
| IconID | int | reference to PictureLookup |
| OpenCornerX | int | used by Navigator |
| OpenCornerY | int | used by Navigator |
| OpenSizeX | int | used by Navigator |
| OpenSizeY | int | used by Navigator |
| ObjectFlags | int | used by Navigator |
| SecurityID | rowid | reference to related security object |

Indexed Columns:

none

Predefined Joins:

DeviceID -> DeviceObj.DeviceID
ParentObj -> DevDataFolder.DevDataFolderID
SecurityID -> ObjectSecurity.ObjectSecurityID

96009

APPENDIX B                     51

DataFolderShadow

DataFolderShadow is used to shadow DevDataFolder objects.

Columns:

| Name | Type | Description |
|---|---|---|
| OriginalObj | rowid | reference to the original (shadowed) object |
| ParentObj | rowid | reference to the container for this object |
| DeviceID | rowid | associated device object |
| IconID | int | reference to PictureLookup |
| Seq | int | user-defined sequence for this object in relation to others |
| IsSelected | char(1) | used by Navigator |

Indexed Columns:

none

Predefined Joins:

ParentObj -> DevDataFolder.DevDataFolderID
OriginalObj -> DevDataFolder.DevDataFolderID
DeviceID -> DeviceObj.DeviceID

APPENDIX B          52

DataFolderScript

DataFolderScript is used to associate scripts with data folders. The Navigator presents scripts which can be executed to manipulate a group of data.

Columns:

| Name | Type | Description |
| --- | --- | --- |
| ScriptID | int | reference to ScriptMaster |
| IconID | int | reference to PictureLookup |
| Seq | int | user-defined sequence of this object in relation to others |
| ParentObj | rowid | reference to the associated folder object for this script |

Indexed Columns:

none

Predefined Joins:

ParentObj -> DevDataFolder.DevDataFolderID

APPENDIX B                    53

DevicePoint

DevicePoint represents data points found in devices. A DevicePoint typically corresponds to a physical data point found in the device. However, the point can also be user-defined without having a corresponding physical point. A point has several attributes which allow it to be calculated from a user-defined script and be included in a pager message. DevicePoints are grouped using DevDataFolder, allowing flexible data structures to be modelled in the form of folders containing points.

Columns:

| Name | Type | Description |
| --- | --- | --- |
| PointID | rowid | unique identifier (row address) for this point |
| Name | char(32) | user-defined name |
| AlphaPagerMsg | char(10) | user-defined pager message (if alphanumeric pager) |
| DigiPagerMsg | int | user-defined pager message (if numeric/digital pager) |
| PointType | smallint | refer to PointTypeMaster |
| PrimaryAttrib | int | refer to MasterPointAttribute |
| DeviceAddress | int | optional physical address for this point |
| IconID | int | refer to PictureLookup |
| Seq | int | user-defined sequence in relation to other points |
| QualityCode | int | user-defined validation quality flags (32 bits) |
| ScriptID | int | refer to ScriptMaster (for user-defined calculations) |
| UseScript | char(1) | Use the script to evaluate the point? Y/N |
| CheckAlarms | char(1) | Check alarms for this point? Y/N |
| Value | double | raw value for this point |
| CalcValue | double | calculated value for this point |
| DefaultValue | double | default value for this point |
| MinValue | double | minimum value allowed for this point |
| MaxValue | double | maximum value allowed for this point |
| ValueUnits | smallint | engineering units for the raw value (refer to EngUnits) |
| CalcUnits | smallint | engineering units for calculated value (refer to EngUnits) |
| EditFormat | char(10) | 'C' style edit format for this point |
| FieldLen | smallint | length of this point if it is a string (refer to StrPoint) |
| ParentObj | rowid | reference to parent container folder |
| LastUpdated | timestamp | last time updated by a poll or user change |
| ResidesInRTDB | char(1) | load into memory based (Real-Time) database? Y/N |
| RTDBUpdateInterval | int | # of seconds between disk updates for a RT point. |
| Visible | char(1) | used by Navigator |
| ShadowCount | smallint | used by Navigator |
| ObjectFlags | int | used by Navigator |
| SecurityID | rowid | reference to security object for this point |

Indexed Columns:

none

Predefined Joins:

ParentObj -> DevDataFolder.DevDataFolderID
SecurityID -> ObjectSecurity.ObjectSecurityID

96009

APPENDIX B 54

DevicePointLookup

DevicePointLookup allows a lookup table of values to be defined for a device point.

Columns:

| Name | Type | Description |
|---|---|---|
| Seq | int | user-defined sequence in relation to other lookup values |
| Value1 | char(32) | description if numeric point, lookup value if a string point |
| Value2 | double | lookup value if numeric point, unused if string point |
| ParentObj | rowid | reference to associated device point |

Indexed Columns:

none

Predefined Joins:

ParentObj -> DevicePoint.PointID

APPENDIX B                              55

PointShadow

PointShadow allows device points to be shadowed in the Navigator.

Columns:

| Name | Type | Description |
|---|---|---|
| Seq | int | user-defined sequence in relation to other objects |
| IconID | int | refer to PictureLookup |
| ParentObj | rowid | reference to parent container for this object |
| OriginalObj | rowid | reference to the original device point |

Indexed Columns:

none

Predefined Joins:

ParentObj -> DevDataFolder.DevDataFolderID
OriginalObj -> DevicePoint.PointID

APPENDIX B 56

StrPoint

StrPoint is used in conjunction with DevicePoint to allow long string data points to be stored. By storing a string point in multiple 32 char chunks (rows), a variable length string can be supported.

Columns:

| Name | Type | Description |
|---|---|---|
| Value | char(32) | string data point value |
| ParentObj | rowid | reference to primary device point object |
| Seq | int | used to order string point values if multiple rows are used |

Indexed Columns:

none

Predefined Joins:

ParentObj -> DevicePoint.PointID

APPENDIX B 57

PointAttribute

PointAttribute allows multiple attributes to be associated with a single device point.

Columns:

| Name | Type | Description |
|---|---|---|
| AttributeType | int | refer to MasterPointAttribute |
| PointID | rowid | reference to associated device point |

Indexed Columns:

none

Predefined Joins:

PointID -> DevicePoint.PointID

APPENDIX B                         58

ChangedPoint

ChangedPoint creates a list of change point for a device. This list is then used by a protocol driver to quickly obtain a list of changed points for transfer to the remote device.

Columns:

| Name | Type | Description |
| --- | --- | --- |
| DeviceID | rowid | reference to the parent device for this point |
| PointID | rowid | reference to the changed point |

Indexed Columns:

none

Predefined Joins:

DeviceID -> DeviceObj.DeviceID
PointID -> DevicePoint.PointID

APPENDIX B                      59

DeviceHistory

DeviceHistory is used to define history objects for a device. The actual history definition originates in the history database from the master history tables. This table is then used to store device specific information. DevHistCol is used in conjunction with this table to define column specific parameters.

Columns:

| Name | Type | Description |
| --- | --- | --- |
| DeviceHistID | rowid | unique identifier (row address) for this device history |
| DeviceID | rowid | reference to associated device object |
| IconID | int | refer to PictureLookup |
| Seq | int | user-defined sequence of this object to other objects |
| DBName | char(32) | name of corresponding history database |
| HistoryID | int | unique identifier of corresponding master history in the hist db |
| Name | char(32) | name taken from master history found in hist db |
| HistoryType | smallint | 0=remote, 1=host, 2=AuditTrail, 3=AlarmLog |
| LastDeviceHistRec | int | used by the protocol driver |
| LastTimeStamp | timestamp | used by the protocol driver |
| DeviceAddress | int | used by the protocol driver |
| ArchiveTask | rowid | corresponding archive task |
| ArchiveMode | smallint | archive mode: 0=throw away data, 1=save data |
| IsSelected | char(1) | used by Navigator |
| IsTemplate | char(1) | used by Navigator |
| OpenCornerX | int | used by Navigator |
| OpenCornerY | int | used by Navigator |
| OpenSizeX | int | used by Navigator |
| OpenSizeY | int | used by Navigator |

Indexed Columns:

none

Predefined Joins:

DeviceID -> DeviceObj.DeviceID
ArchiveTask -> SchedTask.TaskRowID

APPENDIX B

DevHistCol

DevHistCol defines the columns for a device history.

Columns:

| Name | Type | Description |
| --- | --- | --- |
| ColNum | int | column number (aka sequence) |
| Name | char(32) | user-defined name from the master table definition |
| DeltaMode | smallint | 0=none, 1=forward, 2=reverse (for automatic delta calcs) |
| LastValue | double | last recorded history value |
| LastDeviceHistRec | int | used by the protocol driver |
| LastTimeStamp | timestamp | used by the protocol driver |
| DeviceAddress | int | used by the protocol driver |
| DeviceHistID | rowid | reference to corresponding device history object |
| PointID | rowid | reference to corresponding data point (not currently used) |
| IconID | int | refer to PictureLookup |

Indexed Columns:

none

Predefined Joins:

DeviceHistID -> DeviceHistory.DeviceHistID
PointID -> DevicePoint.PointID

APPENDIX B 61

DevHistScript

DevHistScript contains scripts associated with history objects. A script can, therefore, be created to manipulate specific history types.

Columns:

| Name | Type | Description |
| --- | --- | --- |
| ScriptID | int | reference to ScriptMaster |
| IconID | int | reference to PictureLookup |
| Seq | int | user-defined sequence of this object in relation to others |
| ParentObj | rowid | reference to the associated history object for this script |

Indexed Columns:

none

Predefined Joins:

ParentObj -> DeviceHistory.DeviceHistID

APPENDIX B                        62

DeviceTrend

DeviceTrend allows trend definitions to be saved for device histories. DeviceTrendCol is used in conjunction with DeviceTrend to save pen (column) specific information.

Columns:

| Name | Type | Description |
| --- | --- | --- |
| DeviceTrendID | rowid | unique identifier (row address) for this object |
| IconID | int | refer to PictureLookup |
| Seq | int | user-defined sequence for this object in relation to others |
| Name | char(32) | user-defined name |
| DeviceID | rowid | reference to associated device object |
| DeviceHistID | rowid | reference to associated device history object |
| IsSelected | char(1) | used by Navigator |
| IsTemplate | char(1) | used by Navigator |
| OpenCornerX | int | used by Navigator |
| OpenCornerY | int | used by Navigator |
| OpenSizeX | int | used by Navigator |
| OpenSizeY | int | used by Navigator |

Indexed Columns:

none

Predefined Joins:

DeviceID -> DeviceObj.DeviceID
DeviceHistID -> DeviceHistory.DeviceHistID

96009

APPENDIX B                          63

DeviceTrendCol

DeviceTrendCol is used in conjuction with DeviceTrend to define pens (columns) associated with history columns.

Columns:

| Name | Type | Description |
| --- | --- | --- |
| DeviceTrendID | rowid | reference to associated trend object |
| ColNum | int | column (pen) number reference to associated history column |
| Color | smallint | refer to ColorMaster |
| Name | char(32) | user-defined name for this pen (column) |
| IconID | int | refer to PictureLookup |

Indexed Columns:

none

Predefined Joins:

DeviceTrendID -> DeviceTrend.DeviceTrendID

96009

APPENDIX B                64

PollConfig

PollConfig is used in conjuction with PollData to define a group of data a protocol driver is to manipulate. A PollConfig can be manually issued to a protocol driver from the Navigator or automatically triggered by a schedule using the scheduling server.

Columns:

| Name | Type | Description |
|---|---|---|
| PollID | rowid | unique identifier (row address) for this poll config |
| SchedServerRowID | rowid | reference to scheduling server |
| IconID | int | refer to PictureLookup |
| Seq | int | user-defined sequence in relation to other poll configs |
| Name | char(32) | user-defined name |
| DeviceID | rowid | reference to associated device object |
| SchedID | rowid | reference to schedule for this poll |
| PStackID | rowid | reference to protocol stack to be used with this poll |
| UseOnAutoAns | char(1) | use this poll config on an auto answer transaction? Y/N |
| IsSelected | char(1) | used by Navigator |
| IsTemplate | char(1) | used by Navigator |
| OpenCornerX | int | used by Navigator |
| OpenCornerY | int | used by Navigator |
| OpenSizeX | int | used by Navigator |
| OpenSizeY | int | used by Navigator |

Indexed Columns:

none

Predefined Joins:

SchedServerRowID -> SchedServer.ServerRowID
DeviceID -> DeviceObj.DeviceID
SchedID -> Schedule.SchedID
PStackID -> ProtocolStack.PStackID

APPENDIX B

PollData

PollData is used in conjunction with PollConfig to define a list of items to be polled for by a protocol driver. PollData references common device objects, such as points, point folders, and histories, to create a list of mixed objects types.

Columns:

| Name | Type | Description |
| --- | --- | --- |
| MinPoint | int | for support of range based polling (driver specific) |
| MaxPoint | int | for support of range based polling (driver specific) |
| Name | char(32) | name associated with the object to poll for |
| Seq | int | sequence in relation to other objects in the poll list |
| IconID | int | refer to PictureLookup |
| PollID | rowid | reference to parent PollConfig |
| PointGroupID | rowid | reference to a data folder if this object is one |
| PointID | rowid | reference to a device point if this object is one |
| DeviceHistID | rowid | reference to a history object if this object is one |

Indexed Columns:

none

Predefined Joins:

PollID -> PollConfig.PollID
PointGroupID -> DevDataFolder.DevDataFolderID
PointID -> DevicePoint.PointID
DeviceHistID -> DeviceHistory.DeviceHistID

APPENDIX B 66

GroupPoll

GroupPoll is used in conjunction with Folder to create a folder of devices which can be polled on the same schedule. GroupPoll references the device and an associated poll config to be used in the group poll. Folder contains a schedule which can be used to schedule all of the polls to occur together.

Columns:

| Name | Type | Description |
| --- | --- | --- |
| FolderID | rowid | reference to the corresponding folder |
| DeviceID | rowid | reference to the device to be included in this group |
| PollID | rowid | reference to the device's poll config to be used |
| MultiDrop | char(1) | Is this device part of a multidrop group? Y/N |
| Seq | int | sequence of this object in relation to the others in the group |
| IconID | int | refer to PictureLookup |

Indexed Columns:

none

Predefined Joins:

FolderID -> Folder.FolderID
DeviceID -> DeviceObj.DeviceID
PollID -> PollConfig.PollID

APPENDIX B 67

PointAlarm

PointAlarm defines 0 or more alarms for each device point. PointAlarm can be configured to handle analog, digital, and state based alarms. PointAlarm can also be defined using a script which determines more complex alarm logic. RelatedAlarmPoint is used in conjunction with PointAlarm to record other device points which may be related to the alarm situation.

Columns:

| Name | Type | Description |
| --- | --- | --- |
| PointAlarmID | rowid | unique identifier (row address) for this point alarm |
| IconID | int | refer to PictureLookup |
| Seq | int | sequence of this alarm in relation to others for a point |
| Name | char(32) | user-defined name |
| AlphaPagerMsg | char(10) | used with alphanumeric pagers |
| DigiPagerMsg | int | used with digital/numeric pagers |
| AlarmType | smallint | analog/digital, state, or event |
| Enabled | char(1) | alarm enabled? Y/N |
| AlarmOccurTime | timestamp | indicates start of the alarm, if it is active |
| AlarmACKTime | timestamp | indicates Ack time if the alarm is active and ACKd |
| AlarmState | smallint | refer to AlarmStateMaster |
| AlarmLevel | smallint | refer to AlarmLevelMaster |
| Audible | char(1) | create a noise? Y/N |
| UsePager | char(1) | transmit to pagers? Y/N |
| PrintEnabled | char(1) | Send to printers? Y/N |
| PrinterGroupID | int | refer to PrinterGroup |
| Limit1 | double | limit for analog/digital and state (low limit) |
| Limit2 | double | hi limit for state |
| Deadband | double | +/- deadband of limit1 for analog/digital |
| Limit1CompareType | smallint | refer to CompareMaster (ie. =, >, <, ...) |
| Limit2CompareType | smallint | refer to CompareMaster |
| DeadbandCompareType | smalllint | refer to CompareMaster |
| ScriptID | int | refer to ScriptMaster (for user-defined alarm logic) |
| CheckValue | smallint | use raw value or calculated value |
| CurrentValue | double | current value from device point Value or CalcValue |
| DeviceID | rowid | reference to associated device object |
| PointID | rowid | reference to associated device point |
| SecurityID | rowid | reference to security object information |

Indexed Columns:

none

Predefined Joins:

DeviceID -> DeviceObj.DeviceID
PointID -> DevicePoint.PointID
SecurityID -> ObjectSecurity.ObjectSecurityID

APPENDIX B                              68

RelatedAlarmPoint

RelatedAlarmPoint is used in conjunction with PointAlarm to define device points to be recorded with an alarm which may be operationally related.

Columns:

| Name | Type | Description |
|---|---|---|
| PointAlarmID | rowid | reference to associated PointAlarm |
| PointID | rowid | reference to related device point to record |
| Name | char(32) | name of the device point to record |
| Seq | int | sequence of this point in relation to others in the list |
| IconID | int | refer to PictureLookup |

Indexed Columns:

none

Predefined Joins:

PointAlarmID -> PointAlarm.PointAlarmID
PointID -> DevicePoint.PointID

96009

APPENDIX B 69

COMServer

COMServer is used to register a master entry for a communications server.

Columns:

| Name | Type | Description |
|---|---|---|
| COMServerID | int | unique user-defined identifier for each COM Server |
| Seq | int | used by Navigator |
| ServerName | char(32) | user-defined name |
| Enabled | char(1) | enabled for use? Y/N |
| Up | char(1) | currently running? Y/N |
| RecvQName | char(32) | network message receive que name |
| NetIPCName | char(32) | network message server name |
| Visible | char(1) | used by Navigator |
| IconID | int | refer to PictureLookup |
| IconX | int | used by Navigator |
| IconY | int | used by Navigator |
| OpenCornerX | int | used by Navigator |
| OpenCornerY | int | used by Navigator |
| OpenSizeX | int | used by Navigator |
| OpenSizeY | int | used by Navigator |

Indexed Columns:

unique COMServerID

Predefined Joins:

none

APPENDIX B  70

COMServerPort

COMServerPort is used in conjunction with COMServer to define the ports for each COM Server.

Columns:

| Name | Type | Description |
| --- | --- | --- |
| COMServerID | int | reference to associated COM Server |
| COMPort | smallint | unique port numbers for each COM Server |
| COMGroup | smallint | used for grouping ports together (0=no group) |
| Enabled | char(1) | enabled/disabled for use? Y/N |
| AutoAns | char(1) | port is used for auto answer? Y/N |
| Seq | int | used by Navigator |
| IconID | int | refer to PictureLookup |

Indexed Columns:

unique COMServerID, COMPort

Predefined Joins:

none

96009

APPENDIX B                           71

COMPortDevice

COMPortDevice is used in conjunction with COMPort to define the physical layers of the protocol stack for each port. The protocol driver originates from MasterProtocolDriver.

Columns:

| Name | Type | Description |
|---|---|---|
| COMServerID | int | reference to associated COM Server |
| COMPort | smallint | unique port numbers for each COM Server |
| ProtocolID | int | refers to MasterProtocolDriver |
| Name | char(32) | protocol driver name |
| Seq | int | determines stacking sequence |
| IconID | int | refer to PictureLookup |

Indexed Columns:

unique COMServerID, COMPort, ProtocolID

Predefined Joins:

none

APPENDIX B 72

COMPortDeviceParm

COMPortDeviceParm is used in conjunction with COMPortDevice to define all of the parameters for a protocol driver on the given com port. This parm list originates from MasterProtocolParm.

Columns:

| Name | Type | Description |
|---|---|---|
| COMServerID | int | reference to associated COM Server |
| COMPort | smallint | unique port numbers for each COM Server |
| ProtocolID | int | refers to MasterProtocolDriver |
| Seq | int | used by Navigator |
| ParmID | int | unique identifier for each parameter in the driver |
| ParmValue | char(20) | actual parm value, any data type |
| ActionID | int | referenced if a corresponding action is associated with parm |

Indexed Columns:

none

Predefined Joins:

none

APPENDIX B

COMEvent

COMEvent provides an online event log of communication events which can be cross referenced from device objects and the COM Server. This log is created from events being generated by protocol drivers on the COM Server.

Columns:

| Name | Type | Description |
| --- | --- | --- |
| EventTStamp | timestamp | timestamp of the event |
| EventStatus | smallint | refer to EventStatusMaster |
| EventID | int | eventid generated by the protocol driver |
| ProtocolID | int | ID of the protocol driver |
| COMServerID | int | reference to the COM Server |
| COMPort | smallint | reference to the COM Server's port |
| DeviceID | rowid | reference to the affected device object |
| PollID | rowid | reference to the poll config affected |

Indexed Columns:

EventTStamp
COMServerID, COMPort

Predefined Joins:

DeviceID -> DeviceObj.DeviceID
PollID -> PollConfig.PollID

APPENDIX C 74

Security

The Security database contains the user and group lists, and the security event log. The SCADA database contains security related objects which map object security definitions into this database. Access to this database can be more closely restricted since it is physically separated from the other portions of system (such as SCADA).

Tables:

UserMaster
GroupSecurity
GroupUser
SecurityLog

APPENDIX C 75

UserMaster

This table maintains user specific information, including a schedule of reponsibility used in conjunction with the alarming system.

Columns:

| Name | Type | Description |
|---|---|---|
| UserID | int | Unique indentifier assigned by the SysAdmin |
| UserName | char(14) | Unique user name |
| FullName | char(32) | |
| Password | char(7) | |
| Active | char(1) | Y/N: Is the user active? |
| PagerType | smallint | Alpha or Digital (Numeric) |
| PagerNumber | char(10) | |
| PagerEnabled | char(1) | Y/N: Is the pager enabled for use? |
| EmailType | smallint | internet, ccmail, ... |
| EmailAddress | char(80) | |
| EmailEnabled | char(1) | Y/N: Use Email for alarm messages? |
| UseSchedule | char(1) | Y/N: Use weekly schedule? |
| SunBegin | time | Allows a range of time of responsibility each day. |
| SunEnd | time | |
| MonBegin | time | |
| MonEnd | time | |
| TueBegin | time | |
| TueEnd | time | |
| WedBegin | time | |
| WedEnd | time | |
| ThuBegin | time | |
| ThuEnd | time | |
| FrBegin | time | |
| FrEnd | time | |
| SatBegin | time | |
| SatEnd | time | |

Indexed Columns:

unique UserName
unique UserID

96009

APPENDIX C 76

GroupSecurity

The security mechanism within Pantheon's applications requires groups of users to be associated with objects to control object access. GroupSecurity is joined with GroupUser to provide these groups. The SCADA database then has cross references (ObjSecGrp) back to groups found in GroupSecurity.

Columns:

| Name | Type | Description |
| --- | --- | --- |
| GroupID | int | Unique identifier for this group of users |
| GroupName | char(32) | |
| Active | char(1) | Y/N: Is the group active? |
| AllowCreate | char(1) | Y/N CRUD flags |
| AllowRead | char(1) | |
| AllowUpdate | char(1) | |
| AllowDelete | char(1) | |

Indexed Columns:

unique GroupID

APPENDIX C 77

GroupUser

This table is used in conjunction with GroupSecurity to define the list of users contained within each group.

Columns:

| Name | Type | Description |
|---|---|---|
| UserID | int | Reference to UserMaster for this user in this group |
| GroupID | int | Join reference to GroupSecurity |
| Active | char(1) | Y/N: Is the user active with this group? |
| UsePager | char(1) | Y/N: Use this user's pager within this group? |

Indexed Columns:

none

APPENDIX C

SecurityLog

This table is used for logging security events only (such as logging in/out).

Columns:

| Name | Type | Description |
|---|---|---|
| EventTStamp | timestamp | Timestamp for when this event occurred. |
| UserID | int | Who generated the event? (refer to UserMaster) |
| EventType | smallint | What occurred? (refer to EventTypeMaster) |

Indexed Columns:

unique EventTStamp, UserID

APPENDIX D                    79

Masters

The Masters database contains common lookup tables, including protocol registration tables, printer definitions and script master tables.

Printer Tables:
PrinterMaster
PrinterGroup
PrinterEntry

Script Tables:
ScriptMaster
ScriptLine

Misc Tables:
PointTypeMaster
MfrMaster
MfrModelMaster
TimeZoneMaster
ColorMaster
PictureLookup
EngUnits
MasterPointAttribute
HistAttribute

Alarm Tables:
AlarmLevelMaster
AlarmStateMaster
CompareMaster

Event/Application Tables:
EventStatusMaster
EventTypeMaster
ObjectTypeMaster
AppMaster
SystemEventMaster

Protocol Tables:
MasterProtocolDriver
MasterProtocolAction
MasterProtocolParm
MastProtParmLookup
MasterProtocolEvent

96009

APPENDIX D 80

PrinterMaster

PrinterMaster is used to define a master list of printers to be used in PrinterGroups.

Columns:

| Name | Type | Description |
|---|---|---|
| PrinterID | int | unique user-defined identifier for this printer |
| PrinterName | char(32) | system name for this printer |
| Description | char(80) | user-defined description |

Indexed Columns:

unique PrinterID

Predefined Joins:

none

APPENDIX D 81

PrinterGroup

PrinterGroup is used in conjunction with PrinterEntry to create groups of printers to send print jobs to.

Columns:

| Name | Type | Description |
| --- | --- | --- |
| PGroupID | rowid | unique identifier (row address) for this printer group for joins |
| PrinterGroupID | int | unique user-defined identifier for each printer group |
| GroupName | char(32) | user-defined name |

Indexed Columns:

unique PrinterGroupID

Predefined Joins:

none

APPENDIX D                              82

PrinterEntry

PrinterEntry is used in conjunction with PrinterGroup to create group of printers. PrinterEntry is used to create a list of printers within each printer group.

Columns:

| Name | Type | Description |
|------|------|-------------|
| PrinterID | int | reference to PrinterMaster |
| ParentObj | rowid | reference to printer group |

Indexed Columns:

none

Predefined Joins:

ParentObj -> PrinterGroup.PGroupID

APPENDIX D

ScriptMaster

ScriptMaster is used in conjunction with ScriptLine to store basic scripts in the database for use embedded throughout the system. This tables are primarily managed from within the Navigator to associate scripts with objects.

Columns:

| Name | Type | Description |
|---|---|---|
| ScriptRowID | rowid | unique identifier (row address) for joins |
| ScriptID | int | unique user-defined identifier for this script |
| Name | char(32) | user-defined name |
| ScriptDesc | char(160) | user-defined description |
| NumLines | smallint | number of lines in the script |
| LastModified | timestamp | time of last modification |
| LastModifiedBy | int | reference to UserMaster |

Indexed Columns:

unique ScriptID

Predefined Joins:

none

APPENDIX D 84

ScriptLine

ScriptLine is used in conjunction with ScriptMaster to store multiple line of each script.

Columns:

| Name | Type | Description |
| --- | --- | --- |
| ParentID | rowid | reference to ScriptMaster |
| Seq | int | used to sequence multiple lines of a script |
| Sline | char(80) | actual line of a script |

Indexed Columns:

none

Predefined Joins:

ParentID -> ScriptMaster.ScriptRowID

APPENDIX D 85

PointTypeMaster

PointTypeMaster contains a list of standard data types used by the system. A base data type is associated with each type for use by the Navigator to identify the type of dialog to be displayed.

Columns:

| Name | Type | Description |
| --- | --- | --- |
| PointType | smallint | unique identifier for each type |
| BaseType | smallint | 0=string, 1=numeric; used by Navigator to identify base data type |
| Name | char(20) | user-defined name for each type |

Indexed Columns:

none

Predefined Joins:

none

APPENDIX D

MfrMaster

MfrMaster is used to register manufacturers of devices in the database for information purposes.

Columns:

| Name | Type | Description |
|---|---|---|
| MfrID | int | unique identifier for each Mfr defined |
| MfrName | char(32) | name of Mfr |

Indexed Columns:

unique MfrID

Predefined Joins:

none

APPENDIX D

MfrModelMaster

MfrModelMaster is used in conjunction with MfrMaster to register device models in the database for information purposes.

Columns:

| Name | Type | Description |
|---|---|---|
| MfrID | int | unique identifier for each Mfr defined |
| ModelID | int | unique identifier for each model of a Mfr |
| ModelName | char(32) | name of device model |

Indexed Columns:

unique MfrID, ModelID

Predefined Joins:

none

APPENDIX D                88

TimeZoneMaster

TimeZoneMaster defines each time zone used in the system.

Columns:

| Name | Type | Description |
|---|---|---|
| TimeZone | smallint | unique identifier for each time zone |
| Name | char(10) | name of the time zone |

Indexed Columns:

unique TimeZone

Predefined Joins:

none

APPENDIX D

ColorMaster

ColorMaster defines each color used in the system.

Columns:

| Name | Type | Description |
|---|---|---|
| ColorID | smallint | unique identifier for each color |
| Name | char(20) | name of each color |

Indexed Columns:

unique ColorID

Predefined Joins:

none

APPENDIX D 90

PictureLookup

PictureLookup is used to define backdrops and icons used by the Navigator.

Columns:

| Name | Type | Description |
|---|---|---|
| PictureID | int | unique identifier for each picture/icon |
| Name | char(32) | user-defined name |
| FileName | char(50) | filename of picture/icon |

Indexed Columns:

unique PictureID

Predefined Joins:

none

APPENDIX D 91

EngUnits

EngUnits is used to define a master list of engineering units used throughout the system.

Columns:

| Name | Type | Description |
|---|---|---|
| UnitsType | smallint | unique identifier for each engineering unit |
| Name | char(10) | engineering units name |

Indexed Columns:

unique UnitsType

Predefined Joins:

none

APPENDIX D 92

MasterPointAttribute

MasterPointAttribute defines a master list of point attribute types to identify different types of data points throughout the system.

Columns:

| Name | Type | Description |
|---|---|---|
| AttribType | int | unique identifier for each point attribute |
| Name | char(32) | user-defined name |

Indexed Columns:

unique AttribType

Predefined Joins:

none

APPENDIX D 93

HistAttribute

HistAttribute defines a master list of history types which are used in the history subsystem.

Columns:

| Name | Type | Description |
|---|---|---|
| AttribType | int | unique identifier for each attribute |
| Name | char(32) | user-defined name |

Indexed Columns:

unique AttribType

Predefined Joins:

none

APPENDIX D 94

AlarmLevelMaster

AlarmLevelMaster defines a list of alarm levels used in the alarm system and alarm viewer.

Columns:

| Name | Type | Description |
|---|---|---|
| level | smallint | unique identifier for each alarm level |
| ForeColor | smallint | foreground color (refer to color master) |
| BackColor | smallint | background color (refer to color master) |
| Description | char(32) | user-defined description of the alarm level |

Indexed Columns:

unique Level

Predefined Joins:

none

APPENDIX D                              95

AlarmStateMaster

AlarmStateMaster defines a master list of alarm states for use in the alarm system.

Columns:

| Name | Type | Description |
|---|---|---|
| AlarmState | smallint | unique identifier for each alarm state |
| Name | char(10) | user-defined name for each alarm state |

Indexed Columns:

unique AlarmState

Predefined Joins:

none

96009

APPENDIX D 96

CompareMaster

CompareMaster is a master list of compare types (ie. -, <, >, ...) used in the alarm system.

Columns:

| Name | Type | Description |
|---|---|---|
| CompareType | smallint | unique identifier for each compare type |
| Name | char(10) | compare text (ie. =, >, <, ...) |

Indexed Columns:

unique CompareType

Predefined Joins:

none

APPENDIX D 97

EventStatusMaster

EventStatusMaster defines event status types, such as success and failure.

Columns:

| Name | Type | Description |
| --- | --- | --- |
| EventStatus | int | unique identifier for each event status type |
| StatusName | char(20) | text defining the status |
| IconID | int | associated icon (refer to PictureLookup) |

Indexed Columns:

none

Predefined Joins:

none

APPENDIX D									98

EventTypeMaster

EventTypeMaster defines event types used throughout the system, such as update, delete, etc...

Columns:

| Name | Type | Description |
| --- | --- | --- |
| EventType | int | unique identifier for each event type |
| EventTypeName | char(20) | name for each event type |

Indexed Columns:

none

Predefined Joins:

none

APPENDIX D

ObjectTypeMaster

ObjectTypeMaster defines all object types used throughout the system. The Navigator, especially, uses object types.

Columns:

| Name | Type | Description |
|---|---|---|
| ObjectType | int | unique identifier for each object type |
| ObjectDesc | char(32) | descriptive name of object |

Indexed Columns:

none

Predefined Joins:

none

APPENDIX D                          100

AppMaster

AppMaster is used to register general applications in the system.

Columns:

| Name | Type | Description |
| --- | --- | --- |
| AppType | int | unique identifier for each application |
| AppDesc | char(80) | application description |
| AppFileName | char(32) | application path/file name |
| AppQueName | char(32) | application network message que name |

Indexed Columns:

none

Predefined Joins:

none

APPENDIX D

SystemEventMaster

SystemEventMaster is used to register general application events. This can be used in conjunction with the event database for correlating general application events recorded in event history.

Columns:

| Name | Type | Description |
| --- | --- | --- |
| EventID | int | unique identifier for each event |
| EventDesc | char(80) | event description |

Indexed Columns:

none

Predefined Joins:

none

APPENDIX D                           102

MasterProtocolDriver

MasterProtocolDriver is the base table used to register a protocol driver with the system.

Columns:

| Name | Type | Description |
| --- | --- | --- |
| ProtocolID | int | unique identifier for each protocol driver |
| DriverFileName | char(20) | DLL protocol driver filename |
| DriverName | char(32) | descriptive driver name |
| IconID | int | refer to PictureLookup |

Indexed Columns:

unique ProtocolID

Predefined Joins:

none

APPENDIX D

MasterProtocolAction

MasterProtocolAction is used in conjunction with MasterProtocolDriver to register a protocol driver with the system. This table defines protocol driver specific actions.

Columns:

| Name | Type | Description |
| --- | --- | --- |
| ProtocolID | int | unique identifier for the protocol driver |
| ActionID | int | unique identifier for each action in a driver |
| ActionMenuName | char(32) | descriptive name for the action |

Indexed Columns:

unique ProtocolID, ActionID

Predefined Joins:

none

APPENDIX D  104

MasterProtocolParm

MasterProtocolParm is used in conjunction with MasterProtocolDriver for registering a driver in the system. Each driver has its own set of parameters.

Columns:

| Name | Type | Description |
|---|---|---|
| ProtocolID | int | unique identifier for the protocol driver |
| ParmID | int | unique identifier for each parm in a driver |
| Seq | smallint | sequence for user interface ordering |
| ParmName | char(32) | name to show up in the user interface |
| ParmValue | char(20) | actual parm value, any data type |
| ValueDesc | char(20) | description for a numeric value |
| EditFormat | char(10) | 'C' style edit format specifier |
| ActionID | int | used if the parm is associated with an action |

Indexed Columns:

unique ProtocolID, ParmID

Predefined Joins:

none

APPENDIX D                              105

MastProtParmLookup

MastProtParmLookup is used in conjunction with MasterProtocolParm to provide a list of possible lookup values for each parm.

Columns:

| Name | Type | Description |
| --- | --- | --- |
| ProtocolID | int | unique identifier for the protocol driver |
| ParmID | int | unique identifier for each parm in a driver |
| Seq | smallint | sequence for user interface ordering |
| ParmValue | char(20) | possible parm value, any data type |
| ValueDesc | char(20) | description for a numeric value |

Indexed Columns:

unique ProtocolID, ParmID, Seq

Predefined Joins:

none

APPENDIX D                  106

MasterProtocolEvent

MasterProtocolEvent is used in conjunction with MasterProtocolDriver for registering a driver's information in the system. A driver must register the events it can generate to make the COMEvent log readable.

Columns:

| Name | Type | Description |
| --- | --- | --- |
| ProtocolID | int | unique identifier for the protocol driver |
| EventID | int | unique identifier for each event a driver can generate |
| EventStatus | smallint | refer to EventStatusMaster |
| EventName | char(80) | descriptive name for each event |

Indexed Columns:

unique ProtocolID, EventID

Predefined Joins:

none

APPENDIX E 107

AuditDB

The AuditDB contains both audit trails and alarm histories for devices. For scalability, AuditDB can be multi-instanced to allow larger history storage for a larger number of devices. An instance of AuditDB is a database which shares the original schema of AuditDB but has its own set of files for storage. If multiple AuditDB databases exist, however, a device can be related to only one of the instances. This is different from HistDB, which allows a device to maintain related histories in different historical databases. Access to the AuditDB can be closely restricted since it is separate from the other databases in the system.

Tables:

AuditDeviceObj
DeviceEvent
DevEventDetail
DevEventNote
DeviceAlarmHistory
DevAlarmDetail

APPENDIX E 108

AuditDeviceObj

This table acts as a cross reference to the DeviceObj table located in the primary SCADA database. Note that the DeviceID may not necessarily match that in SCADA or any other database since it is a row address used only for predefined joins. DeviceAcctNum is the actual cross reference. This technique allows audit trail information for multiple devices to reside in DeviceEvent.

Columns:

| Name | Type | Description |
| --- | --- | --- |
| DeviceID | rowid | Unique ID (row address) for joining to DeviceEvent. |
| DeviceAcctNum | char(32) | Unique account number for cross reference to SCADA. |

Indexed Columns:

unique DeviceAcctNum

Predefined Joins:

none

APPENDIX E 109

DeviceEvent

This table allows audit trail events to be logged by protocol drivers (ie. device generated audit events) and the Navigator (for user generated audit events). Audit trail events are associated with devices and allow multiple lines of application generated text and user notes to be attached using the joined DevEventDetail and DevEventNote tables, respectively.

Columns:

| Name | Type | Description |
| --- | --- | --- |
| AuditID | rowid | Unique identifier for this row (row address) used for joins with DevEventDetail and DevEventNote. |
| EventTStamp | timestamp | Timestamp of when the event occurred |
| EventSource | smallint | NOTE: is this useful? |
| ObjectType | smallint | What generated the event (refer to ObjectTypeMaster) Useful? |
| EventStatus | smallint | Success or failure? (refer to EventStatusMaster) |
| EventType | smallint | Type of operation (refer to EventTypeMaster) Is this useful? |
| EventID | int | Numeric lookup of the event (refer to SystemEventMaster) |
| ProtocolID | int | If this event was generated by a protocol driver |
| UserID | int | If this event was associated with a user (refer to UserMaster) |
| DeviceID | rowid | Join reference to AuditDeviceObj |

Indexed Columns:

EventTStamp

Predefined Joins:

DeviceID -> AuditDeviceObj.DeviceID

APPENDIX E 110

DevEventDetail

This table is used in conjunction with DeviceEvent to allow multiple lines of application generated text to be associated with each event.

Columns:

| Name | Type | Description |
|---|---|---|
| ParentID | rowid | Join reference to AuditID in DeviceEvent |
| Seq | int | Used for sequencing multiple lines for a single event |
| EventDetail | char(80) | Application generated event information |

Indexed Columns:

none

Predefined Joins:

ParentID -> DeviceEvent.AuditID

APPENDIX E                    111

DevEventNote

This table is used in conjunction with DeviceEvent to allow multiple lines of user appended note text lines to be associated with each event.

Columns:

| Name | Type | Description |
| --- | --- | --- |
| ParentID | rowid | Join reference to AuditID in DeviceEvent |
| Seq | int | Used for sequencing multiple lines for a single event |
| EventNote | char(80) | Information entered by a user |

Indexed Columns:

none

Predefined Joins:

ParentID -> DeviceEvent.AuditID

APPENDIX E                               112

DeviceAlarmHistory

This table maintains alarm histories for Devices. Details associated with each alarm are logged in DevAlarmDetail.

Columns:

| Name | Type | Description |
| --- | --- | --- |
| AlarmHistoryID | rowid | Unique identifier for this row (row address) used for joining with DevAlarmDetail. |
| AlarmDateTime | timestamp | Timestamp of when the alarm occurred |
| AlarmState | smallint | State of the alarm (refer to AlarmStateMaster) |
| AlarmLimitType | smallint | refer to CompareMaster |
| AlarmLimit | double | actual alarm limit value |
| AlarmValue | double | actual point value at the time of alarm |
| DeviceID | rowid | Join reference to AuditDeviceObj |
| PointName | char(32) | Name of the point this alarm is associated with |
| PrintEnabled | char(1) | Allow this alarm to be printed? (Y/N) |
| PrinterGroupID | int | Printer group to send this alarm to (refer to PrinterGroup) |

Indexed Columns:

AlarmDateTime
PointName

Predefined Joins:

DeviceID -> AuditDeviceObj.DeviceID

APPENDIX E 113

DevAlarmDetail

This table is used in conjunction with DeviceAlarmHistory to allow multiple lines of application generated text to be associated with each alarm history entry.

Columns:

| Name | Type | Description |
| --- | --- | --- |
| ParentID | rowid | Join reference to AlarmHistoryID in DeviceAlarmHistory |
| Seq | int | Used for sequencing multiple lines for a single alarm entry |
| AlarmDetail | char(80) | Application generated alarm information |

Indexed Columns:

none

Predefined Joins:

ParentID -> DeviceAlarmHistory.AlarmHistoryID

APPENDIX F 114

EventDB

The EventDB database contains an event log used by miscellaneous applications (such as the scheduler). This database is designed to provide event logging capabilities for both internal applications and user-defined applications. This insures a common logging format and access from the Navigator for monitoring all applications in the system.

Tables:

GeneralEvent
GenEventDetail
GenEventNote

APPENDIX F                  115

GeneralEvent

This table is used by applications for logging events. Multiple lines of application generated text and user notes are allowed using the joined GenEventDetail and GenEventNotes tables.

Columns:

| Name | Type | Description |
|---|---|---|
| AuditID | rowid | Unique identifier for this row (row address) used for joins with GenEventDetail and GenEventNote. |
| EventTStamp | timestamp | Timestamp of when the event occurred |
| EventSource | smallint | NOTE: This should probably be removed because of SourceID |
| EventStatus | smallint | Success or failure? (refer to EventStatusMaster) |
| EventType | smallint | Type of operation (refer to EventTypeMaster) Is this useful? |
| ObjectType | smallint | What generated the event (refer to ObjectTypeMaster) Useful? |
| SourceID | int | Who generated the event (refer to AppType in AppMaster) |
| EventID | int | Numeric lookup of the event (refer to SystemEventMaster) |
| UserID | int | If this event was associated with a user (refer to UserMaster) |

Indexed Columns:

EventTStamp
EventSource
ObjectType

Predefined Joins:

none

APPENDIX F                          116

GenEventDetail

This table is used in conjunction with GeneralEvent to allow multiple lines of application generated text to be associated with each event.

Columns:

| Name | Type | Description |
|------|------|-------------|
| ParentID | rowid | Join reference to AuditID in GeneralEvent |
| Seq | int | Used for sequencing multiple lines for a single event |
| EventDetail | char(80) | Application specific event information |

Indexed Columns:

none

Predefined Joins:

ParentID -> GeneralEvent.AuditID

APPENDIX F 117

GenEventNote

This table is used in conjunction with GeneralEvent to allow multiple lines of user appended note text lines to be associated with each event.

Columns:

| Name | Type | Description |
| --- | --- | --- |
| ParentID | rowid | Join reference to AuditID in GeneralEvent |
| Seq | int | Used for sequencing multiple lines for a single event |
| EventNote | char(80) | Information entered by a user |

Indexed Columns:

none

Predefined Joins:

ParentID -> GeneralEvent.AuditID

96009

APPENDIX G  118

HistDB

This HistDB database contains device histories. The database is made up of predefined physical tables which can contain user-defined logical histories. This design provides optimal performance while also allowing configuration flexibility. HistDB can be multi-instanced to allow segmenting of historical data across multiple drives and directories. An instance of HistDB is a database which shares the original schema of HistDB but has its own set of files for storage. This is especially useful for segmenting large amounts of historical data into manageable chunks. A device can have related historical data in different history database instances. For example, Hist1 may contain hourly history tables, and Hist2 may contain daily history tables.

Tables:

HistDeviceObj
HistoryTable
HistColumn
HistoryTrend
HistoryTrendCol
Hist4
Hist8
Hist16

96009

APPENDIX G

HistDeviceObj

This table provides a logical cross reference to DeviceObj in the SCADA database. DeviceID here may not necessarily match DeviceID found in DeviceObj since it is a physical row address. It is used to create joins with other tables in this database. DeviceAcctNum provides the link between the databases.

Columns:

| Name | Type | Description |
| --- | --- | --- |
| DeviceID | rowid | Unique ID (row address) for joining to other tables in HistDB. |
| DeviceAcctNum | char(32) | Unique account number for cross reference to SCADA. |

Indexed Columns:

unique DeviceAcctNum

Predefined Joins:

none

APPENDIX G                          120

HistoryTable

This table defines master history types. Device histories are derived from these master histories. A device's history then refers to this table when cross referencing from the SCADA database (refer to DeviceHistory). A master history defines a logical history which resides in one of the physical history tables (ie. hist4). HistTableID is used to create a join into the physical history tables to identify logical histories. The DeviceID located in HistDeviceObj is also used in conjunction with HistTableID to identify a device's history within the physical history tables.

User-defined columns for master history tables are defined in HistColumn.

Columns:

| Name | Type | Description |
| --- | --- | --- |
| HistTableID | rowid | Unique ID (row address) for joining to other tables. |
| HistoryID | int | Unique logical ID |
| Name | char(32) | |
| Seq | int | Used for Navigator display purposes |
| TableType | smallint | 4, 8, or 16 columns |
| HistType | int | refer to HistAttribute (ie. daily, hourly, etc...) |
| Interval | int | If data is expected to be at a fixed interval |
| Visible | char(1) | Navigator uses this when the object is in the trashcan |
| SchedServerID | int | default SchedServer & Task for archiving this history type |
| SchedTaskID | int | |
| ArchiveMode | smallint | default archive mode: 0=throw away data; 1=save data; |

Indexed Columns:

unique HistoryID
Name

Predefined Joins:

none

APPENDIX G    121

HistColumn

This table is used in conjunction with HistoryTable to define logical columns within master history tables.

Columns:

| Name | Type | Description |
|------|------|-------------|
| Name | char(32) | User-defined name for this column |
| ColNum | smallint | Logical column number |
| Units | smallint | engineering units for data in this column (refer to EngUnits) |
| PointAttrib | int | point attribute for data in this column (refer to MasterPointAttribute) |
| HistTableID | rowid | Used to create a join with HistoryTable |

Indexed Columns:

none

Predefined Joins:

HistTableID -> HistoryTable.HistTableID

APPENDIX G

HistoryTrend

This table is used for creating generic trends for master histories without traversing the database into individual devices. Columns included in the trend are defined in HistoryTrendCol.

Columns:

| Name | Type | Description |
|---|---|---|
| HistTrendID | rowid | Unique identifier for this trend object (row address) |
| Name | char(32) | user-defined name |
| Seq | int | used by the Navigator |
| HistTableID | rowid | Refers to HistoryTable to the history data for this trend |
| DeviceID | rowid | Refers to a device who's history data is to be used for this trend |

Indexed Columns:

none

Predefined Joins:

none

APPENDIX G    123

HistoryTrendCol

This table is used in conjunction with HistoryTrend to define the pens and associated columns to trend for a master history.

Columns:

| Name | Type | Description |
| --- | --- | --- |
| HistTrendID | rowid | Refers to the trend this "pen" is associated with |
| ColNum | smallint | History column this "pen" is to use |
| Color | smallint | Color this "pen" is to use |

Indexed Columns:

none

Predefined Joins:

HistTrendID -> HistoryTrend.HistTrendID

APPENDIX G

Hist4

This physical table is capable of storing up to 4 columns of data for every historical row. HistTableID and DeviceID are used to create a join which can identify a device's historical data. This allows different types of historical data to be stored in this table (such as a mix of hourly and daily data). HistTableID identifies the master history table type (refer to HistoryTable) of each historical row.

Columns:

| Name | Type | Description |
| --- | --- | --- |
| HistTableID | rowid | used to identify a logical master history within this table |
| DeviceID | rowid | used to identify a device's history within this table |
| HistTStamp | timestamp | historical timestamp for each row of data |
| Value1..4 | double | up to 4 physical columns of historical data |
| Value1..4Status | int | 32bits of validation flags for each column |

Indexed Columns:

HistTStamp

Predefined Joins:

HistTableID -> HistoryTable.HistTableID
DeviceID -> HistDeviceObj.DeviceID

APPENDIX G                    125

Hist8

This physical table is capable of storing up to 8 columns of data for every historical row. HistTableID and DeviceID are used to create a join which can identify a device's historical data. This allows different types of historical data to be stored in this table (such as a mix of hourly and daily data). HistTableID identifies the master history table type (refer to HistoryTable) of each historical row.

Columns:

| Name | Type | Description |
|---|---|---|
| HistTableID | rowid | used to identify a logical master history within this table |
| DeviceID | rowid | used to identify a device's history within this table |
| HistTStamp | timestamp | historical timestamp for each row of data |
| Value1..8 | double | up to 8 physical columns of historical data |
| Value1..8Status | int | 32bits of validation flags for each column |

Indexed Columns:

HistTStamp

Predefined Joins:

HistTableID -> HistoryTable.HistTableID
DeviceID -> HistDeviceObj.DeviceID

96009

APPENDIX G 126

Hist16

This physical table is capable of storing up to 16 columns of data for every historical row. HistTableID and DeviceID are used to create a join which can identify a device's historical data. This allows different types of historical data to be stored in this table (such as a mix of hourly and daily data). HistTableID identifies the master history table type (refer to HistoryTable) of each historical row.

Columns:

| Name | Type | Description |
| --- | --- | --- |
| HistTableID | rowid | used to identify a logical master history within this table |
| DeviceID | rowid | used to identify a device's history within this table |
| HistTStamp | timestamp | historical timestamp for each row of data |
| Value1..16 | double | up to 16 physical columns of historical data |
| Value1..16Status | int | 32bits of validation flags for each column |

Indexed Columns:

HistTStamp

Predefined Joins:

HistTableID -> HistoryTable.HistTableID
DeviceID -> HistDeviceObj.DeviceID

APPENDIX H

Overview

The following attempts to provide a detailed explanation of the Protocol Driver development process. The protocol driver development process is a sequential process which can be divided into 3 main phases. The first phase is Protocol Driver Definition. It is during this initial step that a detailed profile of the protocol driver is established. Aspects of the protocol driver such as Actions, Parameters, Events, and Database Objects are clearly defined.

The second step of the protocol driver development process is Protocol Driver Implementation. The key to this phase is understanding the Protocol Stack and how it makes use of a common messaging API between protocol drivers. Once this has been discussed, details of the implementation process such as Language Considerations, Exported Functions, Supporting Operations, Parameter Processing, Predefined Data Structures, as well as Internal Protocol Driver Data Structures are addressed.

The final step of the protocol driver development process involves incorporating the Protocol Tool Kit into protocol driver development. This section focuses mainly on the Database Access API which will be used by higher level protocol drivers. The RS-232 Access API is also briefly discussed for the sake of low level protocol driver implementation.

APPENDIX H

Protocol Driver Definition

Protocol driver definition is perhaps the most important step in the Protocol Driver development process. If a protocol driver is not defined properly, the implementation portion of the protocol driver development process will become extremely difficult. Proper protocol driver definition involves clearly defining the Actions which the protocol driver will perform, the Parameters which will be needed to perform those actions, the Events which may occur as the result of an action being performed, as well as any Database Objects which will provide information to carry out an action. Once these entities have been clearly defined, they should be documented in a very concise and organized manner. This is important because the programmer will need to refer back to this documentation during the Protocol Driver Implementation stage.

APPENDIX H 129

Actions

Actions identify the operations which a Protocol Driver may be commanded to perform. The number of actions a protocol driver will have will vary from protocol driver to protocol driver. Typically, a protocol driver will support the following 4 standard actions:

| | |
|---|---|
| Perform Poll | The Perform Poll action is the most common of all actions. When this action is invoked, the protocol driver will typically update any changed points associated with the RTU, poll the unit for any single points, point folders, histories, or audit trail objects in the current poll configuration, and may possibly update the remote time if so configured. |
| Send Changed Points | This action will update any points which have changed at the Navigator to the RTU. |
| Get Time | This action typically updates the Device Time field of the Device Object table. |
| Set Time | This action will set the RTU time to match the current host time. |

96009

APPENDIX H 130

Parameters

Parameters identify the information a Protocol Driver needs to perform its defined Actions. The number of parameters associated with a protocol driver will vary among protocol drivers depending on the type of protocol being implemented, the number of actions defined, and etc. Parameters give a protocol driver a great deal of flexibility as their values may be easily changed without effecting the internals of the protocol driver.

APPENDIX H  131

Events

Events identify the error and informational messages the Protocol Driver may generate as the result of Actions being performed. A protocol driver may have any number of events associated with it. Typically, the following standard events occur as a result of standard protocol actions being performed.

| | |
|---|---|
| Found All Parms | The protocol driver was able to resolve all parameter information. |
| Failed to Find Parms | The protocol driver was unable to resolve parameter information. |
| Poll Successful | The protocol driver successfully completed a poll. |
| Poll Failed | The protocol driver failed to complete a poll. |
| Send Changed Points Successful | Points that have changed at the Navigator were successfully updated in the RTU. |
| Send Changed Points Failed | Points that have changed at the Navigator failed to be updated in the RTU. |
| Get Time Successful | The remote time was successfully retrieved from the RTU. |
| Get Time Failed | The remote time was not successfully retrieved from the RTU. |
| Set Time Successful | The current host time was successfully written to the remote RTU. |
| Set Time Failed | The current host time failed to be written to the remote RTU. |

96009

APPENDIX H 132

Database Objects

Database objects are used to connect common (and even custom) data structures to the device supported by the Protocol Driver. Below are database objects which are commonly used by protocol drivers along with a brief description of the fields of these database objects.

Device Object:
    Remote Address = For identification during AutoAnswer and normal device addressing.
    Device Time = Device's current clock reading.
    Allow Reset = (Y/N) Allow reset of the device's clock.
    Time Difference Reset = # of seconds to allow device's clock to go +/- from the host before resetting.

Data Folder Object:
    Device Address = Useful if this group of points has a common address in the device.
    Sequence = Order of this folder in relation to others in the same group, if this is important.

Point Object:
    Device Address = Address of this point in the device.
    Sequence = Order of this point in relation to others in the same group.
    Numeric or String = Data type.
    Attributes = Categorizes this point if it relates to similar points in other devices (ie. All pressures).
    Validation:
      DefaultValue = Initial value, if assigned.
      Min Value = Set if there is an expected range; null otherwise.
      Max Value = Set if there is an expected range; null otherwise.
      Units = Engineering units, as provided for in the masters database lookup table.
      Edit Format = 'C' style format string to be used for validating the value.
      Field Length = Set if this is a string data type.
      Lookup Values = List of possible values for this point.

History Object:
    Device History = Relates a device's history to the historical storage at the Host.
      Device Address = Useful if this is a block of multiple history columns.
      Last Device History Record = Last record # received from this device's history block.
      Last Time Stamp = Time stamp of the last record received from this device's history block.
    Device History Columns = Columns contained in the Device History.
      Device Address = Useful if each history column is located at a different device address.
      Last Device History Record = Last record # received from this device's history column.
      Last Time Stamp = Time stamp of the last record received from this device's history column.

Alarm Object:

If the device generates special alarms, then these can be identified by configuring special points in the database with alarms associated with them. For example, if the RTU generates a 'First Time Power' alarm, then it can be identified in the following manner:

- Configure a point in the host database called 'First Time Power'.
- Configure an alarm for the point to watch for a true or false value.
- The protocol driver can then set this point based on the state of the actual 'First Time Power'.
- The host then manages the alarm in a common manner.

Protocol Driver Implementation

96009

APPENDIX H 133

After a Protocol Driver has been clearly defined the implementation process may begin. The most important aspect of protocol driver implementation is understanding the Protocol Stack and the Common Messaging API to which all protocol drivers must adhere. The programmer should have a firm grasp of these concepts before writing a single line of code. Once implementation has began, the remaining sections of this documentation should provide the programmer with important details of the implementation process.

APPENDIX H 134

Language Considerations

Before developing a Protocol Driver, an important consideration of the programmer should be the language in which the protocol driver will be written. The Protocol Tool Kit currently supports both C and C++. Although there are many similarities between these two languages, there are some differences which could factor into the protocol driver development process. The most apparent difference is that C++ is an Object Oriented Language while C is not. Therefore, the attractiveness of C++ grows along with the size of the protocol driver to be developed. C++'s methodologies of data abstraction, data encapsulation, inheritance, and polymorphism can serve to improve the overall integrity of the protocol driver. A slight disadvantage of using C++ in the protocol driver development process is name mangling. When the C++ compiler compiles a program, it encodes all function names and certain other identifiers to include type and scope information. This process is known as name mangling. The result is that the names of the exported symbols which occur in the object code differ from the names used in the original source code. These naming differences must be resolved (a process known as demangling) before program linkage can be completed. While C lacks the object oriented aspects of C++, it is a traditionally popular language and is perfectly acceptable for developing smaller sized protocol drivers.

APPENDIX H                    135

Protocol Stack Overview

A protocol stack is a series of protocol drivers (dynamic link library modules) which have been loaded into memory by the Com Task for communications purposes. When an incoming request is made to a Com Server to perform a particular poll, that request is passed on to the Com Controller which decides which Com Task will handle the incoming request and whether or not that Com Task is currently available. Upon receiving a communications request, the Com Task loads information from the database which will be needed to perform the poll into a structure know as the Stack Data Struct. The Stack Data Struct contains information which is global to all Protocol Drivers in the protocol stack as well as information which is specific to individual protocol drivers in the protocol stack.

After the Stack Data Struct has been successfully created, the Com Task loads all protocol drivers (dynamic link library modules) which make up the protocol stack into memory. If all protocol drivers are successfully loaded into memory, the Com Task invokes the Common Messaging API to which all of the protocol drivers in the protocol stack must adhere.

First, the Com Task invokes the Connect Operation of the highest level protocol driver by calling its Action Function with a Connect OpCode and the address of the Stack Data Struct. This creates a chain reaction through the protocol stack causing the connect handler of every protocol driver in the protocol stack to be invoked.

If the Connect Operation is successful, the Com Task will then invoke the Action Operation of the highest level protocol driver by calling its Action Function with an Action OpCode. Upon receiving the action request, the protocol driver may then check the ActionID Field of the Stack Data Struct to determine the type of Action which it needs to perform. In order to perform this action, internal functions of the protocol driver will have to invoke the Send Operation and Receive Operation of lower level protocol drivers in order to carry out communications. It is likely that these internal functions will also make calls to the interfaces provided by the Protocol Tool Kit.

Finally, the Com Task will invoke the Disconnect Operation of the highest level protocol driver by calling its Action Function with a Disconnect OpCode. This will create a chain reaction within the protocol stack which will disconnect the communication chain established by the Connect Operation.

APPENDIX H

Protocol Driver Overview

A Protocol Driver is implemented as a dynamic link library. Program linkage of a dynamic link library occurs at run time rather than at compile time. In the Communication Server, dynamic linkage is handled by the Com Task. When a Com Task receives instructions from the Com Controller to perform a particular poll, the Com Task loads into memory all dynamic link libraries (protocol drivers) which make up the required Protocol Stack. Once a dynamic link library has been loaded into memory, it may be queried for the addresses of any functions it may export. By definition, Protocol Drivers export only one function. This function is known as the Action Function. All requests to the protocol driver pass through this single function. The Action Function for a Protocol Driver must support 7 standard operations. These operations include an Action Operation, a Connect Operation, a Disconnect Operation, a Flush Input Buffer Operation, a Flush Output Buffer Operation, a Receive Operation, and a Send Operation. The type of operation a protocol driver will perform is determined by the types of parameters which are passed to the Action Function. Taken as a whole, the Action Function along with its supporting operations make up the Protocol Stack Messaging API.

APPENDIX H  137

Action Function

The Action Function is the only exported function of a Protocol Driver. The function prototype for the Action Function is as follows:

**bool ActionFunction(int OpCode, void * pFunctionParameters);**

Notice that the Action Function accepts two parameters and has a boolean return type. The first parameter, OpCode, indicates to the Action Function which type of operation to perform. All Protocol Drivers must support 7 standard operations. These operations include an Action Operation, a Connect Operation, a Disconnect Operation, a Flush Input Buffer Operation, a Flush Output Buffer Operation, a Receive Operation, and a Send Operation. The implementation of a typical Action Function would appear as follows:

```
bool ActionFunction(int OpCode, void * pFuncParms)
{
   bool Result = FALSE;

switch(OpCode)
   {
      case ActionOp:
      {
         /* Handle Action requests here */
         break;
      } /* end ActionOp */ case ConnectOp:
      {
         /* Handle Connect requests here */
         break;
      } /* end ConnectOp */ case DisconnectOp:
      {
         /* Handle Disconnect requests here */
         break;
      } /* end DisconnectOp */ case FlushInputBufferOp:
      {
         /* Handle FlushInputBuffer request here */
         break;
      } /* end FlushInputBufferOp */ case FlushOutputBufferOp:
      {
         /* Handle FlushOutputBuffer requests here */
         break;
      } /* end FlushOutputBufferOp */ case ReceiveOp:
      {
         /* Handle Receive request heres */
         break;
      } /* end ReceiveOp */
```

APPENDIX H

```
    case SendOp:
    {
      /* Handle Send requests here */
      break;
    } /* end SendOp */

} /* end switch Action */ return Result;

} /* end function ActionFunction */
```

The Action Function consists of little more than a switch statement which diverts control to the required operation handling routine. It is the responsibilty of these individual operation handlers to see that the result code returned by the Action Function is set appropriately.

APPENDIX H 139

Action Operation

All defined Actions for a Protocol Driver are carried out by making a call to its Action Function passing an Action OpCode as the first parameter and a null as the second parameter (the second parameter is ignored in this context). Typically, a switch statement is constructed which diverts control to the appropriate routine depending on the Action ID field of the Stack Data Struct. The syntax for a typical action operation handler is as follows:

```
bool ActionFunction(int OpCode, void * pFuncParms)
{
   bool Result = FALSE;

switch(OpCode)
   {
      case ActionOp:
      {
        switch(pStackData->ActionID)
        {
          case PERFORM_POLL
          {
            Result = PerformPoll();
            break;
          } /* end case PERFORM_POLL */ case SEND_CHANGED_POINTS
          {
            Result = SendChangedPoints();
            break;
          } /* end case SEND_CHANGED_POINTS */ case GET_TIME
          {
            Result = GetTime();
            break;
          } /* end case GET_TIME */ case SET_TIME
          {
            Result = SetTime();
            break;
          } /* end case SET_TIME */

} /* end switch pStackData->ActionID */
        break;
      } /* end case ActionOp */

} /* end switch OpCode */ return Result;

} /* end function ActionFunction */
```

Notice that in the above example, if the Action Function were called with an Action OpCode as the first parameter and the Action ID field of the Stack Data Struct was PERFORM_POLL that control would be diverted to the PerformPoll Function of the protocol driver. The PerformPoll Function would be an implementation specific function which would perform whatever actions

APPENDIX H 140 that this protocol driver deemed necessary for the successful completion of a poll. Other standard actions as well as custom actions could be implemented in the exact same manner. Note that the standard action constants such as PERFORM_POLL, SEND_CHANGED_POINTS, GET_TIME, and SET_TIME are defined in the panconst.h header file which is included in the Protocol Tool Kit. Action constants which are protocol specific are typically defined in the protocol driver interface.

APPENDIX H                                141

Connect Operation

The connect operation is the first and most important operation that a Protocol Driver will be required to perform. The connect handler for a protocol driver is invoked by making a call to the Action Function passing a Connect OpCode as the first parameter and a pointer to the Stack Data Struct as the second parameter. The connect handler for a protocol driver must accomplish 4 important tasks:

1. Establish internal pointers needed to manipulate protocol stack information.

2. Determine if the necessary protocol parameters have been properly loaded by the Com Task.

3. Invoke the connect handler of the next highest protocol driver in the protocol stack.

4. Perform any protocol specific communications duties.

Establish Internal Pointers

The first goal the connect handler must accomplish is establishing a pointer to the Stack Data Struct created by the Com Task. This is important because information vital to the protocol driver such as global stack information, protocol driver information, and protocol parameter information is contained in the Stack Data Struct. Without this information, the protocol driver could not continue. This pointer is usually given the name pStackData and is declared as follows:

STACK_DATA * pStackData pStackData = (STACK_DATA *) pFuncParms

It is also helpful for a protocol driver to maintain two other internal pointers. The first is a pointer which points to the information and parameters which are unique to the current protocol driver. This pointer is usually given the name pThisDriver and is declared as follows:

PROTOCOL_DRIVER * pThisDriver pThisDriver = pStackData->pCurrentDriver

The second pointer is a pointer which points to information specific to the next protocol driver in the protocol stack. Having this pointer allows the Action Function of the next protocol driver in the protocol stack to be called. This pointer is usually given the name pNextDriver and is declared as follows:

PROTOCOL_DRIVER * pNextDriver pNextDriver = (PROTOCOL_DRIVER *) pStackData->pCurrentDriver->pNextDriver

Verify Parameters

The second goal of the connect handler is to verify that all Protocol Parameters that it may need have been loaded properly by the Com Task. This is typically accomplished through an internal function known as the HandleParms Function which is invoked from the connect handler. The HandleParms Function essentially traverses the protocol parameter list associated with the current Protocol Driver Struct to assure that each of the expected protocol parameters can be found.

APPENDIX H 142

Invoke Next Driver's Connect Handler

The third goal of the connect handler is to invoke the connect handler of the next protocol driver in the protocol stack. Before this can be done the Current Driver Pointer of the Stack Data Struct must be advanced so the next protocol driver will associate the correct set of information with itself. This can be accomplished through the following statement:

pStackData->pCurrentDriver=(PROTOCOL_DRIVER *)pStackData->pCurrentDriver->pNextDriver Once the Current Driver Pointer of the Stack Data Struct has been advanced the connect handler of the next protocol driver can be invoked. This is accomplished through the pNextDriver pointer:

bool Result

Result = pNextDriver->ActionFunc(CONNECT_OP, pStack_Data)

/* Result == TRUE indicates all lowere level protocol drivers connected successfully */

Perform Protocol Specific Communications Duties

The final goal of the connect handler is to assure that any remaining protocol specific communications duties are handled. An example of this would be the Modem Protocol Driver initializing the modem after the lower level RS232 Protocol Driver has already opened the communications port. However, most high level protocol drivers will not need to be concerned with this step as the communication line will be properly be opened by the lower level protocol drivers.

96009

APPENDIX H 143

Disconnect Operation

The disconnect operation is called to disconnect the communication chain established by the Connect Operation. It is important that this communication chain be disconnected properly so that future Protocol Stacks will not encounter problems while attempting to use all or part of the hardware resources which are being used by the current protocol stack. The disconnect handler of a Protocol Driver is invoked by making a call the Action Function passing a Disconnect OpCode as the first parameter and Null as the second parameter (the second parameter is ignored in this context). To successfully disconnect the communications chain, a disconnect handler should follow these steps:

1. Perform any necessary protocol specific communications disconnect duties.

2. Invoke the disconnect handler of the next highest protocol driver in the protocol stack.

3. Reset any internal pointers.

Perform Protocol Specific Communications Disconnect Duties

The first goal of the disconnect handler is to perform any protocol specific communications disconnect duties. For example, the Modem Driver would toggle DTR here before calling the disconnect handler of the lower RS-232 Protocol Driver which would then close the associated communications port. However, most high level protocol drivers will not need to be concerned with this step as the communications chain will be properly disconnected by lower level protocol drivers.

Invoke Next Driver's Disconnect Handler

The second goal of the disconnect handler is to invoke the disconnect handler of the next highest protocol driver in the protocol stack. This can be accomplished through the following statement:

bool Result

Result = pNextDriver->ActionFunc(DISCONNECT_OP, NULL)

Reset Internal Pointers

The final goal of the disconnect handler is to reset any internal pointers which the protocol driver may have been using. Among these are the pStackData Pointer, pThisDriver Pointer and the pNextDriver Pointer.

pStackData = NULL
pThisDriver=NULL
pNextDriver=NULL

APPENDIX H 144

Flush Input Buffer Operation

The flush input buffer operation allows the input buffer of the current communications port to be cleared. This should always be done before attempting to receive characters from the current communications port. The flush input buffer handler of a Protocol Driver is invoked by calling the Action Function of a protocol driver with a FlushInputBuffer OpCode as the first parameter and a null as the second parameter (the second parameter is ignored in this context). Usually, the flush input buffer handler of a particular protocol driver simply calls the flush input buffer handler of the next highest protocol driver in the Protocol Stack. Eventually, this call will propogate through the protocol stack from the higher level protocol drivers until it reaches the RS-232 Protocol Driver where the input buffer flush will actually occur. The syntax for this call is as follows:

bool Result

Result = pNextDriver->ActionFunction(FlushInputBufferOp, NULL)

/* Result == TRUE indicates input buffer flushed successfully */

APPENDIX H 145

Flush Output Buffer Operation

The flush output buffer operation allows the output buffer of the current communications port to be cleared. This should always be done before attempting to send characters through the current communications port. The flush output buffer handler of a Protocol Driver is invoked by calling the Action Function of a protocol driver with a FlushOutputBuffer OpCode as the first parameter and a null as the second parameter (the second parameter is ignored in this context). Usually, the flush output buffer handler of a particular protocol driver simply calls the flush output buffer handler of the next highest protocol driver in the Protocol Stack. Eventually, this call will propogate through the protocol stack from the higher level protocol drivers until it reaches the RS-232 Protocol Driver where the output buffer flush will actually occur. The syntax for this call is as follows:

bool Result

Result = pNextDriver->ActionFunction(FlushOutputBufferOp, NULL)

/* Result == TRUE indicates output buffer was flushed successfully */

APPENDIX H 146

Receive Operation

The receive operation allows characters to be received from the communications port and passed through the Protocol Stack. The receive operation handler is invoked by a call to the Action Function passing a Receive OpCode as the first parameter and a pointer to a Receive Struct as the second parameter. Generally, a receive handler simply makes a call to the next highest protocol driver's receive handler without performing any further actions. Eventually, this call will propogate from higher level protocol drivers to the RS-232 Protocol Driver where the incoming characters will be read from the communications port and placed in the referenced Receive Struct. Higher level protocol drivers may then read the received characters from the Receive Struct. The syntax for calling the receive handler is as follows:

bool Result
RECEIVE_STRUCT ReceiveBuffer

/* Set appropriate fields of the ReceiveBuffer */

Result = pNextDriver->ActionFunction(ReceiveOp, &ReceiveBuffer)

/* Result == TRUE indicates characters were received successfully */

96009

APPENDIX H 147

Send Operation

The send operation allows characters to be sent from a Protocol Driver in the Protocol Stack to the current communications port. The send handler is invoked by a call to the Action Function passing a Send OpCode as the first parameter and a pointer to a Send Struct as the second parameter. Generally, a send handler simply makes a call to the next highest protocol driver's send handler. Eventually, this call will propogate through the protocol stack from higher level protocol drivers to the RS-232 Protocol Driver where the characters in the Send Struct will be sent through the communications port. The syntax for this call is as follows:

```
bool Result
SEND_STRUCT SendBuffer

/* Set appropriate fields of the SendBuffer */

Result = pNextDriver->ActionFunction(SendOp, &SendBuffer)

/* Result == TRUE indicates characters were sent successfully */
```

APPENDIX H

Predefined Data Structures

Many predefined data structures have been declared to facilitate communication throughout the Protocol Stack. The Stack Data Struct is initialized by the Com Task at the beginning of a poll and contains information vital to the protocol stack. The Stack Data Struct contains information global to all protocol drivers in the protocol stack as well as information specific to individual protocol drivers. The Protocol Driver Struct is a struct which contains information which is unique to a particular protocol driver. All Protocol Driver Structs contain a linked list of Protocol Parm Structs which contains information about the Protocol Parameters for a particular protocol driver.

Two other commonly used structs are the Send Struct and the Receive Struct. The Send Struct is a structure which allows higher level protocol drivers to send characters through the protocol stack to the RS-232 level. The Receive Struct allows characters to be received from the RS-232 level and transported to higher level protocol drivers.

APPENDIX H 149

Stack Data Struct

The Stack Data Struct is a predefined data structure which is vital to the Protocol Stack. The Stack Data Struct contains two distinct types of data. The first is data which is not specific to any one particular Protocol Driver in the protocol stack but rather contains data which is global to the entire protocol stack. Such information includes identifiers which specify which communications server the protocol stack is currently operating under, the device which is currently being polled, the action which is currently being carried out, etc. Though the information in this section is available to all protocol drivers in the protocol stack, individual protocol drivers may need only to access certain parts (if any) of this information.

The second type of data which is stored in the Stack Data Struct is data which is specific to individual protocol drivers. This information is stored in a linked list data structure. The information stored in the first node of the linked list is specific to the highest level protocol driver while the information stored in the last node of the linked list applies to the lowest level protocol driver. Notice also that there is current driver pointer which always point to the node (protocol driver) in the Protocol Driver Linked List which is currently under consideration.

```
typedef struct
{
/* Global Stack Information */
long ComserverId;
long DeviceId;
long StackId;
long PollId;
long ActionId;
char DeviceName[DB_STRING_LENGTH];
char RemoteAddress[DB_STRING_LENGTH];
int Seq;
char AllowReset[CHAR_LENGTH];
int TimeDiffReset;
int ComGroup;
byte ComPort;
bool AAMode;
bool UserCancel;
bool IncomingRequest;

void * pTask;
PCHECKUSERCANCEL_FN CheckUserCancelFunc;
PSETAAINFO_FN SetAAInfoFunc;
PEAVESDROP_FN EavesDropFunc;

/* Protocol Specific Information */

/* List of all drivers in stack */
PROTOCOL_DRIVER * DriverList;
/* Current driver pointer */
PROTOCOL_DRIVER * pCurrentDriver;
} STACK_DATA;
```

Global Stack Information

| | |
|---|---|
| ComServerID | Identifies the communications server under which the current protocol stack is operating. |

APPENDIX H                                          150

| | |
|---|---|
| DeviceID | Identifies the remote device with which the protocol stack is currently communicating. |
| StackID | Identifies the protocol stack which has been loaded by the Com Task. |
| PollID | Identifies the poll which is currently being performed by the protocol stack. |
| ActionID | Identifies the action which is being carried out by the protocol stack. |
| DeviceName | The name of the remote device which is being polled. |
| RemoteAddress | The remote address of the device which is being polled. |
| Seq | The sequence of the poll. |
| AllowReset | Indicates if the remote device time should be updated to match the current host time:<br><br>'Y' - Update the remote device time.<br>'N' - Do not update the remote device time. |
| TimeDiffReset | The number of seconds the remote device time can vary from the current host time before resetting the remote device time. |
| ComGroup | The communications group in which the current communications port has been grouped. |
| ComPort | The communications port which is being used by the current protocol stack. |
| AAMode | Indicates if any auto answer protocol drivers in the protocol stack should be operating in auto answer mode.<br><br>True - Operate in auto answer mode<br>False - Operate in normal mode |
| UserCancel | Indicates if a user cancel request has been submitted to the protocol stack.<br><br>True - User cancel request has been submitted<br>False - User cancel request has not been submitted |
| IncomingRequest | Indicates if an incoming request has been detected for the protocol stack. This field is usually monitored while a protocol stack is operating under auto answer mode so that incoming requests from the related Com Task can be handled while an incoming call is not being processed. |

96009

APPENDIX H                                    151

| | |
|---|---|
| pTask | This field contains the address of the Com Task which is associated with the protocol stack. This address is needed so callback functions can be invoked from a protocol driver. For example, the Check User Cancel Function could be invoked from a protocol driver through the following call:<br><br>pTask->CheckUserCancelFunc() |
| CheckUserCancelFunc | A callback function which requests that the associated Com Task check for incoming user cancel requests and updates the UserCancel Field accordingly. This function should be called at regular intervals by the protocl driver to check for new incoming user cancel requests. The pTask field must also be used to make this call. |
| SetAAInfoFunc | A callback function which tells the associated Com Task which poll to perform on the calling remote unit. The pTask field must also be used to make this call. |
| EavesDropFunc | A callback function which allows send and receive characters to be written to a special eaves drop buffer. This function is used only by the RS-232 Protocol Driver. |

Protocol Specific Information

| | |
|---|---|
| pDriverList | A list of Protocol Driver Structs which contain information related to individual protocol drivers in the protocol stack. |
| pCurrentDriver | A pointer to the current protocol driver in the Protocol Driver List. This pointer is used to traverse the Current Protocol Driver List.<br>For more information see Connect Operation. |

96009

APPENDIX H                    152

Protocol Driver Struct

The Protocol Driver Struct contains information which is specific to a particular protocol driver. Information such as the handle to the protocol driver (dynamic link library module), the address of the Action Function, certain identifiers for the protocol driver, as well as the name of the dynamic link library module and the user defined protocol driver name are stored in this struct. The Protocol Driver Struct also contains a second type of information which is stored in a linked list structure. Each node in this list corresponds to a Protocol Parameter Struct which is specific to the protocol driver. There is also a current parameter pointer which is used to traverse the Protocol Parameter List.

```
typedef struct
{
/* Handle to the driver */
HDLL hDriver;
/* Protocol Action function address */
PACTION_FN ActionFunction;

int PDriverId;
int ProtocolId;
int Sequence;
char DriverFileName[DB_STRING_LENGTH];
char DriverName[DB_STRING_LENGTH];

/* List of parms associated with driver */
PROTOCOL_PARM * pDriverParms;
/* Pointer to the current parm */
PROTOCOL_PARM * pCurrentParm;

/* Pointer to next driver in list */
void * pNextDriver;

} PROTOCOL_DRIVER;
```

| | |
|---|---|
| hDriver | The handle to the dynamic link library module. This is used by the Com Task to unload a protocol driver from memory after a poll has completed. This field should never be accessed from the protocol driver level. |
| ActionFunction | The Action Function address of the protocol driver. |
| PDriverId | The PDriverID associated with the protocol driver as read from the Protocol Driver Table of the database. |
| ProtocolID | The ProtocolID associated with the protocol driver as read the database. |
| Sequence | The sequence of this protocol driver in the protocol stack. |
| DriverFileName | The name of the dynamic link library module associated with this protocol driver. |
| DriverName | The user defined name for this protocol driver. |
| pDriverParms | A pointer to a linked list of Protocol Parameter Structs which hold the Protocol Parameters associated with the protocol driver. |

APPENDIX H 153 pCurrentParm  A current parameter pointer which is used to traverse the Protocol Parameter List.

pNextDriver  A pointer to the next Protocol Driver Struct in the Protocol Driver List. If this pointer is NULL, this is the last Protocol Driver Struct in the Protocol Driver List.

APPENDIX H                              154

Protocol Parm Struct

A Protocol Parm Struct holds information about a Protocol Parameter. Every Protocol Driver Struct has a linked list of Protocol Parm Structs which contains the parameter information associated with that protocol driver. All Protocol Parm Structs are placed in this link list in order of their Parm ID fields.

```
typedef struct
{
 int ParmId;
 int Seq;
 char ParmValue[DB_STRING_LENGTH];
 int ActionId;
 char ParmName[DB_STRING_LENGTH];
 char ValueDesc[DB_STRING_LENGTH];
 char EditFormat[DB_STRING_LENGTH];
 void * pNextParm;
} PROTOCOL_PARM;
```

| | |
|---|---|
| ParmId | The ParmId for this parameter as read from the database. |
| Seq | The sequence of this parameter in the Protocol Parameter List. |
| ParmValue | The actual value of the parameter. |
| ActionId | The Action (if any) with which this parameter is associated. |
| ParmName | The name for this parameter. |
| ValueDesc | Description of the parameter value (units, etc). |
| EditFormat | A C-style edit format specifier for the parameter. |
| pNextParm | A pointer to the next Protocol Parameter in the Protocol Parameter List. If this pointer is NULL, this is the last Protocol Parameter in the the Protocol Parameter List. |

APPENDIX H 155

Send Struct

The Send Struct is used by a Protocol Driver to send characters through the Protocol Stack to the communications port. To accomplish this, a protocol driver must allocate a Send Struct locally, set the necessary fields of the struct, and then call the Action Function of the next highest protocol driver with a Send OpCode as the first parameter and the address of the Send Struct as the second parameter.

```
typedef struct
{
    /* Holds the characters to send */
    char SendBuffer[MESSAGE_BUFFER_LENGTH];

/* The number of characters in the Send Buffer */
    int SendBufferLength;
} SEND_STRUCT;
```

SendBuffer  Holds the characters which are to be sent to the communications port. MESSAGE_BUFFER_LENGTH is currently defined to be 4K.

SendBufferLength  The number of characters which have been placed in the Send Struct.

APPENDIX H    156

Receive Struct

A Receive Struct is used by a Protocol Driver to receive characters from the communications port. The Receive Struct allows for 3 basic types of messages to be received:

| | |
|---|---|
| Fixed Length Messages | The Fixed Length Message is the most primitive type of message which may be received. The length of a Fixed Length Message is known before the message is received. |
| Terminated Messages | Terminated Messages vary in length and are terminated by a protocol driver indicated message terminator. |
| Time Terminated Messages | Time Terminated Messages vary in length and are terminated by a given amount of time passing before any further characters are received. |

To receive a message from the communications port, a protocol driver must allocate a local Receive Struct and set the appropriate fields depending on the type of message which is expected to be received. A call is then made to the Action Function of the next highest protocol driver in the protocol stack passing a Receive OpCode as the first parameter and the address of the local Receive Struct as the second parameter. If the Action Function returns successfully, the Receive Buffer Field of the Receive Struct will hold the received message while the ReceiveBufferLength Field will indicate the number of characters read from the communications port.

```
typedef struct
{
 /* Message type to receive */
 enum MessageType MsgType;

/* The length of a fixed message. Note that when receiving a message */
 /* of any type, the message being read cannot be larger than MESSAGE_ */
 /* BUFFER_LENGTH.                                                     */
 int MessageLength;

/* The terminator for a Terminated Message */
 char Terminator[TERMINATOR_LENGTH];

/* The length of the Terminator when Terminated Message */
 int TerminatorLength;

/* The Time Terminator when Timed Message */
 long TimeTerminator;

/* Amount of time for Wait I/O routines to wait before returning */
 long TimeOut;

/* Holds received characters */
 char ReceiveBuffer[MESSAGE_BUFFER_LENGTH];

/* The number of characters returned in the receive buffer */
 int ReceiveBufferLength;

} RECEIVE_STRUCT;
```

96009

APPENDIX H                           157

| | |
|---|---|
| MsgType | The type of message expected to be received. Possible message types include FixedLength, Terminated, and Timed. |
| MessageLength | The length of the message to be received when MsgType is FixedLength. |
| Terminator | The terminating character sequence when MsgType is Terminated. |
| TerminatorLength | The length of the terminating character sequence when MsgType is Terminated. |
| TimeTerminator | The number of milliseconds which indicate message termination when MsgType is Timed. |
| TimeOut | The number of milliseconds for Wait I/O routine to wait for characters before returning. |
| ReceiveBuffer | Holds the characters read from the communications port. The ReceiveBuffer can currently hold up to 4K characters. The Receive Buffer should always be cleared before attempting to receive a new message. |
| ReceiveBufferLength | Indicates the number of characters which were read into the ReceiveBuffer. |

APPENDIX H

Internal Protocol Driver Structures

Typically, all Protocol Drivers contain 4 common internal constructs which help with data manipulation. The HandleParms Function is a common function which is invoked during the Connect Operation. It assures that all defined parameters for the protocol driver have been properly loaded by the Com Task. The pStackData Pointer is a pointer which points to the Stack Data Struct which is created by the Com Task. The pThisDriver Pointer is a pointer which points to information specific to the current protocol driver. The pNextDriver Pointer is a pointer which allows access to the Action Function of a lower level protocol driver.

APPENDIX H                              159

HandleParms Function

The HandleParms Function is a function which is invoked during the Connect Operation. The purpose of this function is to ensure that all protocol driver defined parameters have been loaded by the Com Task. This is accomplished by traversing the Protocol Parameter List associated with the pThisDriver Pointer. The code for a typical HandleParms Function is given below.

//─────────────────────────────────────────────────

```
// Traverses the parameter list associated with this driver and interprets
// each parameter in list. If a parameter needed by this driver is not found
// in the parameter list, this function will return FALSE.

bool HandleParms()
{
  bool Result = FALSE,
       Parm1Found = FALSE,
       Parm2Found = FALSE;

PROTOCOL_PARM * pCurrentParm = pThisDriver->pDriverParms;

while (pCurrentParm)
  {
   switch (pCurrentParm->ParmId)
   { case PARM1 :
     {
       strcpy(Parm1, pCurrentParm->ParmValue);
       cout << "HandleParms - Parm1 = " << Parm1 << endl;
       Parm1Found = TRUE;
       break;
     } // end case PARM1 case PARM2 :
     {
       TimeOut = atol(pCurrentParm->ParmValue);
       cout << "HandleParms - Parm2 = " << Parm2 << endl;
       Parm2Found = TRUE;
       break;
     } // end case PARM2

} // end switch

// Advance Current Parm Ptr
   pCurrentParm = (PROTOCOL_PARM *) pCurrentParm->pNextParm;

} // end while

Result = (Parm1Found && Parm2Found);

if (! Result) cout << "Protocol Driver did not find all needed parms" << endl;

return Result;
```

96009

APPENDIX H    160

} // end function HandleParms

In the above example, the defined constants PARM1 and PARM2 are defined contants which are assigned the ParmId values of the expected protocol parameters (normally these constants are given meaningful names such as TIMEOUT, DELAY, etc.). These values are normally defined in the interface portion of the protocol driver. It is generally helpful for a protocol driver to print the values of the parameters as they are encountered for debugging purposes. Notice that if any of the expected parameters are not found, this function will return FALSE.

APPENDIX H 161 pStackData Pointer

The pStackData Pointer is an internal Protocol Driver pointer which points to the Stack Data Struct. This pointer is initialized during the Connect Operation. The pStackData Pointer gives the protocol driver access to the information which is important to the current Protocol Stack.

APPENDIX H                         162 pThisDriver Pointer

The pThisDriver Pointer is an internal Protocol Driver pointer which points to the Protocol Driver Struct which contains information relative to the current protocol driver. This pointer is initialized during the Connect Operation. Information such as the protocol driver name and Parameter information can be accessed through this pointer.

APPENDIX H 163 pNextDriver Pointer

The pNextDriver Pointer in an internal Protocol Driver pointer which points to the Protocol Driver Struct of the next protocol driver in the Protocol Stack. The main purpose of this pointer is to give a protocol driver access to the Action Function of the next protocol driver in the protocol stack.

96009

APPENDIX H                              164

Protocol Tool Kit

The Protocol Tool Kit facilitates the development of third party based Protocol Drivers. The Protocol Tool Kit includes the following components:

- An example 'C' template Protocol Driver
- The Protocol Stacking API
- The Database Access API
- The RS232 Access API
- A Protocol Driver Documentation Template The example 'C' template Protocol Driver serves as a working example of a protocol driver which makes use of the Common Messaging API to which all Protocol Drivers must adhere.

The Protocol Stacking API consists of header files which must be included in the source code of a protocol driver. These header files define the Common Messaging API of the Protocol Stack as well as various Predefined Data Structures which will be needed to successfully implement a protocol driver. These header files provide a common link for all protocol drivers written to the Common Messaging API specification.

The Database Access API provides an easy to use API for accessing common database objects. These objects include histories, points, groups of points, events, and poll configurations. When performing a poll, the protocol driver traverses a poll list which contains the objects to be used in the poll, such as the histories, points, and groups of points. It is then the protocol driver's responsibility to translate the device's technique of managing data to these common database objects.

The RS232 layer provides full access to a multitude of RS232 level API functions for use by any protocol driver. This layer is primarily useful for protocol drivers which must deal directly with RS232, such as a modem or radio driver. A higher level protocol driver should avoid the use of this layer, since it is direct access to the physical layer of the protocol stack. In the future, the physical layer could include other media, such as Ethernet with TCP/IP. A higher level protocol driver would then be safely useable across the new media.

The Protocol Driver Documentation Template is simply a suggested method for documenting a protocol driver. By properly documenting a protocol driver, the end-user can make better use of unique features the driver may support, and provide an important view of how to properly operate the driver.

APPENDIX I

Database Layer API

DB_ClearChangedPoint
DB_Connection
DB_CreateChangedPointsList
DB_CreateHistColList
DB_CreateListOfFolderContents
DB_CreateListOfPollContents
DB_CreatePointDataList
DB_CreatePollDataList
DB_EndAuditTrail
DB_EndHistory
DB_EndWritePointData
DB_GetHistoryType
DB_GetStringData
DB_HistoryAddress
DB_InitAlarmEvaluationList
DB_Initialize
DB_InitializeHistoryRecord
DB_InsertDevDataFolder
DB_InsertDevicePoint
DB_NextChangedPoint
DB_NextFolderItem
DB_NextHistCol
DB_NextPoint
DB_NextPoll
DB_SetDeviceTime
DB_StartAuditTrail
DB_StartHistory
DB_StartWritePointData
DB_WriteAuditTrail
DB_WriteComEvent
DB_WriteHistory
DB_WritePointData

APPENDIX I

DB_ClearChangedPoint

Deletes changed point associated with a particular PointId.

Usage　　　Status = DB_ClearChangedPoint (PointId);

Parameters　　PointId -- An integer arguement that uniquely identifies a particular point within the database.

Status -- DB_ClearChangedPoint can return the following values for the associated reasons:

DB_Success -- The changed point was successfully cleared from the database.

DB_SqlExecuteFailed -- Unable to find point data associated with the given DeviceId and PointId.

DB_SqlAllocateFailed -- Internal database error occurred.

Description　　Successive calls to this function clear all points in the database which were added to the changed point list through function DB_CreateChangedPointsList. A call to this routine deletes a single changed point from the database which is associated with the given DeviceId and PointId.

See Also　　DB_CreateChangedPointsList
　　　　　　　DB_NextChangedPoint

Example

```
#include "db3int.hpp"

void main()
{
 DB_StatusType Status = DB_Success;
 int DeviceId = 1,
     NumberFound = 0;
 DB_PointData NextPoint;

Status = DB_CreateChangedPointsList (DeviceId, &NumberFound);
 while (Status == DB_Success)
 {
   Status = DB_NextChangedPoint(&NextPoint);
   if (Status == DB_Success)
   {
     .
     .
     .
     Status = DB_ClearChangedPoint(NextPoint.PointID);
```

APPENDIX 1

```
    } /* end if */
  } /* end while */

} /* end function */
```

APPENDIX I                          168

DB_Connection

Returns the connection handle which is currently being used by the database interface.

Usage       hConnect = DB_Connection();

Parameters  hConnect -- A database connection handle.

Description This function returns the connection handle which is currently being used by the database interface. A null return value may indicate that the database interface has not yet been initialized by a call to DB_Initialize.

See Also    DB_Initialize

Example

NOTE: The protocol driver shall not call this routine.

```
#include "db3int.hpp"

void main()
{
  DB_ConnectionType hConnect = NULL;

hConnect = DB_Connection();

} /* end function */
```

APPENDIX 1 169

DB_CreateChangedPointsList

Create an internal list of all changed points for a particular device.

Usage      Status = DB_CreateChangedPointsList (DeviceId, &NumberFound);

Parameters   DeviceId -- An integer argument that uniquely identifies a device on a particular
                communications server.

NumberFound -- A pointer to a user allocated integer variable which will return the
                number of changed points found by this routine.

Status -- DB_CreateChangedPointsList can return the following values for the
                associated reasons:

DB_Success -- A changed point data list was created for the given DeviceId.

DB_SqlFetchFailed -- Unable to find point data associated with the given DeviceId.

DB_NoMoreData -- No changed points were found.

DB_ListInsertFailed -- Unable to insert changed point data into changed point list.

DB_OtherFailed -- An internal database error of invalid poll type has been detected

Description   This function accepts a Device Id that uniquely identifies a device residing on a particular
                communications server. A call to this function constructs an internal list of the changed
                data points associated with the device. The list of points is accessible one element at a time
                through DB_NextChangedPoint. Subsequent calls to DB_NextChangedPoint return the
                successive elements of the internal list. Calls to DB_NextChangedPoint consume the
                internal list.

See Also     DB_NextChangedPoint
                DB_ClearChangedPoint

Example

```
#include "db3int.hpp"

void main()
{
  DB_StatusType Status = DB_Success;
  int DeviceId = 1,
     NumberFound = 0;
  DB_PointData NextPoint;

Status = DB_CreateChangedPointsList (DeviceId, &NumberFound);
  while (Status == DB_Success)
  {
```

96009

APPENDIX 1                          170

```
      Status = DB_NextChangedPoint(NextPoint);
      if (Status == DB_Success)
      {
        ...
        /* Process Changed Point */
        ...
      } /* end if */
    } /* end while */

} /* end function */
```

96009

APPENDIX I 171

DB_CreateHistColList

Create an internal list of history column data associated with a particular history poll.

| | |
|---|---|
| Usage | Status = DB_CreateHistColList (HistoryPollData, &NumberFound); |
| Parameters | HistoryPollData -- This DB_PollData structure identifies the history poll item for which a history column list is to be constructed. This is obtained by calls to DB_CreatePollDataList and DB_NextPoll. |
| | NumberFound -- This in a pointer to a user allocated integer variable. The number of history columns found to be associated with the given poll item is assigned to this variable. |
| | Status -- DB_CreateHistColList can return the following values for the associated reasons: |
| | DB_Success -- The list of history columns has been successfully created. |
| | DB_BadPointer -- The poll data is not a history item. |
| | DB_ListInsertFailed -- Unable to insert history column data into internal list. |
| Description | This function accepts a poll item that describes all or part of a history poll. Each item of the poll (which could be a single point, a folder of data points, a folder of data folders, or a history) has a database entry. This information is required to perform that poll. A call to this function constructs an internal list of the history columns associated with a history part of the poll. The list of history column data is accessible one element at a time through DB_NextHistCol. Subsequent calls to DB_NextHistCol return the successive elements of the internal list. The use of this function is preceded by calls to DB_CreatePollDataList and DB_NextPoll. The poll data from DB_NextPoll are then fed into this routine to get the assigned history column data. |
| See Also | DB_CreatePollDataList<br>DB_NextPoll<br>DB_CreatePointDataListDB_NextPoint |

Example include "db3int.hpp"

void main()
{
  DB_StatusType Status = DB_Success;
  DB_PointData NextHistCol;
  int NumberFound = 0;

Status = DB_CreateHistColList (HistoryPollData, &NumberFound);
  while (status == DB_Success)

APPENDIX I                                  172

```
    {
      Status = DB_NextHistCol (NextHistCol);
      // process history column information
    } /* end while */

} /* end function */
```

APPENDIX 1                                    173

DB_CreateListOfFolderContents

Creates a list of all subfolders and single points within a particular folder.

Usage         Status = DB_CreateListOfFolderContents(ParentFolder, &NumberFound)

Parameters    Parent -- This DB_FolderItem structure identifies the ParentFolder for which a contents list is to be constructed.

NumberFound -- This in a pointer to a user allocated integer variable. The number of items associated with the given ParentFolder is assigned to this variable.

Status -- DB_CreatePointDataList can return the following values for the associated reasons:

DB_Success -- A list of contents has been successfully created for the ParentFolder.

DB_SqlExecuteFailed -- Failed to execute an internal data base query.

DB_SqlAllocateFailed -- Failed to allocate database statement handle.

DB_SqlFetchFailed -- Failed to fetch data from the data base.

DB_ListInsertFailed -- Failed to add a data member to the folder contents list.

Description   This function accepts the Parent DB_FolderItem for which an internal list of contents will be constructed. DB_FolderItem structs may then be fetched from the internal list of contents one item at a time through subsequent calls to DB_NextFolderItem. The use of this function is preceded by calls to DB_CreatePollDataList, DB_NextPoll, DB_CreateListOfPollContents, and DB_NextFolderItem.

See Also      DB_CreatePollDataList
                  DB_NextPoll
                  DB_CreateListOfPollContents
                  DB_NextFolderItem

Example

```
#include "db3int.hpp"

void main()
{
  DB_StatusType Status = DB_Success;
  int DeviceId = 1,
      PollId = 1,
      NumberFound = 0;
  struct DB_PollData Poll;
  struct DB_FolderItem FolderItem
```

96009

APPENDIX 1                              174

NewFolderItem;

```
Status = DB_CreatePollDataList(DeviceId, PollId, &NumberFound);
if (Status == DB_Success) && (NumberFound > 0)
{
  Status = DB_NextPoll(&Poll);
  if (Status == DB_Success)
  {
    Status = DB_CreateListOfPollContents(Poll, &NumberFound);
    if (Status == DB_Success) && (NumberFound > 0)
    {
      Status = DB_NextFolderItem(&FolderItem);
      if (Status == DB_Success)
      {
        Status = DB_CreateListOfFolderContents(FolderItem, &NumberFound);
        if (Status == DB_Success) && (NumberFound > 0)
        {
           Status = DB_NextFolderItem(&NewFolderItem);
        } /* end if DB_CreateListOfFolderContents */
      } /* end if DB_NextFolderItem */
    } /* end if DB_CreateListOfPollContents */
  } /* end if DB_NextPoll */
} /* end if DB_CreatePollDataList */

} /* end function */
```

96009

APPENDIX 1	175

DB_CreateListOfPollContents

Creates a list of poll contents for a particular poll configuration.

| | |
|---|---|
| Usage | Status = DB_CreateListOfPollContents(PollData, &NumberFound) |
| Parameters | PollData -- This DB_PollData structure identifies the PollData item for which a contents list is to be constructed. |
| | NumberFound -- This is a pointer to a user allocated integer variable. The number of items associated with the given PollData is assigned to this variable. |
| | Status -- DB_CreateListOfPollContents can return the following values for the associated reasons: |
| | DB_Success -- A list of contents has been successfully created for the passed PollData. |
| | DB_SqlExecuteFailed -- Failed to execute an internal data base query. |
| | DB_SqlAllocateFailed -- Failed to allocate database statement handle. |
| | DB_SqlFetchFailed -- Failed to fetch data from the data base. |
| | DB_ListInsertFailed -- Failed to add a data member to the poll contents list. |
| Description | This function accepts the PollData for which an internal list of contents will be constructed. DB_FolderItem structs may then be fetched from the internal list of contents one item at a time through subsequent calls to DB_NextFolderItem. The use of this function is preceded by calls to DB_CreatePollDataList and DB_NextPoll. |
| See Also | DB_CreatePollDataList<br>DB_NextPoll<br>DB_CreateListOfPollContents<br>DB_NextFolderItem |

Example

```
#include "db3int.hpp"

void main()
{
  DB_StatusType Status = DB_Success;
  int DeviceId = 1,
      PollId = 1,
      NumberFound = 0;
  struct DB_PollData Poll;
  struct DB_FolderItem FolderItem
                       NewFolderItem;
```

96009

APPENDIX I

```
    Status = DB_CreatePollDataList(DeviceId, PollId, &NumberFound);
    if (Status == DB_Success) && (NumberFound > 0)
    {
      Status = DB_NextPoll(&Poll);
      if (Status == DB_Success)
      {
        Status = DB_CreateListOfPollContents(Poll, &NumberFound);
        if (Status == DB_Success) && (NumberFound > 0)
        {
          Status = DB_NextFolderItem(&FolderItem);
          if (Status == DB_Success)
          {
            Status = DB_CreateListOfFolderContents(FolderItem, &NumberFound);
            if (Status == DB_Success) && (NumberFound > 0)
            {
              Status = DB_NextFolderItem(&NewFolderItem);
            } /* end if DB_CreateListOfFolderContents */
          } /* end if DB_NextFolderItem */
        } /* end if DB_CreateListOfPollContents */
      } /* end if DB_NextPoll */
    } /* end if DB_CreatePollDataList */

} /* end function */
```

APPENDIX I 177

DB_CreatePointDataList

Creates a list of all data points for a particular poll.

| | |
|---|---|
| Usage | Status = DB_CreatePointDataList(PollData, &NumberFound) |
| Parameters | PollData -- This DB_PollData structure identifies the poll data item for which a point list is to be constructed. This is obtained by calls to DB_CreatePollDataList and DB_NextPoll. |
| | NumberFound -- This is a pointer to a user allocated integer variable. The number of points associated with the given poll item is assigned to this variable. |
| | Status -- DB_CreatePointDataList can return the following values for the associated reasons: |
| | DB_Success -- A list of points has been successfully created for the PollData. |
| | DB_BadPointer -- The poll data is a history item. |
| | DB_ListInsertFailed -- Unable to insert point data into internal list. |
| Description | This function accepts a poll item that describes all or part of a poll. Each item of the poll (which could be a single point, a folder of data points, a folder of data folders, or a history) may have many associated points. A call to this function constructs an internal list of the data points associated with that poll. The list of points is accessible one element at a time through DB_NextPoint. Subsequent calls to DB_NextPoint return the successive elements of the internal list. The use of this function is preceded by calls to DB_CreatePollDataList and DB_NextPoll. The poll data from DB_NextPoll are fed into this routine to get the assigned points. |
| See Also | DB_CreatePollDataList<br>DB_NextPoll<br>DB_NextPoint |

Example

```
#include "db3int.hpp"

void main()
{
  DB_StatusType Status = DB_Success;
  int DeviceId = 1,
     PollId = 1,
     NumberFound = 0;
  struct DB_PollData PollData;
  struct DB_PointData NextPoint;

Status = DB_CreatePollDataList(DeviceId, PollId, &NumberFound);
```

96009

APPENDIX I

```
    if (Status == DB_Success) && (NumberFound > 0)
    {
     Status = DB_NextPoll(&PollData);
     if (Status == DB_Success)
     {
      Status = DB_CreatePointDataList(PollData, &NumberFound);
      if (Status == DB_Success) && (NumberFound > 0)
      {
       Status = DB_NextPoint(&NextPoint);
      } /* end if  DB_CreatePointDataList */
     } /* end if DB_NextPoll */
    } /* end if DB_CreatePollDataList */

} /* end function */
```

96009

APPENDIX I                                                    179

DB_CreatePollDataList

Construct a list of poll data given a Device Id and Poll Id.

Usage  Status = DB_CreatePollDataList(DeviceId, PollId, &NumberFound);

Parameters  DeviceId -- An integer argument that uniquely identifies a device on a particular communications server.

PollId -- An integer argument that uniquely identifies a poll for a particular device.

NumberFound -- A pointer to a user allocated integer variable. The number of poll data items found for the poll is stored in this variable.

Status -- DB_CreatePollDataList can return the following values for the associated reasons:

DB_Success -- A poll data list was successfully created for the device and poll pair.

DB_SqlFetchFailed -- Unable to find poll data associated with the device and poll pair.

DB_ListInsertFailed -- Unable to insert poll data into internal list.

DB_OtherFailed -- An internal processing error was caused by an invalid poll type.

Description  This function accepts a device id and poll id that uniquely identify a poll. Each item of the poll (which could be a single point, a folder of data points, a folder of data folders, or a history) has a database entry. The performance of a poll requires this information. A call to this function constructs an internal list of these items, which is accessible one element at a time through DB_NextPoll. Subsequent calls to DB_NextPoll return the elements of the internal list. The use of this function must first be preceded by a call to DB_Initialize.

See Also  DB_NextPoll

Example

```
#include "db3int.hpp"

void main()
{
  DB_StatusType Status = DB_Success;
  int DeviceId = 1,
      PollId = 1,
      NumberFound = 0;
  struct DB_PollData PollData;
  struct DB_PointData NextPoint;

Status = DB_CreatePollDataList(DeviceId, PollId, &NumberFound);
  if (Status == DB_Success) && (NumberFound > 0)
  {
```

APPENDIX I

```
        Status = DB_NextPoll(&PollData);
        if (Status == DB_Success)
        {
          Status = DB_CreatePointDataList(PollData, &NumberFound);
          if (Status == DB_Success) && (NumberFound > 0)
          {
           Status = DB_NextPoint(&NextPoint);
          } /* end if  DB_CreatePointDataList */
        } /* end if DB_NextPoll */
      } /* end if DB_CreatePollDataList */

} /* end function */
```

APPENDIX I  181

DB_EndAuditTrail

Finalize the audit trail writing process and update status information concerning the audit trail.

Usage  Status = DB_EndAuditTrail(DeviceHistId, LastAuditTrailData);

Parameters  DeviceHistId -- Uniquely identifies the associated History Device which stores the corresponding Audit Trail Information.

LastAuditTrailData -- This DB_AuditTrail struct is the same DB_AuditTrail struct which was last written to the data base through function DB_WriteAuditTrail.

Status -- DB_EndHistory can return the following values for the associated reasons:

DB_Success -- The audit trail data has been successfully written to the database and the last record written and last time stamp fields in DeviceHistory and DevHistCol have successfully updated.

DB_SqlAllocateFailed -- Unable to allocate statement handle to database.

DB_SqlExecuteFailed -- Unable to update last history record number and last time stamp in DeviceHistory and DevHistCol tables.

Description  This subroutine finalizes a stream of audit trail recording. The function updates status information about a particular audit trail, including setting the last record written and the last timestamp in the DeviceHistory table.

See Also  DB_StartAuditTrail
DB_WriteAuditTrail

Example

```
#include "db3int.hpp"

void main()
{
  DB_StatusType Status = DB_Success;
  int DeviceId = 1,
      PollId = 1,
      NumberFound = 0;
  struct DB_PollData PollData;
  DB_HistoryType HistoryType = DB_RemoteHistory;
  DB_AuditTrailData ATData;

Status = DB_CreatePollDataList(DeviceId, PollId, &NumberFound);
  if (Status == DB_Success) && (NumberFound > 0)
  {
    Status = DB_NextPoll(&PollData);
```

APPENDIX I

```
      if (Status == DB_Success)
      {
        if (PollData.PollType == DB_History)
        {
          Status = DB_GetHistoryType(PollData.PollID, HistoryType);
          if (Status == DB_Success)
          {
            if (HistoryType == DB_AuditTrail)
            {
              Status = DB_StartAuditTrail(PollData.PollID);
              if (Status = DB_Success)
              {
                /* Set appropriate fields of ATData */

Status = DB_WriteAuditTrail(ATData);
                if (Status == DB_Success)
                {
                  Status = DB_EndAuditTrail(PollData.PollID, ATData);
                } /* end if DB_WriteAuditTrail */
              } /* end if DB_StartAuditTrail */
            } /* end if DB_AuditTrail */
          } /* end if DB_GetHistoryType */
        } /* end if DB_History */
      } /* end if DB_NextPoll */
    } /* end if CreatePollDataList */

} /* end function */
```

APPENDIX I

DB_EndHistory

Finalize the history writing process and updates status information about the history poll.

Usage  Status = DB_EndHistory ();

Parameters  Status -- DB_EndHistory can return the following values for the associated reasons:

> DB_Success -- The history data has been successfully written to the database and the last record written and last time stamp fields in DeviceHistory and DevHistCol have been successfully updated.

> DB_SqlAllocateFailed -- Unable to allocate statement handle to database.

> DB_SqlUpdateFailed -- Unable to update last history record number and last time stamp in DeviceHistory and DevHistCol tables.

Description  This subroutine finalizes a stream of history recording. The function updates status information about a particular history, including setting the last record written and the last timestamp in the DeviceHistory table. It also updates the same information for each column associated with the history poll.

See Also  DB_StartHistory
DB_WriteHistory

Example

```
#include "db3int.hpp"

void main()
{
  DB_StatusType Status = DB_Success;
  DB_HistoryRecord HistoryRecord;
  int HistoryId = 1;

Status = DB_InitializeHistoryRecord(&HistoryRecord);

Status = DB_StartHistory(HistoryId, HistoryRecord.CurrentTime);
  if (Status == DB_Success)
  {
    Status = DB_WriteHistory(HistoryRecord);
    if (Status == DB_Success)
    {
      DB_EndHistory();
    } /* end if DB_WriteHistory */
  } /* end if DB_StartHistory */

} /* end function */
```

APPENDIX 1

DB_EndWritePointData

Finalizes the point data writing process.

Usage  Status = DB_EndWritePointData();

Parameters  Status -- DB_EndWritePointData can return the following values for the associated reasons:

DB_Success -- Point data successfully commited to the database.

DB_SqlAllocateFailed -- Unable to allocate statement handle to database.

DB_SqlExecuteFailed -- Failed to commit point data to the database.

Description  This subroutine finalizes the point data writing process by commiting any buffered data points to the database.

See Also  DB_StartWritePointData
DB_WritePointData

Example

```
#include "db3int.hpp"

void main()
{
  DB_StatusType Status = DB_Success;
  DB_PointData NextPoint;
  int DeviceID = 1,
      NumberFound=0;

Status = DB_CreatePointDataList (DeviceId, &NumberFound);
  if (Status == DB_Success)
  {
    if (NumberFound > 0)
    {
      Status = DB_NextChangedPoint(NextPoint);
      if (Status == DB_Success)
      {
        NextPoint.Value = 0.0;
        Status = DB_StartWritePointData();
        if (Status==DB_Success)
        {
          Status = DB_WritePointData(NextPoint);
          if (Status == DB_Success)
          {
            Status = DB_EndWritePointData();
          } /* end if DB_WritePointData */
```

APPENDIX I

```
            } /* end if DB_StartWritePointData
          } /* end if DB_NextChangedPoint */
        } /* end if NumberFound > 0 */
      } /* end if DB_CreatePointDataList */

} /* end function */
```

APPENDIX I 186

DB_GetHistoryType

Returns the specific type of history for a Poll Data which is of type DB_History.

| | |
|---|---|
| Usage | Status = DB_GetHistoryType(PollData.PollID, TypeOfHistory); |
| Parameters | PollData.PollID -- Contains the HistoryId for a Poll Data object which is of type DB_History. |
| | TypeOfHistory -- This returned DB_HistoryType determines the type of history associated with the given HistoryId. |
| | Status -- DB_GetHistoryType can return the following values for the associated reasons: |
| | DB_Success -- The history type was returned successfully. |
| | DB_SqlAllocateFailed -- Unable to allocate statement handle to database. |
| | DB_SqlExecuteFailed -- Internal processing error occurred. |
| | DB_SqlFetchFailed -- Failed to return a history type from the device history table of the database for the given History Id. |
| Description | This function returns a specific history type for a Poll Data which is of type DB_History given a particular History ID. This is necessary to determine if a particular history for a device corresponds to a DB_RemoteHistory, DB_HostHistory, DB_AuditTrail, or a DB_AlarmLog. |
| See Also | DB_CreatePollDataList<br>DB_NextPoll |

Example

```
#include "db3int.hpp"

void main()
{
  DB_StatusType Status = DB_Success;
  int DeviceId = 1,
      PollId = 1,
      NumberFound = 0;
  struct DB_PollData PollData;
  DB_HistoryType HistoryType = DB_RemoteHistory;
  DB_AuditTrailData ATData;

Status = DB_CreatePollDataList(DeviceId, PollId, &NumberFound);
  if (Status == DB_Success) && (NumberFound > 0)
  {
```

96009

APPENDIX I

```
      Status = DB_NextPoll(&PollData);
      if (Status == DB_Success)
      {
        if (PollData.PollType == DB_History)
        {
          Status = DB_GetHistoryType(PollData.PollID, HistoryType);
          if (Status == DB_Success)
          {
            if (HistoryType == DB_AuditTrail)
            {
              Status = DB_StartAuditTrail(PollData.PollID);
              if (Status = DB_Success)
              {
                /* Set appropriate fields of ATData */

Status = DB_WriteAuditTrail(ATData);
                if (Status == DB_Success)
                {
                  Status = DB_EndAuditTrail(PollData.PollID, ATData);
                } /* end if DB_WriteAuditTrail */
              } /* end if DB_StartAuditTrail */
            } /* end if DB_AuditTrail */
          } /* end if DB_GetHistoryType */
        } /* end if DB_History */
      } /* end if DB_NextPoll */
    } /* end if CreatePollDataList */

} /* end function */
```

APPENDIX I                                            188

DB_GetStringData

Returns the value for a device point which is of type STRING_POINT given the PointId.

| | |
|---|---|
| Usage | Status = DB_GetStringData(PointId, &StringValue); |
| Parameters | PointId -- The pointid for a Device Point which is of type STRING_POINT. |
| | StringValue -- The string value associated with the specified PointId. |
| | Status -- DB_GetStringData can return the following values for the following reasons: |
| | DB_Success -- The StringData was returned successfully. |
| | DB_SqlAllocateFailed -- Unable to allocate statement handle to database. |
| | DB_SqlExecuteFailed -- Internal processing error occurred. |
| | DB_SqlFetchFailed -- Failed to find string data for the associated Point Id. |
| Description | This function returns the string value for a device point which is of type STRING_POINT given the Point Id. |
| See Also | DB_CreatePointDataList<br>DB_NextPoint |

Example

```
#include "db3int.hpp"

void main()
{
  DB_StatusType Status = DB_Success;
  int DeviceId = 1,
      PollId = 1,
      NumberFound = 0;
  DB_PollData PollData;
  DB_PointData NextPoint;
  char * StringValue = NULL;

Status = DB_CreatePollDataList(DeviceId, PollId, &NumberFound);
  if (Status == DB_Success) && (NumberFound > 0)
  {
    Status = DB_NextPoll(&PollData);
    if (Status == DB_Success)
    {
      Status = DB_CreatePointDataList(PollData, &NumberFound);
      if (Status == DB_Success)
      {
```

96009

APPENDIX I 189

```
            Status = DB_NextPoint(&NextPoint);
            if (Status == DB_Success)
            {
             if (NextPoint.PointType == STRING_POINT)
             {
               Status = GetStringData(NextPoint.ID, &StringValue);
             } /* end if STRING_POINT */
            } /* end if DB_NextPoint */
          } /* end if DB_CreatePointDataList */
        } /* end if DB_NextPoll */
      } /* end if DB_CreatePollDataList */

} /* end function */
```

APPENDIX 1                                    190

DB_HistoryAddress

Returns the DeviceAddress of a DeviceHistory given the DeviceHistoryId.

| | |
|---|---|
| Usage | Status = DB_HistoryAddress (pPollData->PollId, &HistoryAddress); |
| Parameters | pPollData->PollId -- The DeviceHistID which identifies the DeviceHistory. |
| | HistoryAddress -- A user allocated integer which will hold the returned HistoryAddress. |
| | Status -- DB_HistoryAddress can return the following values for the associated reasons: |
| | DB_Success -- The HistoryAddress has been returned successfully. |
| | DB_SqlAllocateFailed -- Database interface failed to allocate statement handle. |
| | DB_SqlExecuteFailed -- Internal processing error occured. |
| | DB_SqlFetchFailed -- Invalid DeviceHistoryId. |
| Description | This function returns the HistoryAddress for a specified history given the DeviceHistID. |
| See Also | DB_CreatePollDataList<br>DB_NextPoll<br>DB_GetHistoryType |

Example

```
#include "db3int.hpp"

void main()
 {
  DB_StatusType Status = DB_Success;
  int DeviceId = 1,
      PollId = 1;
  DB_PollData NextPoll;
  DB_HistoryType HistoryType = DB_RemoteHistory;
  int HistoryAddress = 0;

Status = DB_CreatePollDataList(DeviceId, PollId);
  if (Status == DB_Success)
  {
   Status = DB_NextPoll(&NextPoll);
   if (Status == DB_Success)
   {
     Status = DB_GetHistoryType(PollData.PollID, HistoryType);
     if (Status == DB_Success)
```

96009

APPENDIX I

```
    {
      if (HistoryType == DB_RemoteHistory)
      {
        Status = DB_HistoryAddress(pPollData->PollID, &HistoryAddress);
      } /* end if DB_RemoteHistory */
    } /* end if DB_GetHistoryType */
  } /* end if DB_NextPoll */
} /* end if CreatePollDataList */

} /* end function */
```

APPENDIX 1  192

DB_InitAlarmEvaluationList

Initializes internal data base alarm evaluation list.

| | |
|---|---|
| Usage | DB_Initialize(void * pList); |
| Parameters | pList -- Pointer to the list structure which will hold the points to be evaluated. |
| Description | Initializes the internal data base alarm evaluation list so that any points needing to be evaluated may be added to the list by function DB_WritePointData.<br><br>The protocol driver shall not call this database routine. |
| See Also | DB_WritePointData |

Example

NOTE: The protocol driver shall not call this routine.

APPENDIX I

DB_Initialize

Prepares the Database Interface for use.

| | |
|---|---|
| Usage | Status = DB_Initialize(void * Parms); |
| Parameters | Parms - Set of parameters used internally. |
| | Status -- DB_Initialize can return the following values for the associated reasons: |
| | DB_Success -- The connection has been initialized successfully. |
| | DB_BadPointer -- Parms have not been previously allocated. |
| | DB_OtherFailed -- The connection cannot be initialized using the passed Parms. |
| Description | This function prepares the Database interface. This interface shields 3rd party developers from underlying database implementation details and the risks associated with changes to this implementation. The communication task controlling the port resource calls this function to initialize the required handles. The protocol driver is then able to obtain parameters and settings from the database or write history data to the database. |
| | The protocol driver shall not call this database routine. |
| See Also | There are no related functions. |

Example

NOTE: The protocol driver shall not call this routine.

APPENDIX 1 194

DB_InitializeHistoryRecord

Sets the columns of a history record to default initial values.

| | |
|---|---|
| Usage | Status = DB_InitializeHistoryRecord (&RecordToInitialize); |
| Parameters | RecordToInitialize -- The DB_HistoryRecord to be initialized. |
| | Status -- DB_EndHistory can return the following values for the associated reasons: |
| | DB_Success -- The history record is initialized. |
| | DB_BadPointer -- DB_HistoryRecord has not yet been allocated. |
| Description | This subroutine initializes a history record. The function sets the IsNull flag to TRUE, the Value, the LastRecord and the ColumnNumber to a default value for all columns. This function serves as a convenience function to set the History Record fields to a default state. |
| See Also | DB_StartHistory |
| | DB_WriteHistory |
| | DB_EndHistory |

Example

```
#include "db3int.hpp"

void main()
{
  DB_StatusType Status = DB_Success;
  int HistoryId = 1;
  DB_HistoryRecord HistoryRecord;

Status = DB_InitializeHistoryRecord(&HistoryRecord);
  ...
  Code to set values in history record
  ...

Status = DB_StartHistory(HistoryId, HistoryRecord.CurrentTime);
  if (Status == DB_Success)
  {
    Status = DB_WriteHistory(HistoryRecord);
    if (Status == DB_Success)
    {
     DB_EndHistory();
    } /* end if DB_WriteHistory */
  } /* end if DB_StartHistory */

} /* end function */
```

96009

APPENDIX 1

DB_InsertDevDataFolder

Creates a data folder for a given device.

Usage        Status = DB_InsertDevDataFolder(DeviceId,
                                Name,
                                ParentObj,
                                ObjectType,
                                Address,
                                Seq,
                                DevDataFolderId);

Parameters   DeviceId -- The Device Id of the associated device.

Name -- The name of the DevDataFolder.

ParentObj -- The DevDataFolderId of the parent folder if the folder to be created is a subfolder.

ObjectType -- The type of folder to be created.

Address -- The address of the DevDataFolder.

Seq -- The sequence of the folder in relation to other folders.

DevDataFolderId -- This return value indicates the DevDataFolderId of the newly created folder.

Status -- DB_InsertDevDataFolder can return the following values for the associated reasons:

DB_Success -- The new DevDataFolder was created successfully.

DB_ExecuteFailed -- The new DevDataFolder was not inserted successfully.

Description  This function inserts a device data folder into the database given the characteristics of the folder.

See Also     DB_InsertDevicePoint

Example include "db3int.hpp"

```
void main()
{
  DB_StatusType Status = DB_Success;
  char Name[33] = "Operational Data";
  int DeviceId = 1,
```

APPENDIX I

```
        ParentFolderId = 10,
        ObjectType = 7,
        DeviceAddress = 0,
        Seq = 1;
unsigned long DevDataFolderId = 0;

Status = DB_InsertDevDataFolder(DeviceId,
                    Name,
                    ParentFolderId,
                    ObjectType,
                    DeviceAddress,
                    Seq,
                    DevDataFolderId);

} /* end function */
```

APPENDIX I

DB_InsertDevicePoint

Inserts a device point into the database.

Usage  Status = DB_InsertDevicePoint(Name,
ParentObj,
PointType,
Address,
Seq,
Value,
PointId);

Parameters

Name -- The name of the device point.

ParentObj -- The DevDataFolderId of the parent folder if the point is to be a member of a device data folder.

PointType -- Indicates string, numeric, etc.

Address -- The address of the device point.

Seq -- The sequence of the point in relation to other points.

PointId -- This return value indicates the PointId of the newly created point.

Status -- DB_InsertDevicePoint can return the following values for the associated reasons:

DB_Success -- The new device point was created successfully.

DB_ExecuteFailed -- The new device point was not inserted successfully.

Description  This function inserts a device point into the database given the characteristics of the point.

See Also  DB_InsertDevDataFolder

Example

```
#include "db3int.hpp"

void main()
{
  DB_StatusType Status = DB_Success;
  char Name[33] = "Device Point";
  int ParentFolderId = 1,
      PointType = 1,
      DeviceAddress = 0,
      Seq = 1;
  unsigned long PointId = 0;
```

APPENDIX 1

```
Status = DB_InsertDevicePoint(Name,
                              ParentFolderId,
                              PointType,
                              DeviceAddress,
                              Seq,
                              100,
                              PointId);

} /* end function */
```

APPENDIX I

DB_NextChangedPoint

Obtain the next changed point data item from the internal list.

Usage  Status = DB_NextChangedPoint(&PointData);

Parameters  PointData -- This DB_PointData structure is assigned the values of the next changed point in the internal list.

Status -- DB_NextChangedPoint can return the following values for the associated reasons:

DB_Success -- The next point from the internal list has been assigned to PointData.

DB_NoMoreData -- The internal Changed Point List is empty.

DB_BadPointer -- PointData has not been previously allocated

Description  This subroutine assigns the next element in the internal list of changed point data to the structure pointed to by PointData. Successive call to DB_NextChangedPoint consumes the internal list.

See Also  DB_CreateChangedPointsList

Example

```
#include "db3int.hpp"

void main()
{
  DB_StatusType Status = DB_Success;
  int NumberFound = 0;
  DB_PointData NextPoint;

Status = DB_CreateChangedPointsList (DeviceId, &NumberFound);
  if (Status == DB_Success) && (NumberFound > 0)
  {
    Status = DB_NextChangedPoint(&NextPoint);
  } /* end if DB_CreateChangedPointList */

} /* end function ClearChangedPoints */
```

APPENDIX I 200

DB_NextFolderItem

Returns the next Folder Item in the internal Folder Item List.

| | |
|---|---|
| Usage | Status = DB_NextFolderItem(&FolderItem); |
| Parameters | FolderItem -- This DB_FolderItem structure is assigned the values of the next FolderItem in the internal list. |
| | Status -- DB_NextChangedPoint can return the following values for the associated reasons: |
| | DB_Success -- The next point from the internal list has been assigned to PointData. |
| | DB_NoMoreData -- The internal Folder Item List is empty. |
| | DB_BadPointer -- FolderItem has not been previously allocated. |
| Description | This subroutine assigns the next element in the internal list of Folder Item List to the passed FolderItem. Successive calls to DB_NextFolderItem consume the internal list. |
| See Also | DB_CreateListOfPollContents |
| | DB_CreateListOfFolderContents |

Example

```
#include "db3int.hpp"

void main()
{
  DB_StatusType Status = DB_Success;
  int DeviceId = 1,
      PollId = 1,
      NumberFound = 0;
  struct DB_PollData Poll;
  struct DB_FolderItem FolderItem
                  NewFolderItem;

Status = DB_CreatePollDataList(DeviceId, PollId, &NumberFound);
  if (Status == DB_Success) && (NumberFound > 0)
  {
    Status = DB_NextPoll(&Poll);
    if (Status == DB_Success)
    {
      Status = DB_CreateListOfPollContents(Poll, &NumberFound);
      if (Status == DB_Success) && (NumberFound > 0)
      {
        Status = DB_NextFolderItem(&FolderItem);
        if (Status == DB_Success)
```

96009

APPENDIX 1

```
      {
        Status = DB_CreateListOfFolderContents(FolderItem, &NumberFound);
        if (Status == DB_Success) && (NumberFound > 0)
        {
          Status = DB_NextFolderItem(&NewFolderItem);
        } /* end if DB_CreateListOfFolderContents */
      } /* end if DB_NextFolderItem */
    } /* end if DB_CreateListOfPollContents */
  } /* end if DB_NextPoll */
} /* end if DB_CreatePollDataList */

} /* end function */
```

APPENDIX 1

DB_NextHistCol

Obtain the next History Column from the internal History Column List.

| | |
|---|---|
| Usage | Status = DB_NextHistCol(&NextHistoryColumn); |
| Parameters | NextHistoryColumn -- A user-allocated DB_HistoryColumn structure that will be assigned the values of the next history column in the internal list. |
| | Status -- DB_NextHistCol can return the following values for the associated reasons: |
| | DB_Success -- The next history column from the internal list has been assigned to NextHistoryColumn. |
| | DB_NoMoreData -- The internal History Column List is empty. |
| | DB_BadPointer -- NextHistoryColumn has not been previously allocated. |
| Description | This subroutine assigns the next element in the internal list of history column data to the passed NextHistoryColumn. Successive calls consume the internal list. |
| See Also | DB_CreateHistColList |

Example

```
#include "db3int.hpp"

void main()
{
  DB_StatusType Status = DB_Success;
  DB_HistoryColumn NextHistCol;
  int NumberFound = 0;

Status = DB_CreateHistColList (HistoryPollData, &NumberFound);
  while (Status == DB_Success) && (NumberFound > 0)
  {
     Status = DB_NextHistCol (&NextHistCol);
  } /* end while */

} /* end function */
```

APPENDIX I   203

DB_NextPoint

Obtains the next point data structure from the internal point list.

| | |
|---|---|
| Usage | Status = DB_NextPoint(&PointData); |
| Parameters | PointData -- PointData is a DB_PointData structure that will be assigned the values of the next point in the internal Point List. |
| | Status -- DB_NextPoint can return the following values for the associated reasons: |
| | DB_Success -- The next point from the internal list has been successfully assigned to PointData. |
| | DB_NoMoreData -- The internal Point List is empty. |
| | DB_BadPointer -- PointData has not been previously allocated. |
| Description | This subroutine assigns the next element in the internal list of point data to the structure pointed to by PointData. Through successive calls, the internal list is consumed. |
| See Also | DB_CreatePointDataList |

Example

```
#include "db3int.hpp"

void main()
{
  DB_StatusType Status = DB_Success;
  int DeviceId = 1,
      PollId = 1,
      NumberFound = 0;
  struct DB_PollData PollData;
  struct DB_PointData NextPoint;

Status = DB_CreatePollDataList(DeviceId, PollId, &NumberFound);
  if (Status == DB_Success) && (NumberFound > 0)
  {
    Status = DB_NextPoll(&PollData);
    if (Status == DB_Success)
    {
      Status = DB_CreatePointDataList(PollData, &NumberFound);
      if (Status == DB_Success) && (NumberFound > 0)
      {
        Status = DB_NextPoint(&NextPoint);
      } /* end if DB_CreatePointDataList */
    } /* end if DB_NextPoll */
  } /* end if DB_CreatePollDataList */
```

96009

APPENDIX I    204

} /* end function */

APPENDIX I                                205

DB_NextPoll

Obtain the next poll data from the internal list constructed by DB_CreatePollDataList.

Usage        Status = DB_NextPoll (&PollData);

Parameters   PollData -- PollData is a user allocated DB_PollData structure that will be assigned to
                 the values of the next Poll Data in the internal Poll List.

Status -- DB_NextPoll can return the following values for the associated reasons:

DB_Success -- The next Poll in the Poll list has been successfully assigned to PollData.

DB_NoMoreData -- The internal Poll list is empty.

DB_BadPointer -- PollData has not yet been allocated.

Description  This subroutine assigns the next element in the internal list of poll data to the structure
                 pointed to by PollData. Through successive calls, the internal list is consumed.

See Also     DB_CreatePollDataList

Example

```
#include "db3int.hpp"

void main()
 {
   DB_StatusType Status = DB_Success;
   int DeviceId = 1,
       PollId = 1;
   DB_PollData NextPoll;

Status = DB_CreatePollDataList(DeviceId, PollId);
   if (Status == DB_Success)
   {
     Status = DB_NextPoll(&NextPoll);
   } /* end if CreatePollDataList */

} /* end function */
```

APPENDIX I 206

DB_SetDeviceTime

Updates the Device Time for a particular Device given the DeviceId.

| | |
|---|---|
| Usage | Status = DB_SetDeviceTime (DeviceId, CurrentTime); |
| Parameters | DeviceId -- An integer value which uniquely identifies a particular device. |
| | CurrentTime -- A DB_TimeStamp with the desired time value. |
| | Status -- DB_SetDeviceTime can return the following values for the associated reasons: |
| | DB_Success -- The Device Time has been successfully updated. |
| | DB_SqlAllocateFailed -- Database interface failed to allocate a statement handle. |
| | DB_SqlUpdateFailed -- Unable to update Device Time. |
| Description | This subroutine updates the Device Time field of the Device Object table for the device associated with the given DeviceId. |
| See Also | Not applicable. |

Example

```
#include "db3int.hpp"

void main()
{
  DB_StatusType Status = DB_Success;
  int DeviceID = 1;
  DB_TimeStamp CurrentTime;

...
  code that sets the CurrentTime
  ...

Status = DB_SetDeviceTime(DeviceID, CurrentTime);

} /* end function */
```

APPENDIX I

DB_StartAuditTrail

This function must be called to initialize the Audit Trail recording process.

Usage  Status = DB_StartAuditTrail(HistoryId, ATData);

Parameters  HistoryId -- An integer argument that uniquely identifies a History (Audit Trail) for a particular device.

ATData -- a DB_AuditTrailData which will return necessary information about the Audit Trail associated with the given HistoryID.

Status -- DB_StartHistory can return the following values for the associated reasons:

DB_Success -- The Audit Trail recording process has been initiated.

DB_SqlFetchFailed -- The process was unable to obtain configuration information about the history identified by HistoryId.

DB_SqlAllocateFailed -- The Database Interface was unable to allocate a statement handle.

DB_SqlExecuteFailed -- An internal Database processing error occurred.

Description  This function accepts a DeviceHistID and uses it to set the DeviceAcctNum, DBName, and AuditDeviceID fields of the passed DB_AuditTrailData struct.

See Also  DB_WriteAuditTrailDB_EndAuditTrail

Example

```
#include "db3int.hpp"

void main()
{
  DB_StatusType Status = DB_Success;
  int DeviceId = 1,
      PollId = 1,
      NumberFound = 0;
  struct DB_PollData PollData;
  DB_HistoryType HistoryType = DB_RemoteHistory;
  DB_AuditTrailData ATData;

Status = DB_CreatePollDataList(DeviceId, PollId, &NumberFound);
  if (Status == DB_Success) && (NumberFound > 0)
  {
    Status = DB_NextPoll(&PollData);
    if (Status == DB_Success)
    {
```

APPENDIX I                           208

```
      if (PollData.PollType == DB_History)
      {
        Status = DB_GetHistoryType(PollData.PollID, HistoryType);
        if (Status == DB_Success)
        {
          if (HistoryType == DB_AuditTrail)
          {
            Status = DB_StartAuditTrail(PollData.PollID);
            if (Status = DB_Success)
            {
              /* Set appropriate fields of ATData */

Status = DB_WriteAuditTrail(ATData);
              if (Status == DB_Success)
              {
                Status = DB_EndAuditTrail(PollData.PollID, ATData);
              } /* end if DB_WriteAuditTrail */
            } /* end if DB_StartAuditTrail */
          } /* end if DB_AuditTrail */
        } /* end if DB_GetHistoryType */
      } /* end if DB_History */
    } /* end if DB_NextPoll */
  } /* end if CreatePollDataList */

} /* end function */
```

96009

APPENDIX 1                                          209

DB_StartHistory

This function must be called to initialize the History recording process.

| | |
|---|---|
| Usage | Status = DB_StartHistory(HistoryId, BeginningTimeStamp); |
| Parameters | HistoryId -- An integer argument that uniquely identifies a history for a particular device. |
| | BeginningTimeStamp -- A DB_TimeStamp structure that indicates the earliest time to be written within this operation. This is compared to the last time stamp written to ensure that redundant data is not written to the history table. |
| | Status -- DB_StartHistory can return the following values for the associated reasons: |
| | DB_Success -- The history recording process has been initialized successfully. |
| | DB_SqlFetchFailed -- The process was unable to obtain configuration information about the history identified by HistoryId. |
| | DB_SqlPrepareFailed -- Internal Processing error occurred. |
| | DB_OldTimeStamp -- BeginningTimeStamp predates the last timestamp written. |
| | DB_OtherFailed -- The History identified by HistoryId is not properly configured within the database |
| Description | This subroutine initializes the writing of history data to the database. It loads the configuration information for the history poll identified by HistoryId into memory. The time stamp of the last record written is compared to BeginningTimeStamp to ensure that redundant data is not written to the database. |
| See Also | DB_WriteHistory |
| | DB_EndHistory |

Example include "db3int.hpp"

void main()
{
  DB_StatusType Status = DB_Success;
  DB_HistoryRecord HistoryRecord;
  int HistoryId = 1;

Status = DB_InitializeHistoryRecord(&HistoryRecord);

Status = DB_StartHistory(HistoryId, HistoryRecord.CurrentTime);

96009

APPENDIX 1                        210

```
    if (Status == DB_Success)
    {
      Status = DB_WriteHistory(HistoryRecord);
      if (Status == DB_Success)
      {
        DB_EndHistory();
      } /* end if DB_WriteHistory */
    } /* end if DB_StartHistory */

} /* end function */
```

APPENDIX 1

DB_StartWritePointData

This function must be called to initialize the point data recording process.

Usage      Status = DB_StartWritePointData();

Parameters Status -- DB_StartHistory can return the following values for the associated reasons:

DB_Success -- The point data recording process has been initialized successfully.

DB_SqlPrepareFailed -- The point data recording process has not been initialized successfully.

Description This function must be called to initialize the point data writing process.

See Also   DB_EndWritePointData
DB_WritePointData

Example

```
#include "db3int.hpp"

void main()
{
  DB_StatusType Status = DB_Success;
  DB_PointData NextPoint;
  int DeviceID = 1,
      NumberFound=0;

Status = DB_CreatePointDataList (DeviceId, &NumberFound);
  if (Status == DB_Success)
  {
    if (NumberFound > 0)
    {
      Status = DB_NextChangedPoint(NextPoint);
      if (Status == DB_Success)
      {
        NextPoint.Value = 0.0;
        Status = DB_StartWritePointData();
        if (Status==DB_Success)
        {
          Status = DB_WritePointData(NextPoint);
          if (Status == DB_Success)
          {
            Status = DB_EndWritePointData();
          } /* end if DB_WritePointData */
        } /* end if DB_StartWritePointData
      } /* end if DB_NextChangedPoint */
    } /* end if NumberFound > 0 */
```

APPENDIX I 212

} /* end if DB_CreatePointDataList */

} /* end function */

APPENDIX I

DB_WriteAuditTrail

This function writes a DB_AuditTrailData struct to the Database.

| | |
|---|---|
| Usage | Status = DB_WriteAuditTrail(ATData); |
| Parameters | ATData -- A DB_AuditTrailData struct whose fields contain the information which will be written to the Data Base. |
| | Status -- DB_WriteAuditTrail can return the following values for the associated reasons: |
| | DB_Success -- The DB_AuditTrailData struct was successfully written to the Database. |
| | DB_SqlAllocateFailed -- The Database Interface was unable to allocate a statement handle. |
| | DB_SqlExecuteFailed -- An internal Database processing error occurred. |
| | DB_SqlCommitFailed -- The Database interface failed to commit data to the database. |
| Description | This function writes an Audit Trail entry to the database given a DB_AuditTrailData struct. Function DB_StartAuditTrail must first be called to assure that the correct DBName, DeviceAcctNum, and AuditDeviceID have been assigned to the DB_AuditTrailData struct. Other fields of the DB_AuditTrialData struct must be assigned by the protocol driver. |
| See Also | DB_StartAuditTrail<br>DB_EndAuditTrail |

Example

```
#include "db3int.hpp"

void main()
{
  DB_StatusType Status = DB_Success;
  int DeviceId = 1,
      PollId = 1,
      NumberFound = 0;
  struct DB_PollData PollData;
  DB_HistoryType HistoryType = DB_RemoteHistory;
  DB_AuditTrailData ATData;

Status = DB_CreatePollDataList(DeviceId, PollId, &NumberFound);
  if (Status == DB_Success) && (NumberFound > 0)
  {
    Status = DB_NextPoll(&PollData);
    if (Status == DB_Success)
```

APPENDIX I                214

```
    {
      if (PollData.PollType == DB_History)
      {
        Status = DB_GetHistoryType(PollData.PollID, HistoryType);
        if (Status == DB_Success)
        {
          if (HistoryType == DB_AuditTrail)
          {
            Status = DB_StartAuditTrail(PollData.PollID);
            if (Status = DB_Success)
            {
              /* Set appropriate fields of ATData */

Status = DB_WriteAuditTrail(ATData);
              if (Status == DB_Success)
              {
                Status = DB_EndAuditTrail(PollData.PollID, ATData);
              } /* end if DB_WriteAuditTrail */
            } /* end if DB_StartAuditTrail */
          } /* end if DB_AuditTrail */
        } /* end if DB_GetHistoryType */
      } /* end if DB_History */
    } /* end if DB_NextPoll */
  } /* end if CreatePollDataList */

} /* end function */
```

APPENDIX I                                              215

DB_WriteComEvent

Allows communications events to be logged to the Database.

| | |
|---|---|
| Usage | Status = DB_WriteComEvent (ComEvent); |
| Parameters | ComEvent -- A user allocated DB_ComEvent struct. |
| | Status -- DB_WriteComEvent can return the following values for the associated reasons: |
| | DB_Success -- The event has been successfully written and committed to the log file. |
| | DB_SqlAllocateFailed -- Database interface is unable to allocate statement handle. |
| | DB_SqlExecuteFailed -- An internal Database processing error occurred. |
| | DB_SqlCommitFailed -- Unable to commit write operation to the database. |
| Description | This function writes the current time, event type, and identifying information about a communications event to the communications server log file. The identifying information includes the protocol identifier, the port number, the communications server identifier and the device identifier. |
| See Also | Not applicable. |

Example

```
#include "db3int.hpp"

void main()
{
  DB_StatusType Status = DB_Success;
  DB_ComEvent ComEvent;

ComEvent.DeviceID = DeviceId;
  ComEvent.ComPort = PortNumber;
  ComEvent.ProtocolID = ProtocolId;
  ComEvent.EventType = EventType;
  ComEvent.ComServerID = ServerId;

Status = DB_WriteComEvent(ComEvent);

} /* end function */
```

96009

APPENDIX I

DB_WriteHistory

Writes a History Record to the Database.

Usage  Status = DB_WriteHistory (HistoryRecord);

Parameters  HistoryRecord - A DB_HistoryRecord structure whose values are to be written to the database.

Status -- DB_WriteHistory can return the following values for the associated reasons:

DB_Success -- The values in HistoryRecord have been successfully recorded to the database.

DB_SqlAllocateFailed -- Database interface unable to allocate statement handle.

DB_SqlExecuteFailed -- An internal Database processing error occurred.

DB_SqlCommitFailed -- Unable to commit transaction to database.

DB_OtherFailed -- Invalid history table type was specified in DB_StartHistory.

Description  This function writes history data to the database as a single transaction per history record. A single HistoryRecord may contain up to 16 column values. DB_WriteHistory commits each write operation upon success. When a null value is to be written to the database, the IS_NULL flag should be set for that column. Regardless of the 'value', a null value is written for those fields.

See Also  DB_InitializeHistoryRecord
DB_StartHistory
DB_EndHistory

Example

```
#include "db3int.hpp"

void main()
{
  DB_StatusType Status = DB_Success;
  DB_HistoryRecord HistoryRecord;
  int HistoryId = 1;

Status = DB_InitializeHistoryRecord(&HistoryRecord);

Status = DB_StartHistory(HistoryId, HistoryRecord.CurrentTime);
  if (Status == DB_Success)
  {
    Status = DB_WriteHistory(HistoryRecord);
    if (Status == DB_Success)
```

APPENDIX 1

```
      {
        DB_EndHistory();
      } /* end if DB_WriteHistory */
    } /* end if DB_StartHistory */

} /* end function */
```

APPENDIX I 218

DB_WritePointData

Writes a single point value to the Database.

| | |
|---|---|
| Usage | Status = DB_WritePointData(PointData); |
| Parameters | PointData - DB_PointData structure that contains point identifying information and a value with which to replace the current database information. |
| | Status -- DB_NextChangedPoint can return the following values for the associated reasons: |
| | DB_Success -- The PointData value has been updated successfully. |
| | DB_SqlAllocateFailed -- The Database interface failed to allocate a statement handle. |
| | DB_SqlExecuteFailed -- An internal Database processing error occurred. |
| | DB_SqlCommitFailed -- Unable to commit update transaction. |
| Description | This function updates a single point through identifying information and value stored in PointData. |
| See Also | DB_CreateChangedPointsList<br>DB_NextChangedPoint<br>DB_CreatePointDataList<br>DB_NextPoint<br>DB_StartWritePointData<br>DB_EndWritePointData |

Example

```
#include "db3int.hpp"

void main()
{
  DB_StatusType Status = DB_Success;
  DB_PointData NextPoint;
  int DeviceID = 1,
      NumberFound=0;

Status = DB_CreatePointDataList (DeviceId, &NumberFound);
  if (Status == DB_Success)
  {
    if (NumberFound > 0)
    {
      Status = DB_NextChangedPoint(NextPoint);
      if (Status == DB_Success)
      {
```

96009

APPENDIX I

```
            NextPoint.Value = 0.0;
            Status = DB_StartWritePointData();
            if (Status==DB_Success)
            {
             Status = DB_WritePointData(NextPoint);
             if (Status == DB_Success)
             {
               Status = DB_EndWritePointData();
             } /* end if DB_WritePointData */
            } /* end if DB_StartWritePointData
          } /* end if DB_NextChangedPoint */
        } /* end if NumberFound > 0 */
      } /* end if DB_CreatePointDataList */

} /* end function */
```

What is claimed is:

1. In a data acquisition system including at least one control application and a plurality of remote data gathering devices each of which communicates according to a respective defined communications protocol, a multiple protocol management system comprising:

a plurality of protocol drivers defined according to ISO/OSI protocol layering definitions;

storing means for storing an ordered list of said protocol drivers for each of said data gathering devices, each list containing the ordered identification of one or more protocol drivers corresponding to the respective defined communications protocol for said each data gathering device;

retrieving means responsive to a communications request received from one of said at least one control application and associated with a selected data gathering device for retrieving from the storing means the ordered list of protocol drivers corresponding to the selected data gathering device; and means for layering the protocol drivers identified in the retrieved ordered list to form a protocol stack.

2. The multiple protocol management system according to claim 1 wherein:

said storing means includes an object database which stores information in the form of associated objects;

each of the data gathering devices is associated with a respective object in the database storing the ordered list of protocol drivers for said each data gathering device;

each of said protocol drivers is associated with a respective object in the database storing action data, parameter data and event data for said each protocol driver; and said retrieving means is further operative to retrieve from the storing means the action data, parameter data and event data for each of the protocol drivers identified on the retrieved ordered list.

3. The multiple protocol management system according to claim 1 wherein said means for layering includes a common messaging interface interposed between adjacent protocol drivers in the protocol stack.

4. The multiple protocol management system according to claim 1 wherein:

a data gathering device is associated with two or more defined communications protocols;

said storing means stores a respective ordered list for each of said two or more defined communications protocols;

said communications request contains an identification of a specific one of said two or more defined communications protocols; and said retrieving means is effective to retrieve that ordered list corresponding to the specifically identified defined communications protocol.

5. The multiple protocol management system according to claim 1 wherein said data acquisition system includes a plurality of communications ports each capable of connection to a selected data gathering device and said multiple protocol management system is effective for forming a respective protocol stack for each of said plurality of ports so that communications can be substantially simultaneously effected with a plurality of selected data gathering devices having diverse defined communications protocols.

6. The multiple protocol management system according to claim 1 wherein each of said plurality of protocol drivers is implemented as a dynamic link library.

7. The multiple protocol management system according to claim 1 wherein said storing means includes an object database which stores information representing a plurality of device objects each associated with a respective one of the plurality of data gathering devices, the multiple protocol management system further comprising:

means for providing a common database interface for use by each of the protocol drivers in the protocol stack for communicating with the database.

8. A distributed data acquisition network comprising a plurality of data acquisition systems each including a multiple protocol management system as set forth in claim 1, wherein each data acquisition system is associated with a respective set of remote data gathering devices.

* * * * *